(12) United States Patent
Wilts

(10) Patent No.: US 12,175,163 B1
(45) Date of Patent: Dec. 24, 2024

(54) SYSTEMS AND METHODS FOR CREATING AND PRESENTING PLANNING, REAL ESTATE, AND INFRASTRUCTURE PROJECTS

(71) Applicant: THE APPLICATION OF NOTHING, INC., Chicago, IL (US)

(72) Inventor: David Bradford Wilts, Chicago, IL (US)

( * ) Notice: Subject to any disclaimer, the term of this patent is extended or adjusted under 35 U.S.C. 154(b) by 867 days.

(21) Appl. No.: 17/345,944

(22) Filed: Jun. 11, 2021

Related U.S. Application Data

(60) Provisional application No. 63/188,764, filed on May 14, 2021, provisional application No. 63/038,630, filed on Jun. 12, 2020.

(51) Int. Cl.
*G06F 30/12* (2020.01)
*G06F 30/13* (2020.01)
*G06Q 50/16* (2012.01)

(52) U.S. Cl.
CPC .............. *G06F 30/12* (2020.01); *G06F 30/13* (2020.01); *G06Q 50/16* (2013.01)

(58) Field of Classification Search
CPC .......... G06F 30/12; G06F 30/13; G05Q 50/16
USPC ............................................................ 703/1
See application file for complete search history.

(56) References Cited

U.S. PATENT DOCUMENTS

2017/0140450 A1* 5/2017 Ashby ................ G06Q 30/0643
2019/0043109 A1* 2/2019 Lind ................... G06Q 30/0633

FOREIGN PATENT DOCUMENTS

WO  WO-2007019021 A2 * 2/2007 ....... G06F 17/30241

OTHER PUBLICATIONS

Hayes_2016 (FOA Reference Guide to Fiber Optic Network Design and Study Guide to FOA Certification, Apr. 2016) (Year: 2016).*

* cited by examiner

*Primary Examiner* — Brian S Cook
(74) *Attorney, Agent, or Firm* — Torchman IP LLC; Jonathan Torchman

(57) ABSTRACT

Embodiments include systems and methods for presenting digital infrastructure planning in a three-dimensional topographical format including presenting a Fiber Specification used to create a Fiber configuration, and in response to a selection in the Fiber Specification for a condition, presenting an Element Editor interface for the Fiber configuration which is specific to the selection for the condition in the Fiber Specification. Further, in response to a selection in the Element Editor for a Fiber configuration which is specific to the selection for the condition in the Fiber Specification, presenting configuration options for a conduit in the Element Editor, in response to a selection for a configuration option for the conduit, presenting configuration options for the innerduct in the Element Editor, and in response to a selection from the configuration options for the innerduct, presenting options for the cable in the Element Editor.

18 Claims, 53 Drawing Sheets

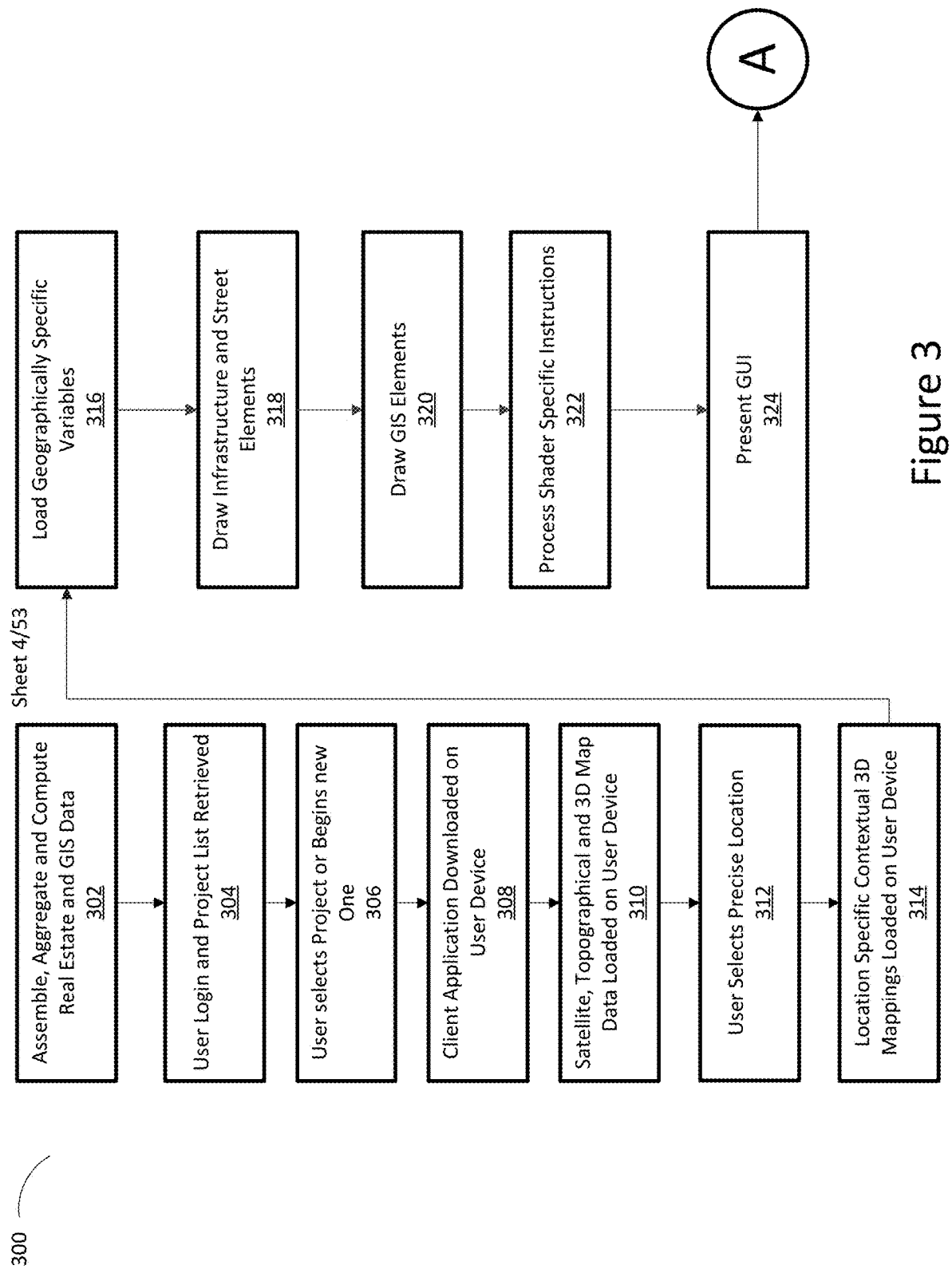

Object File
402

- Location (city, country, territory, etc.)
- Parcel (land parcel with geolocation information)
- Building – with a summary of all of the metadata attributes
- Massing – large, segregated portion of a building (such as a podium or tower) with metadata attributes
- A specified program or category
  a. The program may be related to physical space
  b. Category may be for systems and assets, such as HVAC, IT, digital assets, etc.
- Floor
- Unit
- Space
  a. Type
  b. Room Number
  c. Zone

```
{
 "ProjectName": "Name1",
 "UserName": "Jones",
 "Language": "French",
 "Location": {
   "streetAddress": "1234 1st Street",
   "city": "Washington",
   "state": "District of Columbia",
   "postalCode": "12345-6789"
   "country": "USA",
 },
 "BuildingList": [
  {
   "type": "residential",
   "coordinates": "(x,y,z)"
   "Floors": "8"
  },
  {
   "type": "commercial",
   "coordinates": "(x,y,z)"
   "Floors": "12"
  }
 ],
 "Space": [
  {
   "type": "commercial",
   "RoomNumber": "(x,y,z)"
   "Zone": "8192"
  }],
}
```

Figure 4

Create Tool – Building Massing Creation Example 1

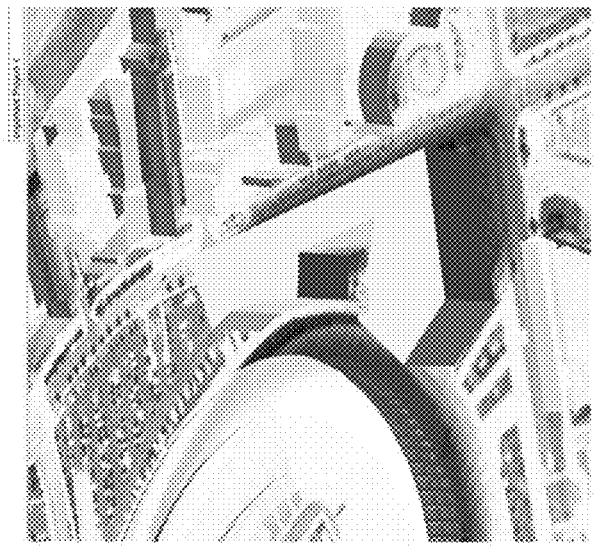
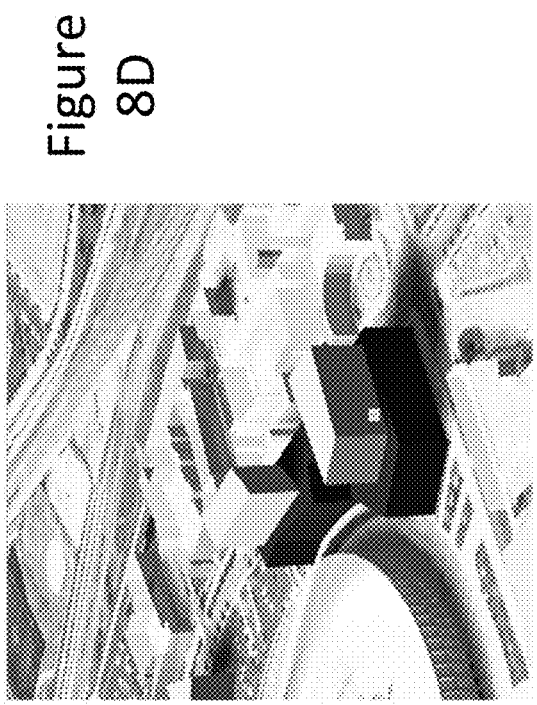
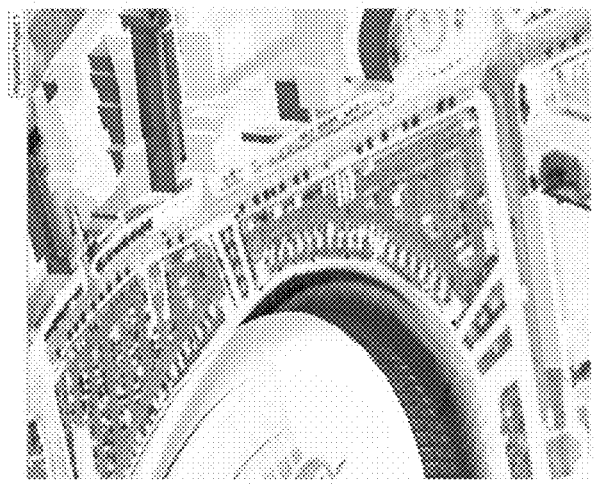
Figure 8A
Figure 8B
Figure 8C
Figure 8D
Create Tool – Building Massing Creation Example 2

Optimization Tool – Massing Example 1

Optimization Tool – Massing Example 2

Figure 11   Optimization Tool – Massing Example 3

Optimization Tool – Public Spaces Example 1

Figure 13    Optimization Tool – Public Spaces Example 2

Amortization and Waterfall – Tranche Creation

Amortization and Waterfall – GP Amortization

Amortization and Waterfall – Waterfall Example 1

Amortization and Waterfall – Waterfall Example 2

DevCost

Vertical Elements Interface Embodiment

Sensor Added

Microcell Configuration Embodiment

Luminaire Configuration Embodiment

Streetlight Placement

Streetlamp Microcell Visualization

Sitewide Coverage Visualizations for Macrocell and Microcell

Interior First Responder Distributed Antenna System (DAS) Visualization

Cable Specifications/Amount

Drawing Fiber Pathway

Cable Configured

Configure Conduit

Configure Innerduct

Network Pathway

Route Selected

Configure Network Pathway

Network Pathway Configured

Network Pathway Established

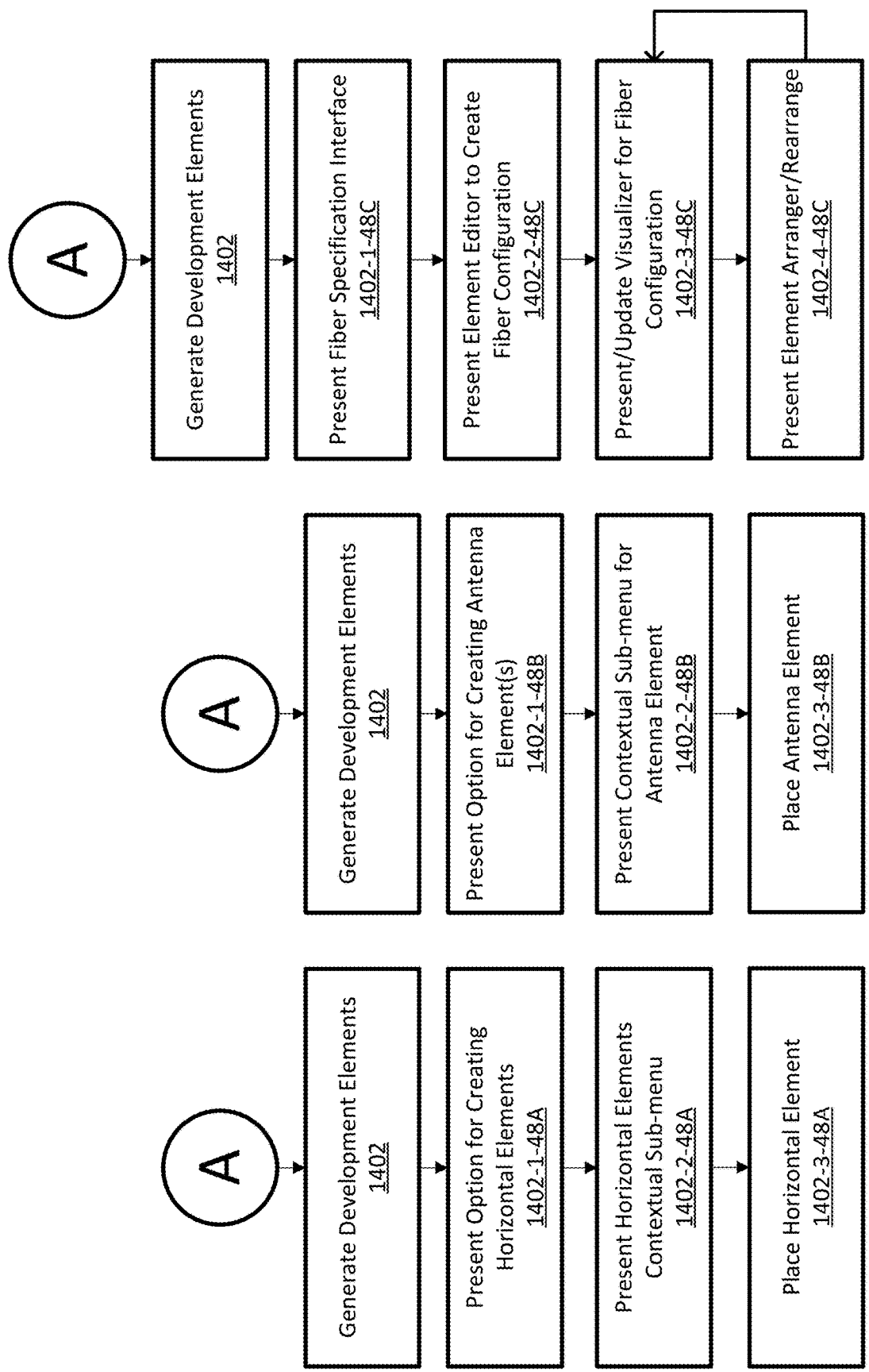

SYSTEMS AND METHODS FOR CREATING AND PRESENTING PLANNING, REAL ESTATE, AND INFRASTRUCTURE PROJECTS

PRIORITY CROSS-REFERENCE TO RELATED APPLICATIONS

This application claims priority pursuant to 35 U.S.C. 119 (e) from U.S. Provisional Patent Application No. 63/038,630 filed on Jun. 12, 2020. This application claims priority pursuant to 35 U.S.C. 119 (e) from U.S. Provisional Patent Application No. 63/188,764 filed on May 14, 2021.

TECHNICAL FIELD

The present disclosure relates generally to software for planning, development, design, construction, and asset management of real estate and digital infrastructure projects.

BACKGROUND

Current demands for real estate development, construction and zoning projects require better tools and faster communication for planning and executing on projects. Software implementations at present demonstrate very limited and slow functionality as well as limited user interface capability. For example, presenting a project and presenting the finances are often separate tasks done in separate applications that do not present a complete and organized representation of the project. The current tools are not integrated. The data held in each individual application is siloed. The application presented herein overcomes these challenges by providing a complete visual, financial, and operational representation of a project. Instead of using static documents for collaboration, the application allows real time modification of project parameters. These real time modification capabilities enable brainstorming, modification, and immediately updated data. Further, planning, design, and construction tools are not designed for managing an asset once in operation. It would therefore be advantageous to provide a solution that would overcome the challenges noted above.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 3 is an exemplary flow diagram of creating and rendering a new project.

FIG. 4 illustrates an exemplary flow diagram for generating massings, and producing ProForma and development costs.

FIGS. 7A-C and 8A-D illustrate creating one or more massings using the Drawing Tool.

FIG. 13 illustrates the Optimization Tool Public Spaces according to some embodiments.

FIG. 48A illustrates an exemplary flow diagram of generating horizontal elements.

FIG. 48B illustrates an exemplary flow diagram of generating antenna elements.

FIG. 48C illustrates an exemplary flow diagram of configuring fiber.

DETAILED DESCRIPTION

Figure 1:
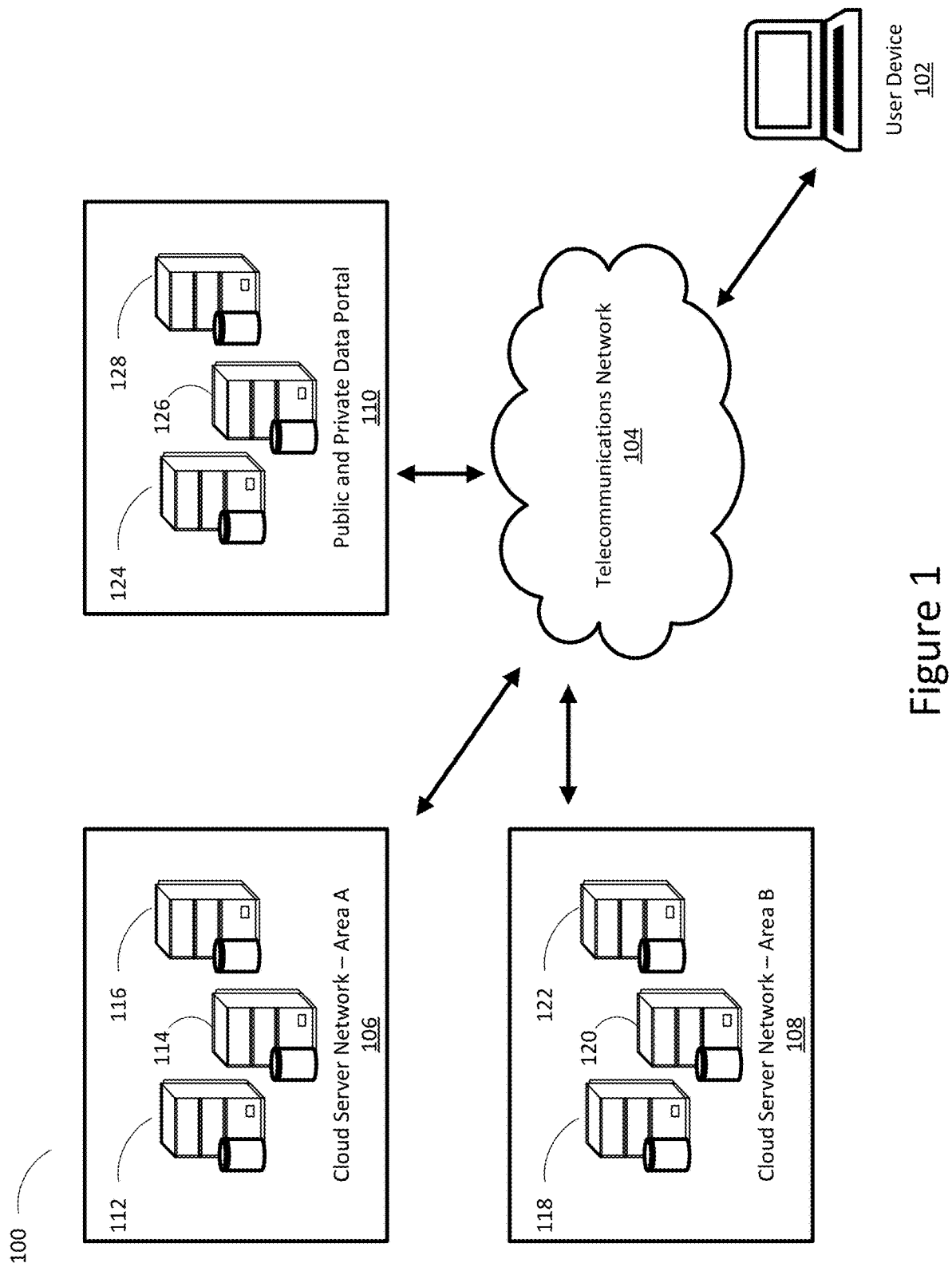
FIG. 1 illustrates an exemplary system diagram.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Disclosed herein is a system and methods where anyone, including planners, investors, developers, architects, engineers, and project managers can all demonstrate, create, and story-tell the development of buildings within a real 3D mapped topography while demonstrating the financials of one or more projects in real time. Novel methods are presented whereby the functioning of the computer is vastly improved via a highly efficient distributed system, function call and data-distributed architecture. Embodiments include vast improvements to the operations of the computer including providing Graphics Processing Unit (GPU) segmented code. For example, some embodiments include shader processing specific to highly efficient rendering of three-dimensional (3D) elements like light, shadow, and materials which are created and added during creation of the relevant object. Additional custom shaders aid in ray casting to simulate Radio Frequency (RF) wave propagation. Embodiments provide for discrete and efficient use of memory, Central Processing Unit (CPU), and GPU processing capacity as well as simultaneous utilization of cloud computing capacity for more demanding computational processing. Examples of shader specific categories may include natural elements, light, man-made and various visualizations. For example, man-made may include steel, asphalt, cement, glass, wood, brick, etc. Natural elements may include tree bark, trees, grass, leaves, etc.

In some embodiments a user device may be able to login to an account and download data specific to one or more projects. Various embodiments include code lying dormant on one or more servers and executing each function only when called. As such a serverless architecture may be used as known in the art. The functioning via dormant and controlled Application Programming Interface (API) calls enables a vast improvement to the functioning of computers in previous 3D real estate development and presentation tools.

The projects may be multi-tenant, with multiple users able to work on the same project at the same time. The distributed cloud-based architecture enables infinitely scalable capabilities in real time. User data, identity and privacy may be secured via end-to-end encryption using symmetric ciphers like Advanced Encryption Standard (AES) and/or asymmetric ciphers like Rivest-Shamir-Adleman algorithms (RSA). User data may be spliced, replicated, and geographically dispersed to separate data centers on private, end-to-end encrypted network connections. In some embodiments, users will access the nearest geographical node of the cloud network. Replication or central location of certain data may occur in accordance with General Data Protection Regulation (GDPR) of the European Union or other location based/national legal requirements.

In some embodiments, a user device may present a Geographic Information System (GIS) based User Interface with extended visualizations and functionality. The user device may enable drawing development elements like massings (buildings, residential dwellings, houses, etc.), streets and infrastructure, public spaces, parcel boundaries, sites and boundaries, contextual boundaries, landscaping, parking etc. The 3D graphical presentation processing may be distributed to the GPU utilizing, for example, a graphics library such as Web Graphics Library (WebGL) or Three.js.

User enabled drawings, massings and elements may be done on the local machine with the object data structures sent and stored on the cloud. Similarly, sun modeling and calculations including 3D animations may be done locally including positions, shadow generation and color transformations. Measurements for the length, parameters and area for various massings and elements may be calculated locally and transmitted to the cloud network server(s).

Additionally, one or more cloud server network elements may be used to perform calculations for financial data. For example, development costs, operating expenses, and proforma may be computed within the cloud network server systems. The cloud server network may present the user device with stored objects, and massings including street cross-sections, landscaping elements, template massings, etc. Business type data may also be provided by the cloud server network for capturing business types within a boundary area.

The user device may include several libraries (or code packages) capable of being called and executed for local calculations related to creation, loading, modification and visualization of 3D building massings, census data, historical maps (such as red-lining zones and disadvantaged neighborhoods, for example), zoning maps, real estate parcel maps, streets, infrastructure, design libraries (like buildings, landscaping, 5G elements, telecommunications infrastructure, public art, water features, playground equipment, and miscellaneous design elements [i.e people, cars, benches, etc.]).

Additional local libraries or code packages/capabilities include color utilities that provide color toning for simulated sunlight color changes, constructive solid geometry, basic geometry utilities (such as getting an area of triangle from a 3D geometry face), "placing" and "grouping" tools for placing elements, classification and organization, floor cutting and measurement capabilities (including dissecting massing objects into individual floors and area), latitudes and longitudes for different locations, time zone information, topography, environment asset loading, etc. Embodiments may also include a library of visualization tools made with shaders and animations to change the entire look and feel of the elements being displayed.

FIG. 1 shows an example network system diagram 100 utilized to describe the various disclosed embodiments. In the example network system diagram 100, User Device 102, and a variety of network storage and processing elements in Cloud Server Network Area A 106 and Cloud Server Network Area B 108 are communicatively connected via a Telecommunications Network 104 to additional network storage, databases and processing devices via Public and Private Data Portal 110. The Public and Private Data Portal 110 may include one or more sources of data 124-128 including public data sources as well as private data sources described below. The Telecommunications Network 104 may be, but is not limited to, a wireless, cellular or wired network, a local area network (LAN), a Transmission Control Protocol (TCP)/Internet Protocol (IP) network, a wide area network (WAN), a metro area network (MAN), the Internet, the world wide web (WWW), similar networks, and any combination thereof.

The Cloud Server Network Area A 106 and Cloud Server Network Area B 108 may be made up of any number and/or configuration of Cloud Server Network Elements 112-122 such as servers, containers, hypervisors, databases, relational database systems, cloud storage, Application Programming Interface (API) Gateways, controllers, managed data providers, open data providers/databases, serverless components, etc. A more detailed example of a Cloud Server Network Elements 112-122 is provided with respect to FIGS. 2A-B. In some embodiments, the User Device 102 may be in communication with the Cloud Server Network Area A 106 and Cloud Server Network Area B 108 for partial or full execution within the Cloud Server Network Area A 106 and/or Cloud Server Network Area B 108 in conjunction with full or partial execution of one or more applications on the User Device 102. In some examples, the novel applications described herein may execute within a web browser on User Device 102 and/or as a standalone application.

Cloud Server Network Area A 106 may be in a different geographical location from Cloud Server Network Area B 108. For example, for data redundancy and speed of network provisioning Area Cloud Server Network Area A 106 may be Los Angeles while Cloud Server Network Area B 108 may be in London. Any variety and quantity of different geographic locations may be comprehended for fast, reliable and secure resource allocation. The Public and Private Data Portal 110 may include access to databases providing real estate and financial modeling data such as the Bureau of Labor Statistics, Open Street Maps, Mapbox, satellite data providers, real estate brokers, financial publications such as Rider Levitt Bucknett (RLB), Geospatial datasets such as Earth™ by Amazon™ Web Services (AWS™). Other sources, via the Open Data Registry and the Open City Model may include Landsat 8, Next Generation Weather Radar, Terrain Tiles, SpaceNet, OpenStreetMap, National Oceanic and Atmospheric Administration (NOAA) data, etc.

Some embodiments may include 3D modeling processed on the User Device 102 as a frontend device. Some embodiments may have a Graphical User Interface (GUI) presented to a user on the User Device 102 in conjunction with part of the data storage and retrieval done in the cloud server Cloud Server Network Area A 106 and/or Cloud Server Network Area B 108. For example, user accounts, user profiles, project data, billing status, billing information and usage statistics may be stored on one or more devices in the cloud server network like a data warehouse. In another example, a relational database in the cloud server network may store financial performance reference data and American Society of Heating, Refrigerating and Air-Conditioning Engineers (ASHRAE) building performance data provided by one or more sources. Further, in some embodiments, managed data providers such as Open Street Maps, and Mapbox™ may be used to provide 3D boxes representing buildings and/or satellite data. In some examples, a user may log in and access data from various parts of the Telecommunication Network 104 such as at Cloud Server Network Area A 106 and/or Cloud Server Network Area B 108 which are geographically closest to them ensuring fastest execution of the application.

The User Device 102 may be, but is not limited to, a personal computer, a laptop, a tablet computer, a smartphone, a wearable computing device, or any other device capable of receiving and displaying notifications. The User Device 102 may present an interface as browser based, application based, Augmented Reality, Virtual Reality and API based to other applications.

Figure 2A:
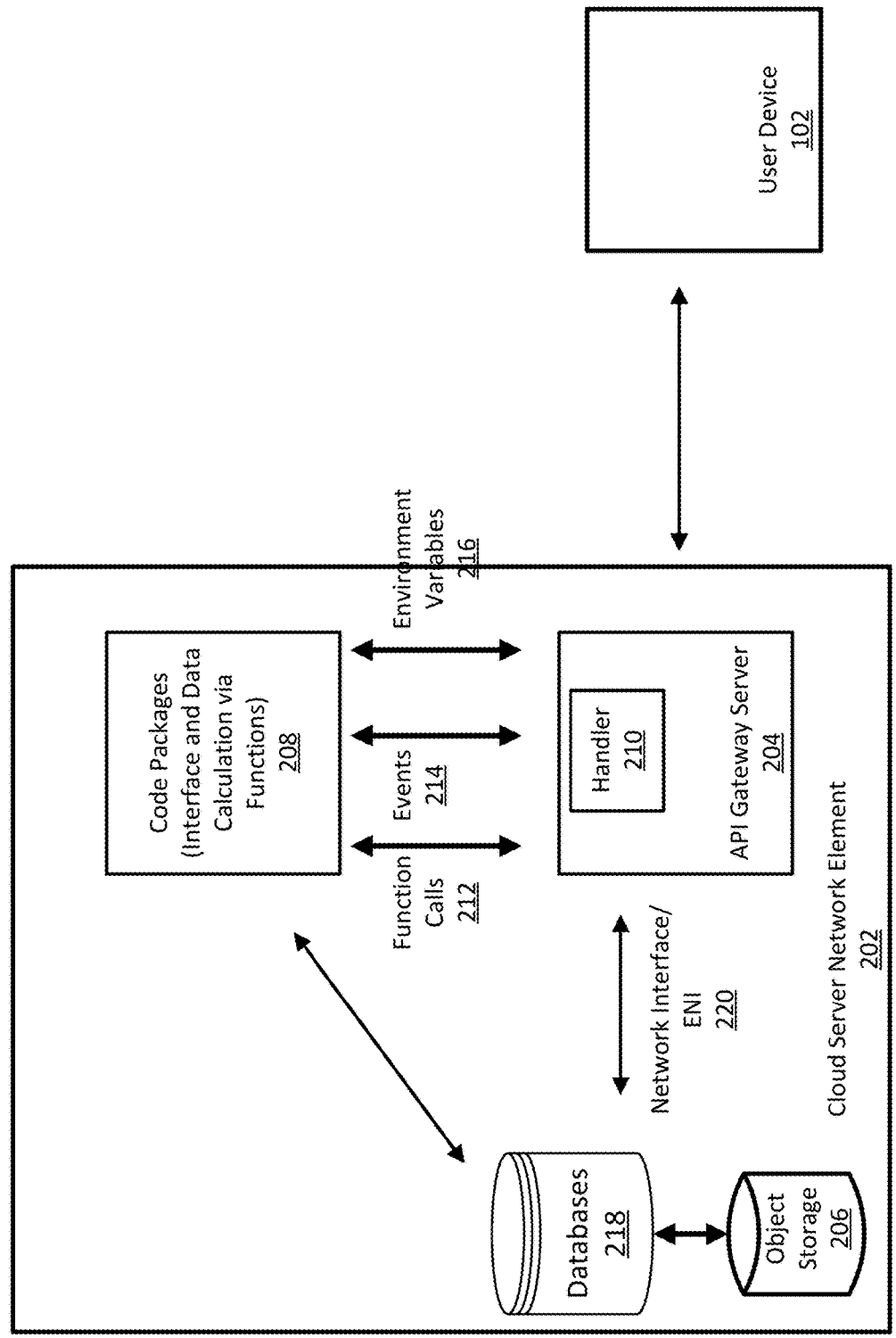
FIG. 2A illustrates a detailed cloud server network element architecture.

FIG. 2A illustrates a detailed cloud server network element architecture 200. Serverless as used herein is a term including one or more servers which include function or software execution upon being called or instantiated without provisioning specific to that function execution within a container or hypervisor. Some embodiments may include one or more API Gateways such as API Gateway Server 204 on Cloud Server Network Element 202. The User Device 102 may communicate with the Telecommunications Network 104 via one or more API Gateways on Cloud Server Network Elements 112-122. The Cloud Server Network Element 202 may include one or more Object Storages 206. The Object Storage 206 may include storage for several elements including project object files, project images, Portable Document Files (PDF), location GIS-type data maps, map tiles, JavaScript Object Notation (JSON) files, application files, stock drop-in building files, stock drop-in landscaping files, stock drop-in street profiles files, stock drop-in intersections files, stock drop-in infrastructure files, stock drop-in vehicles files, and stock drop-in features, for example. Similarly, the Object Storage 206 may store Collaboration Items, History Files, History Items, Object Files, Active User List, etc as described further below.

The API Gateway Server 204 may be accessed via Hypertext Transfer Protocol (HTTP) APIs, Representational State Transfer (REST) APIs and/or WebSocket APIs, for example. The serverless architecture may include a cloud computing execution provider where the cloud allocation and provisioning of servers is dynamically managed. A serverless application or set of functions may execute in a stateless environment that is event-triggered. The User Device 102 may provide access to the serverless system via known system API's.

In some embodiments, Code Packages 208 may be accessed via the API Gateway Server 204. The Code Packages 208 may include classes, libraries, binaries and other function capabilities that are executed when Handler 210 is invoked by the API Gateway Server 204. The Handler 210 may create a runtime environment belonging to Code Packages 208. Other functions and methods may be called and executed when Code Package 208 is requested.

In some embodiments, Handler 210 may receive an Event Object 214 including data and/or metadata needed by Code Package 208. For example, an event created by the API Gateway Server may contain details related to an HTTP request made by the User Device 102 such as path, query string and request body. Examples of Events 214 may include:

Launching the application including validating credentials in the cloud.

Downloading the user application package.

The user selecting a development project.

The user beginning a new project.

Project edits.
  a. Edits may be saved automatically and simultaneously as other users. By saving locally to a data file such as a JSON file. The data file may be copied and mirrored in the cloud server network. Any act or edit such as building a massing, placement of landscaping, streets or infrastructure, clicking a data point, modifying numbers or data, etc. may be sent to the cloud.

Batch movements of data.

Project history tool edits—an edit list of every edit made (for example, the data file such as a JSON file) may be created, updated and stored.
  b. Edit list may be stored locally and mirrored in the cloud
  c. When the history is scrolled, and a user selects an edit point the system may recall the data from that edit state
  d. Going to different points in the history of a project Messaging events:
  e. A user may identify a history change event and message another user about that specific change, for example.

Viewing and markup events:
  f. Full screen capture.
  g. Segment capture.
  h. Lines drawn.
  i. Circles drawn.
  j. Polygons drawn.
  k. Saved.
  l. Shared with other users for collaboration.

Commenting events; a user may go to any object in the project and:
  m. Make a marker.
  n. Make a comment.

User activated data change events such as:
  o. Event broadcast (Multicast): The same change is automatically pushed to other users (via a data file such as a JSON file, for example) when the user makes the change.
  p. When an existing project is opened by multiple users:
    i. A back-end cloud server such as Cloud Server Network Element 202 may recognize multiple users.
    ii. Cloud Server Network Element 202 may open a JSON file congruently to all users with opened files.

In some embodiments, one or more Context Objects may be created and used by the Code Packages to execute appropriately within its environment. For example, the Context Object may include Request Identifications used to track invocations of functions within the Code Packages, logging, remaining time (before timeout), etc.

In some embodiments, the Code Packages 208 may include libraries with functionality such as cryptography, image processing, financial modeling, 3D rendering and drawing capabilities, etc. these functions may be called via Function Calls 212. In some embodiments, the Code Packages 208 may deploy and process requests within milliseconds providing a faster, more reliable solution and improvement to the functioning on the computer. In some embodiments, the Code Packages 208 may access the one or more Databases 218 via the API Gateway Server 204.

The Code Packages 208 may include one or more Environment Variables 216 used in processing and executing the Code Packages 208. The Environment Variables 216 may be used for processing authentication and to enable distributed processing functionality and capabilities. Examples of Environment Variables 216 may include, for example:

User authentication data and requirements. Based on license type indicative of what functions a user has access to.

Geographical location of a user. The geographical location may be used to determine the closest Cloud Server Network Area 106-108.

User Device 102 characteristics such as:
  a. Browser
  b. Operating system type and version
  c. Random Access Memory (RAM)—total and amount free for use
  d. GPU speed, model and memory
  e. CPU speed, model and memory The User Device 102 characteristics may be used to flexibly execute some of the functions based on the User Device 102 capabilities. For example, a user may take several photo captures of a scene, the rendering can be done on the Cloud Server Network Element 202.

Some embodiments may use an Elastic Network Interface (ENI) 220 in place of a regular TCP/IP connection. The ENI 220 may include a logical networking component that represents a virtual network card. It may include, for example:

A primary private IPv4 address from the IPV4 address range of a Virtual Private Cloud (VPC).

Figure 2B:
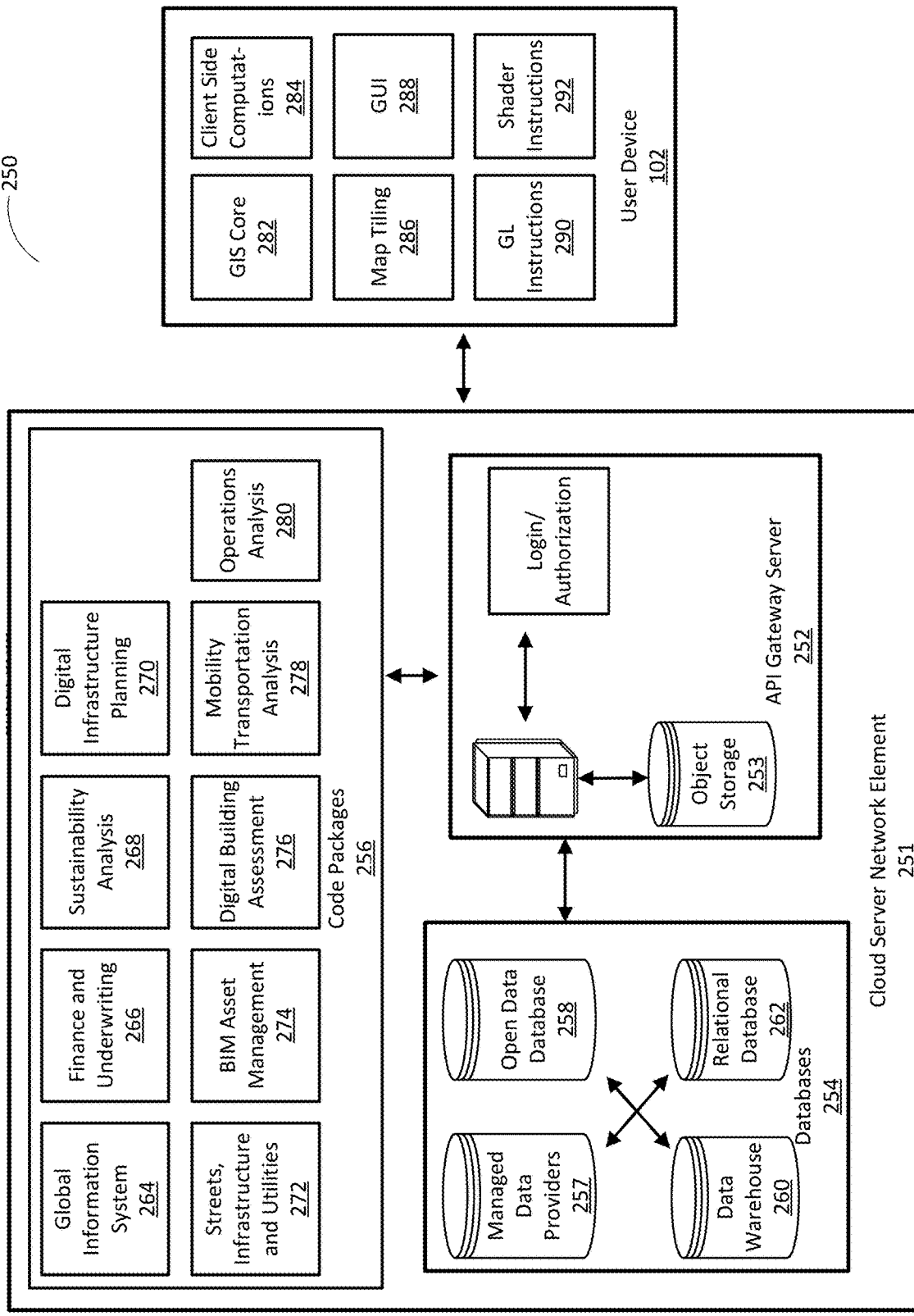
FIG. 2B illustrates an exemplary detailed Cloud Server Network Element Interface

One or more secondary private IPv4 addresses from the IPV4 address range of a VPC One Elastic IP address (IPv4) per private IPv4 address One public IPv4 address One or more IPv6 addresses One or more security groups A Medium Access Control (MAC) address A source/destination check flag and/or A description FIG. 2B illustrates an exemplary detailed Cloud Server Network Element Interface 250. As illustrated the Cloud Server Network Element 251 may comprise an API Gateway Server 252, Databases 254, and Code Packages 256. The API Gateway Server 251 may include a controller which communicates with one or more databases. Databases 254 may include Relational Database 262 which stores and provides financial performance reference data as well as ASHRAE building performance data, for example. Data Warehouse 260 may store and provide user accounts, user profiles, projects, billing status, billing data, and user usage statistics. Further, Data Warehouse 260 may store Building Program Data, Building Cost Data, Infrastructure Cost Data, Financing Data, Revenue Data, Operations Cost Data, Landscaping Data, Property tax data, Sales tax data, City/special tax data, Employment data, Energy data, Water data, Waste data, Zoning data, Census/income data, Parking data, Residential type and location data, Business type and location data, Public transportation and traffic data.

One or more instances of Open Data Database 258 may also be provided. Additionally, one or more instances of Managed Data Provider 257 databases may be used which provides storage and access for Open Street Maps, Mapbox and other satellite data providers, as well as 3D boxes and tiling representing buildings. Code Packages 256 may include any code or functionality as discussed above. Examples of code packages may include:

Global Information System 264 (GIS) functionality including:
  a. Ingesting data sets that are in GIS file formats. For example, Keyhole Markup Language (KML) files, Shape files (Environmental Systems Research Institute format). Comma Separated Value (CSV) file exports. These file types may be imported/ingested on the system. The GIS 264 code package may then allow users to assign the data to specific layers and add data systems in specific ways into their projects.
  b. In some embodiments, a drag and drop within the interface may initiate and execute complete processing.

Finance and Underwriting 266 functionality including:
  a. Financial modeling and calculations.
  b. Price per square feet, revenue per square foot (RPSF), vacancy rate, operating expenses, cost of architects and engineers may be auto populated for projects and various geographic regions.
  c. The financial and underwriting data may auto populate from external data sources via a request or download. Proforma may be built using various sources such as:
    i. REIS (Moody's) provides RPSF, vacancy and Operating Expenses (OpeX)
    ii. RSV-construction costs data
  d. Building financial models automatically for projects.
  e. Automatically calculating area of the building when building a massing, based on area and height of the building and extrapolating all of the building costs.
  f. Automatically calculating the height of the area based on the height, and square foot of an area.

Sustainability Analysis 268 functionality including:
  a. Net zero modeling planning for sustainability functions based upon energy modeling. For example, the Department of Energy (DoE) may be accessed via their open-source tools.
  b. Incorporating DoE Energy Plus Energy modeling, and Green House Gas Modeling tool, Energy Utilization Intensity tool.
  c. Modeling the energy consumption, greenhouse gases, carbon footprint, and all factors around building when doing all of the development or modeling and placing it on the project. Major processes may be computed via Code Packages 256 saving resources, and calculations.

Digital Infrastructure Planning 270 functionality including:
  a. Placing fiber throughout a development area.
  b. Placing cell towers.
  c. Placing and using digital infrastructure and telecommunications infrastructure.
  d. Performing financial modeling for underwriting.

Streets, Infrastructure and Utilities 272 functionality including:
  a. Creating street level profiles with lane widths, bike lanes, curbs and sidewalks.
  b. Creating below street infrastructure such as sewer, water main, gas main, dry utilities, high pressure water distribution and other utility infrastructure.
  c. Performing financial modeling for underwriting.

Building Information Modeling (BIM) Asset Management 274 functionality including:
  a. Tracking assets.
  b. Using Post-GIS database that can track where everything is in a GIS world.
  c. Performing facility management and assets management.
  d. With a physical object, such as air handling unit, park bench, any physical object, all documentation associated with it, like owner's manual, the sequence of operations for an air handling unit, all the associated data and documentation is tagged to the same asset. The asset in the real world has a QR code.
  e. QR code or associated identifier can pull up all data and documentation associated with the asset in the tool.

Digital Building Assessment 276 functionality including:
  a. Establishing digital infrastructure including telecom/fiber pathways into the building and vertical risers serving each floor.
  b. Building IP network design components and documentation
  c. Building systems and applications to support operational functionality and asset management.
  d. Performing financial modeling for underwriting.

Mobility Transportation Analysis 278 functionality including:
  a. Reviewing Isochromes.
  b. Looking at travel times for different modes of transportation. For example, in 15 minutes how far can you get in a car, train, light rail, bus, bike.
  c. Analyzing the amount of people/traffic for each building and the impact on local transportation systems.

Operations Analysis 280 functionality including:
  a. Calculating OpEX in a granular way, for:
    i. Management fees
    ii. Capital reserve for capital improvements
    iii. Maintenance
    iv. Engineering
    v. Snow removal/landscaping
    vi. Parking lot management
    vii. Fitness center management
  b. All incorporated together to have a financial model for all these elements
  c. Operations Analysis 280 may download costs based upon market segment and geographic location from databases, insert and calculate into financial models.

Further, the User Device 102 may be capable of downloading and executing certain functionality such as GIS Core capabilities 282, various mathematical or drawing computations in Client-Side Computations 284, Map Tiling 286, Shader Instruction 292 execution, Graphical User Interface (GUI) 288 presentation and Graphics Language (GL) specific instruction execution 290.

FIG. 3 is an exemplary flow diagram of creating and rendering a new project 300. In step 302 one or more Cloud Server Network Element(s) 202 and/or 251 may download and aggregate data from multiple sites. This assembling may be done on a periodic basis such as hourly, daily, weekly, monthly, etc. The one or more Cloud Server Network Element(s) 202 and/or 251 may compute averages of certain data. For example, the Cloud Server Network Element(s) 202 and/or 251 may download the hard and soft costs for every city, zip code, territory or area in the world from certain data sources. For example, the costs from Cumming, RLB and/or Engineering News Record (ENR) may be downloaded, averaged and stored on the network server element(s). Similarly, capitalization rates or interest rates, taxes, demographic and census data may also be downloaded and stored for fast retrieval. The data may be distributed to network server element(s) over several geographic regions for faster access.

In step 304 the user may log in. The user may be verified and his/her access privileges may be checked via the Cloud Server Network Element(s) 202 and/or 251. The project list may be retrieved from a geographically close location based on where the user logs in from. The User Device 102 may store and transmit environment variables as mentioned in FIG. 2A for login verification. The project list may be presented to the user for selection.

The User Device 102 may submit the user's username, password, device information, IP address and location to the login/authorization function on the API Gateway Server 204 which may communicate with the Handler 210. The Handler 210 may extract or create a login event and request the appropriate code package based on this event. The Environment Variables 216, such as User Device 102 characteristics may be analyzed in the login/authorization function to identify which capabilities or functions should be allocated for the User Device 102. A list of projects may be extracted from the Data Warehouse 260 and transmitted to the User Device 102. In some embodiments, the list may be downloaded from Object Storage 206.

In step 306 the user may select a project or begin a new one. A list of projects where multiple users have access in real-time, may be presented to the user. Any of planners, investors, developers, architects, engineers and project managers can all demonstrate, create, and story-tell the development of buildings. Therefore, the variety of access, privileges, and viewing and editing capabilities may vary by user and project.

In some embodiments when a project is created as a new project, a project creation event may be transmitted to the API Gateway Server 204/252 where the appropriate Code Package 208/256 is called and executed to create the new project. The new project may use the included Environment Variables 216 and user information provided in the request. An application download event may be created after the new project is created, or an existing project is requested to be retrieved.

In step 308 the Cloud Server Network Element(s) 202 and/or 251 may push a package containing one or more Client Applications to the User Device 102 for local access. The Client Application(s) may include several items such as the updated GUI 288, the 3D Visualization Engine including shader/GPU segregated code and animations (Shader Instructions 292), and User Device 102 application computation functions 284. The 3D Visualization Engine may include satellite Map Tiling 286 specific to the project's location as well as topographical information. In this way computation by the User Device 102 is much faster as less data is needed to process the 3D visualizations of any location.

In step 310 the Satellite, Topographical and 3D Map may be loaded onto the User Device 102. The topographical curvature of the renderings may be provided via exact latitude (x), longitude (y), and height above sea level (z) coordinates of each pixel, block, macroblock, slice, etc. in order to create an accurate rendition of the topology and buildings. Each satellite image tile may be drawn relevant to that location creating a full three-dimensional picture of the city or locale chosen.

In step 312 an exact location within the geographic location may be selected or zoomed in upon by the user. The user may zoom in on an area. A zoom or location change Event 214 may be transmitted to the API Gateway Server 204/252 for appropriate code extraction and processing. For example, initially a city may be displayed and then the user may drag to a point where an actual real estate development plan or project is intended to be created. The exact location may be sent in conjunction with a move or zoom Event 214 to the API Gateway Server handler. In step 314, the exact contextual 3D mappings may be drawn based upon the user's data and stored object files downloaded in steps 312 and 308.

FIG. 4 illustrates an exemplary Object File (Obj) 402 for a project or one or more massings. When the precise location is zoomed in on, then the User Device 102 may draw the remaining 3D specific buildings created in the project after downloading them in step 312.

In step 316 the geographically specific equation variables may be loaded on the User Device 102. The geographically specific variables may include Revenue Per Square Unite (PSU), Operating Expenses PSU, Development Costs PSU, taxes, etc.

The geographically specific equation variables may be used to calculate development costs, proforma, net operating income, etc. specific to that geographic area and project. The development costs, proforma, net operating income, etc. may be updated using updated figures from the relational Database 262, Open Data Database 258 and Managed Data Providers 257. The API Gateway Server 204/252 may initiate a financial data update event calling the appropriate Code Packages 256 to update based on changes since the previous login. For example, some data such as interest rates, soft costs or hard costs may have changed since the last login. Therefore, the financial projection data may be updated by the API Gateway Server 204/252.

In step 318 the infrastructure and streets elements may be drawn. This may include street lights, benches, data fiber, cables, sidewalks, lanes, lane dividers, entrance ramps, etc. In step 320 the GIS data including parcels, and zoning may be drawn and presented to the user. For example, boundaries, highlighted areas, etc. may be drawn. GIS elements/data may be stored on the cloud as well including data sets, zoning information, parcel lots, maps, census data, migratory data (animals and insects), for example.

In step 322, the base 3D topography and tiles, 3D massings and elements, and GIS layer data may be provided for shader segmented/specific processing. In one example, shader specific code may include one or more of the following:

1. Light, shadows and reflections.
2. Natural materials like tree bark, trees, grass, leaves, etc.
3. Man-made materials like steel, asphalt, cement, glass, wood, brick, etc.
4. Visualization such as 5G coverage areas and infrastructure pathways below the street.

Additional shader capabilities may include:
a. Turning buildings into wireframes
b. Affecting objects and buildings to be translucent and/or partially see through.
c. Showing various fiber routing highlighted inside of buildings.
d. Making streets transparent to show underground infrastructure.
e. Overlaying isochrones of data/heat maps.
f. Projecting sun motion and shadowing paths.

Each one of these elements may be processed separately from the drawing steps above and taken care of by the GPU. For example, shadows and reflections creating a more 3D realistic representation may be segmented from the base CPU processed code creating a much faster and smoother experience viewing 3D topographies. Similarly, natural elements which may take up millions of variations including realistic interpretations may be processed independently to make a faster more realistic depiction of the real estate development project location. The steel, bricks, glass etc. may be drawn using the shader capabilities of the GPU enhancing greatly the rendering process of the project animation.

Figure 5:
FIG. 5 illustrates a Graphical User Interface Desktop Example, according to some embodiments.
Figure 6:
FIG. 6 illustrates a Graphical User Interface Desktop Example, according to some embodiments.

In step 324 the User Device 102 may present the GUI. The GUI may include several or all of the elements as depicted in FIGS. 5 and 6. In one embodiment, the left hand (as illustrated) may include storytelling tools or enablers for explaining a development of the project including financials and various projections. In other embodiments, the right side (as illustrated) may include drawing, placement, and optimization tools (among others) to create, modify, and enhance projects while in development or planning. Other layouts and configurations may be considered. For example, an interface dedicated to financials may be presented. Similarly an interface dedicated to design of elements separate from the financials or storytelling tools may also be considered.

FIG. 4 illustrates an exemplary data structure, according to some embodiments. Object File 402 is an exemplary embodiment of a data structure, which may include for example, attribute-value pairs as well as one or more array data types as needed. The data structure may be a JSON file, Extensible Markup Language (XML), or another Markup Language file in some instances. Additional examples of data structures that may be used include linked lists, graphs, binary trees, objects, dictionary, struct, etc. For example, one or more of the following may be part of the data structure as attribute-value pairs or array data types:

Location, including, for example:
  a. Street number
  b. Street name
  c. Zoning plot number or identifier
  d. City
  e. Country
  f. Territory
  g. World Coordinates/Latitude and Longitude in degrees
Parcel (land parcel with geolocation information), for example:
  a. Coordinates of end points as added in design.
Building—with a summary of all of the metadata attributes, for example:
  a. Massings list-large, segregated portion of a building (such as a podium or tower) with metadata attributes including, for example:
    i. A specified program or category
      1. The program may be related to physical space for example:
        a. Residential
        b. Office
        c. Retail
        d. Parking
        e. Industrial
        f. Hospitality
        g. Healthcare
        h. Institutional (museum, courthouse, city hall, etc.)
        i. Other programs, based upon what is added
      2. Category may be for systems and assets, such as Heating, Ventilation and Air Conditioning (HVAC), Information Technology (IT), digital assets, etc.
    ii. Number of floors, and for each floor:
      1. Units
      2. Space including:
        a. Type
        b. Room Number
        c. Zone Object File 402 in FIG. 4 illustrates an exemplary data structure including the fields that may be included. The right side of FIG. 4 illustrates a detailed example including Project Name, Language, City, State, Building List, etc. The data structure may be a JSON file, Extensible Markup Language (XML), or another Markup Language file in some instances. Additional examples of data structures that may be used include linked lists, graphs, binary trees, objects, dictionary, struct, etc.

Another exemplary data file includes:

```
{
  "project":{
    "name":"string",
    "id":87686876,
    "last_saved":1566331937.
    "created":1566331936,
    "owner":3907239847,
    "account":2123123123,
    "lat":35.34234234,
    "lng":45.2131231
  },
  "team"{
    {
      "name": "Harrison Wilts"
      "id":093897492347293847
    },
    {
      "name": "David Wilts"
      "id":098210983123123
    },
    {
      "name": "Renee Cortez"
      "id":87125637612537263
    }
  }
  "massings":[
    {
      "type":"building",
      "location":{
        lat:31.534460,
        lng: 74.350597
      },
      "floor_height":12,
      "rotation_adjust":[0,90,0],
      "name":"My Building",
      "uri_location":"//example",
      "asset_id":3242343423,
      "unit_of_measure":"meters",
      "physical_overrides":{
        "height_adjustment":100,
        "offset_zero_position":[-20,0,10],
        "far_override":1.2
      },
      "calculation_overrides":{
        "sales_tax":0.06
      },
```

```
"floors":[
  {
    "type":"parking",
    "level":3,
    floor_height:18
    "grade_elevation" :-54,
    "program":[
      {
        "type":"parking",
        "percent_of_floor":0.9,
        "geometry":{
          "square_meters":900
        },
        "calculation_overrides":{
          "minimum_blue_phone_count":1.2
        }
      },
      {
        "type":"pump_room",
        "percent_of_floor":0.05,
        "geometry":{
          "square_meters":50
        },
        "calculation_overrides":{
          "acoustic_isolaton_dB_max":1.2
        }
      }
    ],
    "hvac_zones":[
      "name":"zone_1",
      "geometry":{
        "square_meters":20
      }
    ]
  },
  {
    "type":"main",
    "level":2,
    "grade_elevation":24,
    "program":[
      {
        "type":"bathroom",
        "percent_of_floor":0.1,
        "geometry":{
          "square_meters":40
        },
        "calculation_overrides":{
          "minimum_toilet_count":1.2
        }
      },
      {
        "type":"kitchen",
        "percent_of_floor":0.1,
        "geometry":{
          "square_meters":40
        },
        "calculation_overrides":{
          "acoustic_isolaton_dB_max":0.8
        }
      }
    ],
    "hvac_zones":[
      {
        "name":"zone_1",
        "geometry":{
          "square_meters":20
        }
      },
      {
        "name":"zone_2",
        "geometry":{
          "square_meters":20
        }
      },
      {
        "name":"zone_3",
        "geometry":{
          "square_meters":15
        }
      },
      {
        "name":"zone_4",
        "geometry":{
          "square_meters":10
        }
      },
    ]
  }
]
},
{
  "type":"Obtuse Building",
  "name":"My Building",
  "locaton":{
    lat:31.534460,
    lng: 74.350597
  },
  "rotation_adjust":[0,90,0],
  "uri_location":"//example",
  "asset_id":3242343423,
  "unit_of_measure":"meters",
  "physical_overrides":{
    "height_adjustment":100,
    "offset_zero_position":[-20,0,10],
    "far":1.2
  },
  "calculation_overrides":{
    "sales_tax":0.06
  },
  "floors":[
    {
      "type":"parking",
      "level":3,
      "grade_elevation":-48,
      "program":[
        {
          "type":"parking",
          "percent_of_floor":0.9,
          "geometry":{
            "square_meters":100
          },
          "calculation_overrides":{
            "minimum_blue_phone_count":1.2
          }
        },
        {
          "type":"pump_room",
          "percent_of_floor":0.05,
          "geometry":{
            "square_meters":50
          },
          "calculation_overrides":{
            "acoustic_isolaton_dB_max":1.2
          }
        }
      ],
      "hvac_zones":[
        "name":"zone_1",
        "geometry":{
          "square_meters":100
        }
      ]
    },
    {
      "type":"main",
      "level":2,
      "grade_elevation":-24,
      "program":[
        {
          "type":"bathroom",
          "percent_of_floor":0.2,
          "geometry":{
            "square_meters":20
          },
          "calculation_overrides":{
            "minimum_toilet_count":1.2
          }
        },
```

```
{
"type":"kitchen",
"percent_of_floor":0.1,
"geometry":{
    "square_meters":20
},
"calculation_overrides":{
    "acoustic_isolaton_dB_max":0.8
}
}
],
"hvac_zones":[
{
"name":"zone_1",
"geometry":{
    "square_meters":50
}
},
{
"name":"zone_2",
"geometry":{
    "square_meters":40
}
},
{
"name":"zone_3",
"geometry":{
    "square_meters":60
}
},
{
"name":"zone_4",
"geometry":{
    "square_meters":100
}
},
]
}
],
"contexts":[
    "structures_uri":"//example",
],
"roads":{
    "roads_uri":"//example"
},
"parcels":[
{
"address":"address",
"lat_lng_center":{
    lat:31.534460,
    lng: 74.350597
},
"source":"//example.kml",
"calculation_overrides":{
    "max_external_dB":50,
    "minimum_setback":10,
}
},
{
"address":"address",
"lat_lng_center":{
    lat:31.534460,
    lng: 74.350597
},
"source":"//example.kml",
"calculation_overrides":{
    "max_external_dB":50,
    "minimum_setback":10,
}
},
{
"address":"address",
"lat_lng_center":{
    lat:31.534460,
    lng:74.350597
},
"source":"//example.kml",
    "calculation_overrides":{
    "max_external_dB":50,
    "minimum_setback":10,
}
},
{
"address":"address",
"lat_lng_center":{
    lat:31.534460,
    lng:74.350597
},
"source":"//example.kml",
"calculation_overrides":{
    "max_external_dB":50,
    "minimum_setback":10,
}
}
],
"boundaries":[
{
    "layer":"project_boundary",
    "project_area_uri":"//example.geojson",
    "type":"multipolygon"
},
{
    "layer":"site_boundary",
    "project_area_uri":"//example.geojson",
    "type":"multipolygon"
}
],
"global_calculation_overrides":{
    "office_occupancy_density_max":4
}
}
```

FIG. 5 illustrates a Graphical User Interface Desktop Example 500, according to some embodiments. As illustrated a user can see a photorealistic example topographical image depicting a city, neighborhood or geographical area in 3D. The appropriate topography or contours are also generated and presented as part of the 3D interface. The left side of the screen presents several Storytelling tools for users to present project, financial, and planning data. The right side of the screen includes several tools for creating buildings, massings, parcels, etc. and planning for the financial data as presented via the Storytelling tools. Some of the Storytelling tools may include:

Community
Profile
Program
Curation
Zoning and Floor Area Ratio (FAR)
Public Spaces
Site Activation
Mobility
Parking
Streets and Infrastructure
Stewardship
Utilities
Economics
Risk and Resilience
Internet of Things (IoT) and Digital Tools
Phasing and Scheduling
Pro Forma and Valuations
Amortization and Waterfall
Development Costs
Operating Expenses (OpEx) and Income.
NIMBY and YIMBY
   a. NIMBY and YIMBY are terms for individuals who are either against a project (Not In My Backyard- NIMBY) or individuals who support a project (Yes In My Backyard-YIMBY).

The Community tool may share a profile of the community, providing context for the project. The Community cross-section information may include, for example:
- Discretionary income
- Jobs: design, construction, and steady-state
- Taxes: property, sales, income, and parking
- Number of residents
- Number of homes/residences
- Number of businesses
- The amount of office space
- Amount of retail space
- Number of parking spaces
- Number of commuters The Program tool may provide an overview of the development program, individual portions of massings may be highlighted or glowing by program, along with a reference table/UI. The reference table/UI may include:
- Program Types (automatically populated based upon the buildings in the project), for example:
  - a. Residential
  - b. Office
  - c. Retail
  - d. Parking
  - e. Industrial
  - f. Hospitality
  - g. Healthcare
  - h. Institutional (museum, courthouse, city hall, etc.)
  - i. All of the other programs, based upon what is added
- Design evolution with drivers of changes story/timeline The Curation tool may include a complete cross section of a neighborhood with a profile of what the community will evolve into in the future, with reference target profiles from other geographical areas.

The Zoning and FAR tool may include a summary of zoning and contextual neighborhood information including:
- Presentation of current zoning allowances and anticipated variances that may be required for the project
- Glowing/highlighted assets showing data w/FAR
- Glowing visualization of FAR for project buildings (either smaller, larger massing with lower opacity, or, showing exact size)

The Public Spaces tool may include a data set which highlights all of the different public spaces within the project. Additional public spaces near the project may also be included. Data sets with visualization include:
- The number of trees
- Area of shade canopy
- Grass areas
- Planting areas
- Carbon sequestered
- Oxygen produced Site Activation can share the various Site Activation elements of the project or location including:
- Each site activation element may be a selectable tab with its name
- The camera view will reposition itself to the saved camera position for each element.
- The presentation will include any of the following about the element:
  - a. User-created text description
  - b. User-loaded images showing similar or reference examples
  - c. User-loaded 3D model of the element
  - d. If movement is possible, user loaded video or animation The Mobility and Parking tools may share the story of multi-modal transportation for the location. This tool selects and highlights the appropriate layers within the map and project, including:
- a. Glowing map showing bus routes and bus stops
- b. Glowing map showing light rail routes and stops
- c. Glowing map showing metro rail routes and stops
- d. Glowing map showing bike lines and bike paths
- e. Glowing map showing bike parking spots (user entered)
- f. Glowing map showing bike share locations and availability
- g. Glowing map showing distance/time to nearest main travel hubs:
  - i. Airport(s)
  - ii. Regional rail station(s)
- h. Isochrones of travel times by mode
  - i. Walking
  - ii. Bicycle
  - iii. Bus
  - iv. Light rail
  - v. Metro rail
- i. Number of trips generated, existing and new
- j. Approach to reducing burden on local parking and traffic (if applicable) with user-entered plan for diversified approach to car use and alternate solutions The Mobility and Parking tools may also share relevant, contextual parking information, including:
- a. Glowing total quantity of parking spaces throughout project
  - i. Different parking areas in different buildings and lots may be grouped together and named by the user. Each will automatically be assigned a different shading color.
- b. Identifying existing and new spots
- c. If real-time data via APIs are available, that data may be shown by lot or building
- d. Approach to code requirements (if applicable) with user-entered perspective on code and approach
- e. Approach to reducing burden on local parking and traffic (if applicable) with user-entered plan for diversified approach to car use and alternate solutions The Streets and Infrastructure tool may share the street design parameters and compliance with various community/neighborhood planning requirements
- a. Street design and walkable community compliance
- b. Features and cross-sections
- c. Infrastructure overview based upon what is included and what is existing.

The Environment tool may provide a comprehensive overview of the environmental and stewardship opportunities presented by the development and district (if applicable), including:
- a. The data is presented in a "normal" and "granular" format, depending upon how detailed is appropriate for the audience
- b. Includes Greenhouse Gas (GHG), carbon footprint
- c. Includes Energy Utilization Intensity (EUI) for Energy Star, Leadership in Energy and Environmental Design (LEED), Living Building Challenge, etc.
- d. Includes water and waste
- e. Includes EUI reduction if district utilities are incorporated into the project
- f. Certifications being pursued The Digital Masterplan Stack, consisting of:
  a. The Horizontal fiber and Internet Service Provider (ISP) connectivity
  b. The Vertical pathways and infrastructure within buildings
  c. The cellular opportunity with both Citizens Broadband Radio Service (CBRS)—Spectrum as well as 5G technology deployments
  d. The development's IP/WiFi network
  e. Systems and Asset Management Applications
  f. The Common Data Environment and UrbanOS
    i. Driving the digital economy
    ii. Open data portal
  g. Applications+The Community Experience
    i. Residential
    ii. Office
    iii. Retail
    iv. Site
    v. Partners (like Nokia, Amazon, etc.)

The Operations tool, consisting of: How the property or district will be run and by whom
  a. Community development association
    i. Security
    ii. Digital Technology
    iii. Operations Center
    iv. Property Management
    v. Facility Management
    vi. Asset Management The Utilities and TIF tool may provide an overview of a development program, individual portions of massings and glowing by utility infrastructure type, along with a reference table/UI interface including:
  a. TIF case
  b. Utilities capacities context
  c. Explains the use of district utilities (if applicable)
  d. City capacity expansion (if applicable)
  e. Public utility expansion (if applicable)
  f. Summary view of utilities capacity, project requirements (if entered and known from the utilities optimization section), and potential costs that could be covered by TIF The Economics tool may include all of the financial data around the project including:
  a. Jobs: full time (post construction), design, and construction
  b. Taxes Generated: real estate, sales, parking, hotel, income
  c. Discretionary spending increase
  d. TIF Stuff
  e. Project budgets (when desired by owner)

The Risk and Resilience tool may include Asset values are being undermined by climate change, particularly in coastal and water flood areas. This has always been the case with seismic areas as well. Embodiments may include public sector maps where available; such as the Army Corps of Engineers in the U.S.
  a. Flooding impacts
  b. Seismic areas
  c. Back-up systems for utilities
  d. Back-up systems for data continuity
  e. First responder action plans The Phase and Schedule tool may provide an overview of the project phasing and schedule with features such as:
  a. A "scrub tool" across the bottom of the screen representing the project timeline
  b. The scrub tool also shows project phases across the bottom as well as with glowing colors in the assets themselves
  c. A "time lapse mode" where the entire project is animated like a time lapse video, showing buildings coming down, going up, and parks coming in
  d. Proforma data may be superimposed if desired, depending upon the audience The ProForma and Valuation tool may summarize the underwriting of the project
  a. By asset class and/or individual assets
    i. Technology Assets:
      1. Fiber infrastructure and services
      ii. Vertical infrastructure and services
      iii. 5G infrastructure and services
      iv. CBRS spectrum and services
      v. IP+WiFi Network and services
      vi. Systems+Asset Management Applications
      vii. Community Experience Applications
  b. Office assets The Amortization and Waterfall tool may provide a complete overview of the positions for the equity and debt investors for the project including:
  a. Tranches
  b. Equity positions and amortization
  c. Debt/loan positions and amortization
  d. Waterfall The Development cost tool may summarize the development costs for the project including:
  a. Hard costs, by building, massing, and program
  b. Soft costs by building, massing, and program The Operating Expense and Income tool may share the Revenue, Operating Expense and Net Operating Income with the User Device 102.

FIG. 6 illustrates another Graphical User Interface Desktop Example 600, according to further embodiments. As illustrated, in green are several massings and buildings developed and created using the drawing tools. Graphical User Interface Desktop Example 600 illustrates another exemplary interface similar to FIG. 5. Graphical User Interface Desktop Example 600 illustrates green massings added in contrast to FIG. 5 which only presents an exemplary high-level interface.

FIGS. 7A-C and 8A-D illustrate creating one or more massings using the Drawing Tool. Any of several 3D Buildings may be created according to some embodiments. A Building can be a single 3D Massing, or, multiple Massings that are created on top of one another which are automatically combined into a single Building. 3D Buildings may be imported as Autodesk®, or Sketchit files, for example. 3D Buildings may also be created in applications such as 3D Studio Max® or Blender® and imported as an Object File 402. Contextual 3D models may be automatically loaded as well.

Contextual 3D models may match the building footprint and height and may be provided for context. They may be removed individually and replaced with new or imported Buildings, in some embodiments. Financial and underwriting tools/capabilities can compute each Massing's data individually. This allows each Massing to have a different Program combination, DevCost, OpEx and Income, and Amortization and Waterfall.

In one embodiment, a new Building is created with a Draw Tool, for example:
  In the right-hand menu a user may press the 'Create' button and choose 'Building' to launch the Draw Tool in FIG. 7A.

Figure 7B:
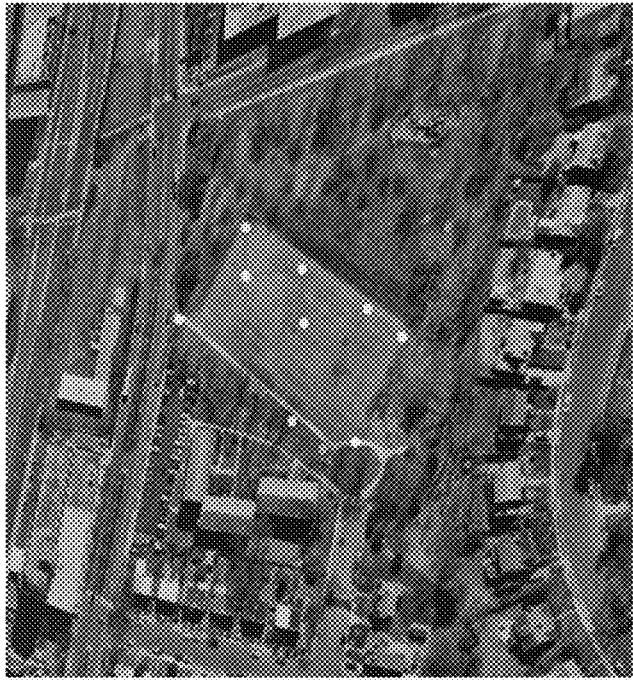
Figure 7A:
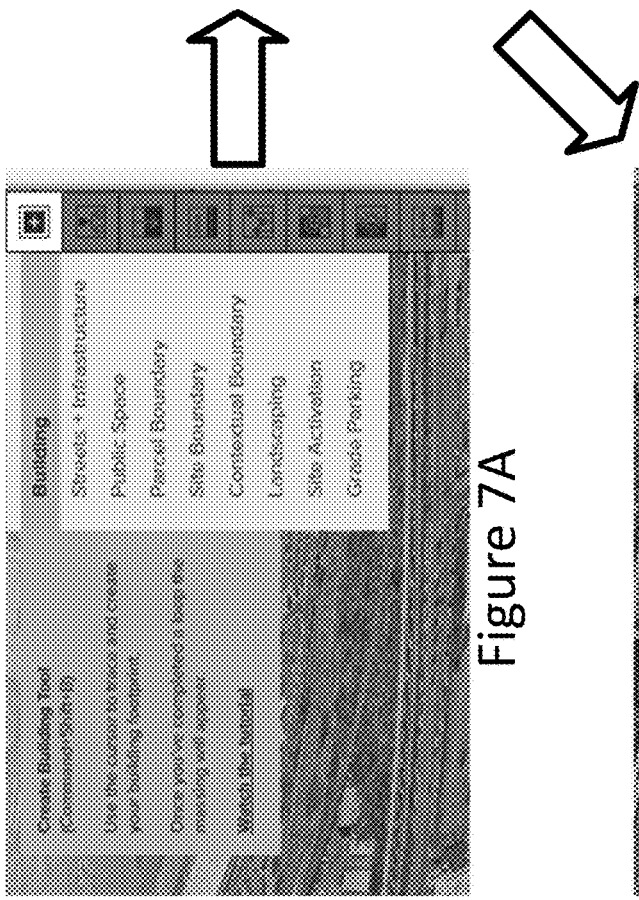

Once selected, the user may draw the outside border of the building footprint in FIG. 7B. (Hitting the 'esc' key starts the drawing over, in some embodiments).

Figure 7C:
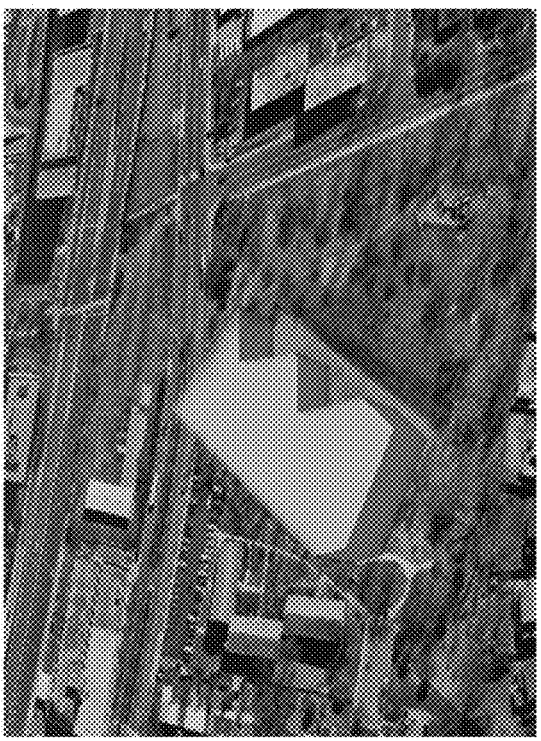

Upon closing the loop, a Massing may be created in FIG. 7C that is eight stories tall by default, for example. (Hitting the 'delete' key, or 'cmd x' deletes the Massing that was just created, in some embodiments).

A single Massing by itself may be considered a Building as in FIG. 8B. However, additional Massings may be added to create a more complex Building as in FIG. 8D. For example, an initial Massing may be created which serves as the "podium", or base massing, for a Building as in FIG. 8B. Then, an additional Massing may be added on top of the podium Massing, creating a tower as in FIG. 8C and FIG. 8D. Massings may be stacked on top of other Massings. In this manner, complex models may be quickly created, tested, and verified.

Figure 9:
FIG. 9 illustrates the Optimization Tool interface with an exemplary massing.

FIG. 9 illustrates an exemplary Optimization Tool interface with an exemplary massing, according to some embodiments. This figure presents the opening status of the Optimization Building, Program and FAR Tool. A Building as described above, may consist of a single, or multiple massings which could represent building podiums and towers built on top of the podium as shown in FIG. 9 in red. The user is able to perform the following optimizations to a building, one massing at a time:

- Modify the number of floors in the Building above grade (ground level).
- Modify the number of floors in the Building below grade (underground).
- Modify the floor-to-floor height of all of the floors.
- Modify the floor-to-floor height of each individual floor.
- Through the modification of the number of floors and floor heights, the overall height and depth of a building.
- Assign Program types, by percentage, to the massing (such as retail, residential, office, etc.).
- Adjust the percentage blend between revenue generating and common area/non-revenue generating space via a Granular button and additional data entry fields.

When the parcel for the building is identified by the user, through the Create Parcel tool, or, by default through the placement of the building, the Floor Area Ratio (FAR) will be shown. The FAR will automatically adjust based upon the real-time changes the user makes.

Figure 10:
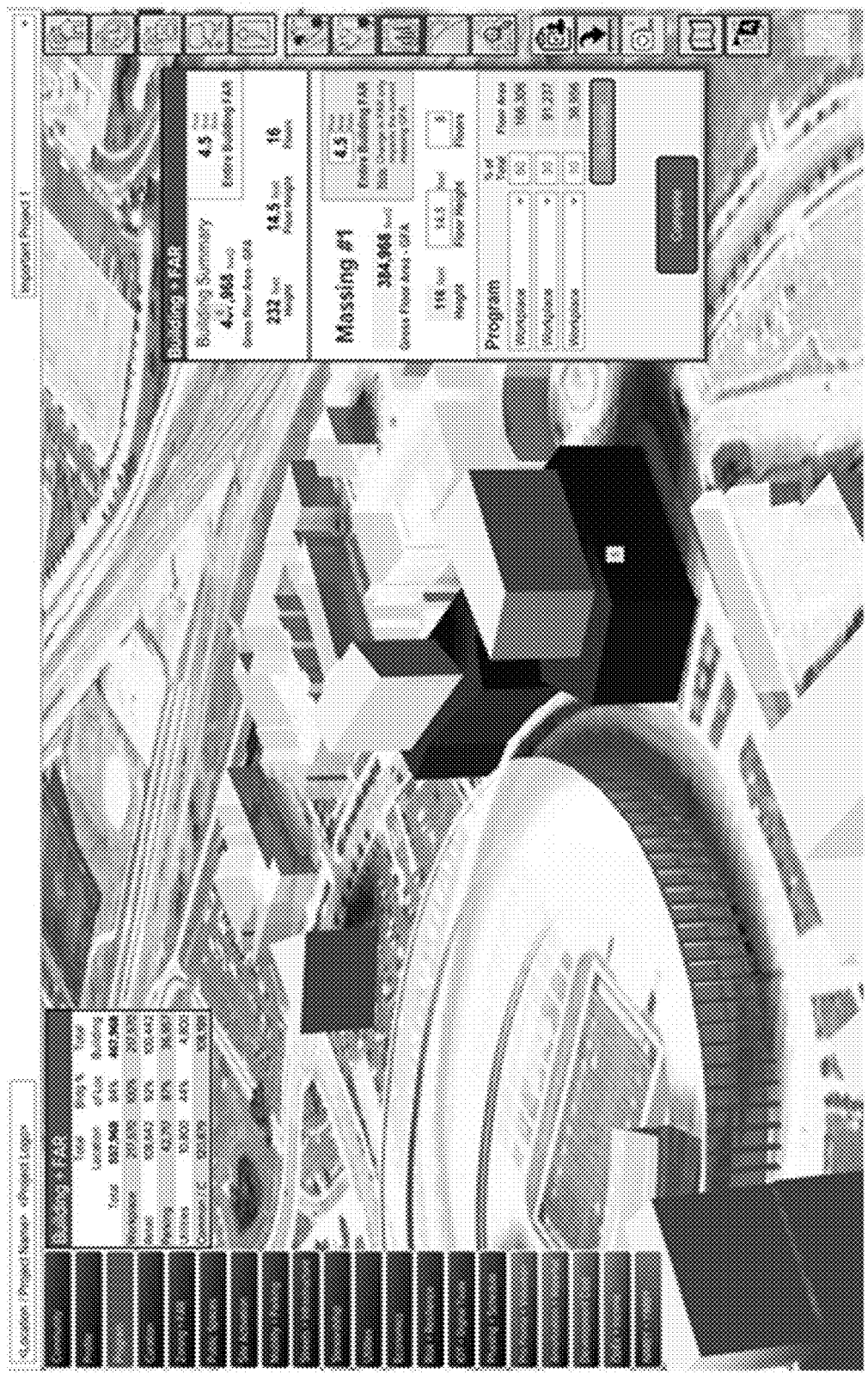
FIG. 10 illustrates the Optimization Tool interface with an exemplary massing.

FIG. 10 illustrates the Optimization Tool interface with exemplary massings, according to some embodiments. FIG. 10 illustrates an individual podium massing selected for modification. The user may have the ability to change the floor-to-floor height, the number of floors, and assign the program and percentages of floor area for each program, for example. As illustrated, Workplace type program is assigned 3 times with 166,306 Floor Area, 91,237, and 36,959 respectively. The floor height is indicated in the example as 14.5 along with 8 floors as indicated.

Figure 11:
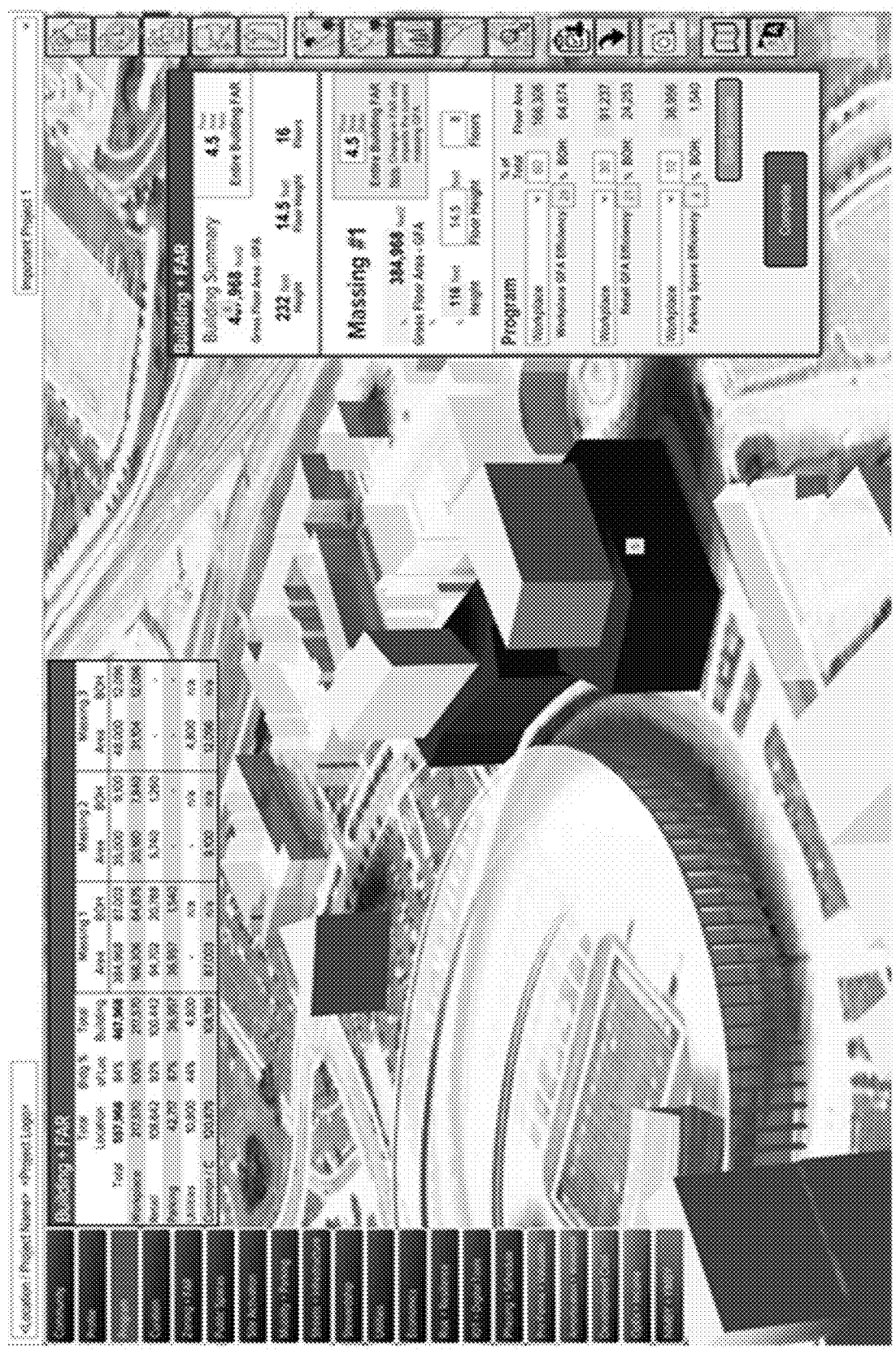
FIG. 11 illustrates the Optimization Tool interface with an exemplary massing.

FIG. 11 illustrates the Optimization Tool interface with exemplary massings, according to some embodiments. FIG. 11 illustrates the ability to both assign the program type as well as modify the percentage of revenue to non-revenue generating floor space with the Granular button.

Figure 12:
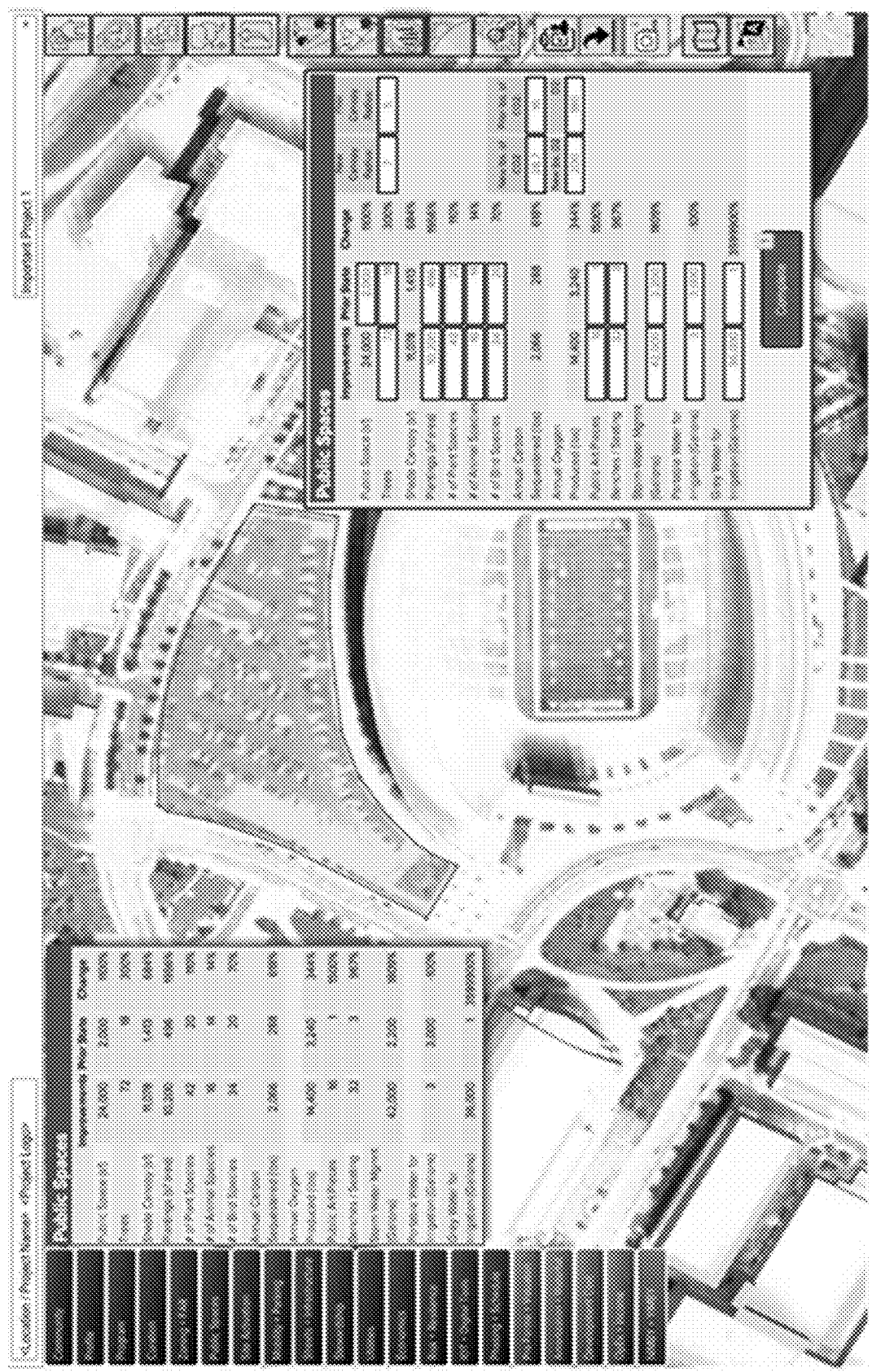
FIG. 12 illustrates the Optimization Tool Public Spaces according to some embodiments.

FIG. 12-13 illustrate the Optimization Tool Public Spaces according to some embodiments. The Public Spaces tool GUI enables users to enter in data about the public spaces and the landscaping in a project. Some of the fields may automatically populate from the built-in calculation tools (for area, shade canopy, $CO_2$, $O_2$, etc.) as well as the placement tool (adding trees, grass areas, planting, etc.).

Figure 14A:
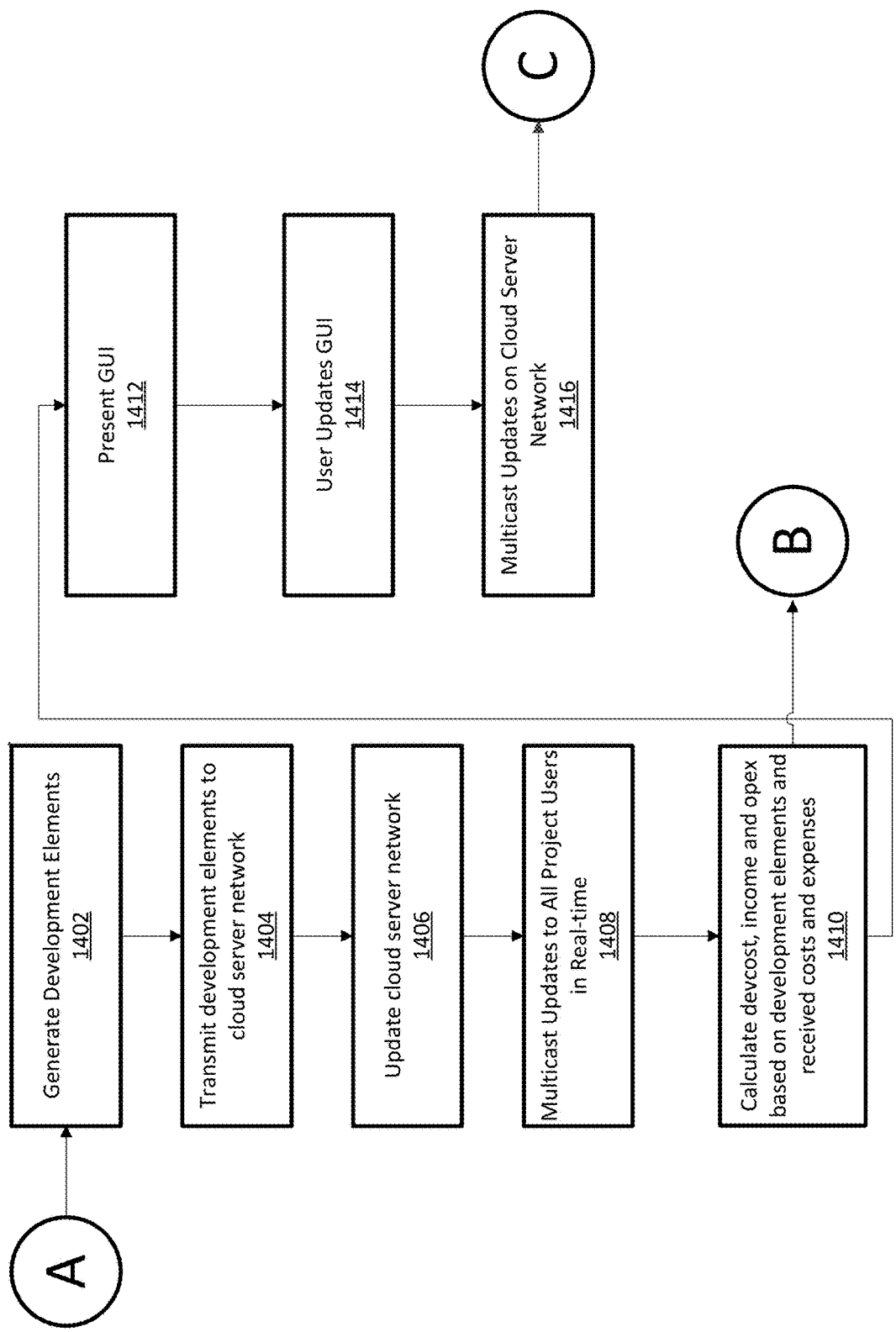
FIG. 14 is a flow chart illustrating a method for generating and presenting data related to massings.

FIG. 14A is a flow chart illustrating a method for generating development elements, and presenting data related to the development elements. Development elements may include, for example, massings (such as buildings, residential dwellings, houses, commercial property, hotels, etc.), streets and infrastructure, public spaces, parcel boundaries, sites and boundaries, contextual boundaries, landscaping, parking, etc. In step 1402 a user may generate one or more development elements.

In order to generate or create a development object a user may draw a massing including a polygonal or elliptical layout, and floor plan. Additionally, multiple massings may be generated one on top of another (for example, different shapes as illustrated in FIG. 8D). The floor plan may include floor heights each or all of the floors, and usage type used to determine expenses and costs. A program type may be specified for each or part of the floors including-retail, residential, commercial, office midrise, office high-rise, residential Multi-Dwelling Unit (MDU), residential workforce, residential single, retail mall, retail strip, 1-5 star hotels, parking, health Medical Office Building (MOB), health acute, health clinic, university (classroom, laboratory, administration, dormitory, school (K-8, 9-12 for example), museum, government building, police department, fire department, gym/recreation, etc. Additionally, to generate development elements a user may place an item already populated with data. Placement elements may include landscaping, streets and/or infrastructure, for example. All of the development elements may be stored in one or more Object File(s) 402.

When the development element is added, generated or created, the new element may be added to a locally saved copy of the object file 402. For example, a building may be added including metadata such as program type for each of 8 floors and FAR for each floor. In another example, several streets may be placed and then added to the object file including beginning and ending coordinates, width, material, etc.

In step 1404 the User Device 102 may transmit to the Cloud Server Network Element 251/202 the edited or updated development element(s). The Cloud Server Network Element 251/202 may store the edits of the development elements. For example, when a user adds a building, the Cloud Server Network Element 251 and/or 202 may be updated. The updates may be stored, in real-time, including any edits done by users. For example, when a building is created the Cloud Server Network Area A 106 and Cloud Server Network Area B 108 may be updated by the User Device 102, similarly, when a building is changed so that it has 12 floors rather than 8 floors, the Cloud Server Network Area A 106 and Cloud Server Network Area B 108 may be updated via one or more Object File(s) 402 which are shared in the multiple Areas and Cloud Server Network Elements.

The User Device 102 may transmit the data file via REST APIs or WebSocket APIs to the API Gateway Server 204/252. Similarly, individual changes such as the number of floors, a coordinate change or a massing creation may be transmitted individually to the cloud server network element where the Object Storage 206 may be updated. The Handler 210 may receive an update or upload Event 214 from the User Device 102 and call the relevant Code Package 208/256.

In step 1406 the API Gateway Server 204/252 may update the rest of the Cloud Server Network Areas in real-time, to include the updates made by the user. For example, the updates may be stored in one or more data structures as described with respect to FIG. 4. The Handler 210 ay store or update changes to a project Object File 402 in the Object Storage 253 or in the Data Warehouse 260.

In step 1408, the API Gateway Server 204/252 in the cloud server network may multicast or transmit the updates made by the user to the other devices on the network. In step 1408, the cloud server network may push the updates to other users of the project so that the changes are presented in real-time to all users of the same project. For example, the API Gateway Server may read an Active Users List associated with the open file. The Active Users List may be updated as each user logs in or requests access to the project. The API Gateway Server may traverse the Active Users List list of locations, IP addresses or address of relevant API Gateway Server for each user that is active. Each IP address such as a private IPV4 or Elastic IP address may be used to identify the API Gateway Server 204/252 for active users and then an update packet event and request is transmitted to those API Gateway Servers 204/252. The updates are in term reflected in real-time on the active users displays for multi-user identically reflected projects.

In step 1410 the API Gateway Server 204/252 may calculate the DevCost, income and/or OpEx based on development elements input by the user in the massings, the received costs, and expenses as expected by the geographical region. The User Device 102 may receive one or more data points related to the development costs, operating expenses or proforma and store all or part of the data locally for presentation via GUI 288. The operations discussed in FIG. 14B may be taken at this stage as discussed below.

In step 1412 the User Device 102 may populate one or more graphical elements and tables based on the received data and present one or more GUI's related (as depicted and described herein) to the user. For example, the DevCost and OpEx may be received from the API Gateway Server 204/252 and presented using the optimization interfaces or other GUI's 288 such as ones illustrated among the figures.

In step 1414 the User Device 102 may update data on one or more GUI's. Updates to the GUI may include updates to FAR for various massings, changes to % project rates for different floors or buildings, #of animal species, #of bird species, public art pieces, CO2 changes, etc. Any change in consideration of the development, building and financing of the development project may be considered.

In step 1416 the User Device 102 may transmit the updates to the Cloud Server Network Area A 106 and Cloud Server Network Area B 108 for Object File storage. In step 1416 the cloud server network may multicast the updated edits/data in real-time to all devices for identical display on all devices regardless of geographic region. Again, to multicast, the API Gateway Server 204/252 may traverse the Active Users List and update all API Gateway Servers 204/252 in each of Cloud Server Network Area A 106 and Cloud Server Network Area B 108 or further areas, associated with an active user for simultaneous presentation of identical project data on each user screen in real-time.

Figure 14B:
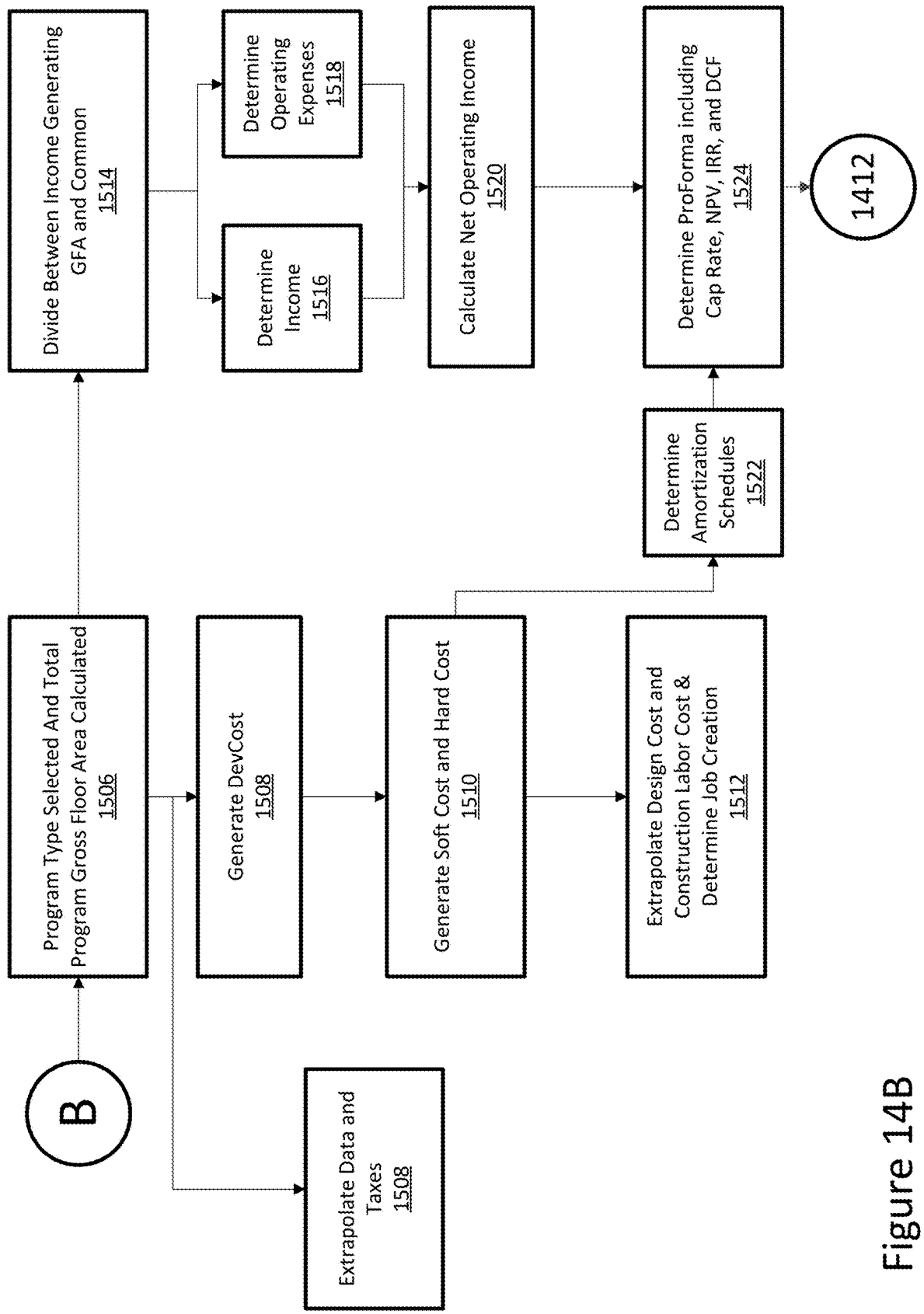

FIG. 14B illustrates an exemplary flow diagram for calculating ProForma and development costs (DevCost). Generated massings and placements may be instantiated and stored, all or part on the Cloud Server Network Elements 202 and/or 251 as discussed above. The massing data may include a digital tag or identifier, exact latitude (x), longitude (y), and height above sea level (z). The massing may also include a Gross Floor Area (GFA), the number of floors, and a floor-to-floor height. One or more data structures like Object File 402 may be created or used to store, access, modify, and utilize in calculations related to the massing(s) data or placement data.

In addition to the ability of creating one or more massings as discussed above, the machine or user may select to import one or more massings into the application interface. The user may adapt the massing to include application metadata framework in some embodiments, while in other embodiments the application will automatically adapt the metadata framework.

In step 1506, once the massing and placement data is instantiated and stored, a total program GFA may be calculated by dividing the massings/placements GFA based on their program type. Program types may be selected and changed via the GUI. Exemplary program types include retail, residential, commercial, office midrise, office highrise, residential Multi-Dwelling Unit (MDU), residential workforce, residential single, retail mall, retail strip, 1-5 star hotels, parking, health Medical Office Building (MOB), health acute, health clinic, university (classroom, laboratory, administration, dormitory, school (K-8, 9-12 for example), museum, government building, police department, fire department, gym/recreation, etc. Each massing may have a percentage allocated to GFA for each program type. For example, Workplace may be 60% of the GFA, residential 20%, and health Medical Office Building 20% in a mixeduse building.

In some embodiments, the system may move on to step 1508 where it generates a development cost (DevCost) based upon the Cost Per Square Unit (CPSU). For example, the DevCost may equal GFA×CPSU. This may be otherwise known as the capital expense. The DevCost may be calculated locally on the User Device 102, or in the Cloud Server Network Elements 202 and/or 251 and transmitted with a DevCost generation Event 214. In this way the Cloud Server Network Areas A-B 106-108 may have an updated list of the DevCosts, GFA and program types for the massings/placements and whole project.

In some embodiments the system may proceed to step 1510. In step 1510 the soft cost and/or hard cost may be calculated based on the DevCost. For example, the soft cost may include costs for the architects, engineers, consultants and other labor related costs. The hard cost may be the remainder of the DevCost after removing the soft cost. The hard cost may include construction labor cost (percentage of construction costs), and construction materials, the remainder of the construction cost. The construction materials and similar hard costs may be calculated on the Cloud Server Network Elements 202 and/or 251. For example, updated hard costs according to market value may be retrieved from the Managed Data Providers 257 and/or the Relational Database 262.

In some embodiments, the system may proceed to step 1512 where the number of design and construction jobs created by the project may be extrapolated. To determine the number of jobs created the development cost and construction labor cost may be taken into account. For example, known salaries of different construction workers can be input to a weighted formula using the development cost as a basis.

In some embodiments, the system may proceed from step 1506 to step 1508 where taxes and other data are extrapolated from the total program GFA. In some embodiments, portions of the massing may be separated between the income generating GFA and the common or core GFA. In step 1508, all or part of the following may be extrapolated from the total program GFA:

Energy, Water, and Utilities Use
Improved Utility Performance
Environmental Impact/GHGs.
Number of Office Workers/Jobs
Number of Retail Workers/Jobs
Number of Residents
Property Taxes
Sales Taxes
Parking Taxes
Hospitality Taxes
Parking Requirements
Rainwater Management
Transportation Trips
Discretionary Spending In other embodiments, the system may proceed from step 1510 to step 1522 where it may determine one or more amortization schedules. The DevCost may determine the amount of financing required (the loan). The amortization may schedule out the payback of the loans. The amortization schedules may be used as input in step 1524 for ProForma determination. Amortization determination may include assessing the partners, and debt owners of the project. The debt owners or partners may be prioritized for payback fulfillment based on set terms and therein the waterfall amortization may be discerned, and later displayed as in FIGS. 16-19. By updating on the Cloud Server Network Elements 202 and/or 251 and storing both on the cloud and locally, the system may retrieve much faster results for presenting project financial data such as amortization.

In some embodiments, the system may move from step 1506 to step 1514 where the program portions of the massing/placements may be divided into income generating GFA and common or core GFA. The system may then move on to step 1516 or 1518. In step 1516 the system may determine the income from the income generating GFA based upon a revenue per square unit. The income may be determined according to the equation: GFA*Revenue Per Square Unit (RPSU)=Income, for example.

In step 1518 the system may determine the OpEx. The OpEx may be determined based upon services represented, as a percentage of income. For example, the following formula may be used: Income*percent for services=OpEx. Steps 1516 and 1518 may proceed to step 1520 where the system may calculate the Net Operating Income (NOI) of the project. The NOI may be calculated according to the following formula: Income−OpEx=NOI. The calculations in step 1516 and 1518 may be performed all or part on the cloud server network in order to more efficiently calculate according to updated standard information, multicast, and store all project data via one or more Object File(s) 402. The system may then proceed to step 1524.

In step 1524 the system may calculate the ProForma. The ProForma may utilize both the amortization schedules and NOI to determine the value of the investment including:

Capital Rate of Return (Cap Rate)
  a. Cap Rate may be calculated using any known technique/formula used in the industry, for example: Cap Rate=NOI/Current Market Value, or Cap Rate=NOI/Purchase Price Net Present Value (NPV), for example using:
  a. $NPV = \Sigma_{t=1}^{n} R_t/(1+i)^t$
  b. Where: $R_t$=Net cash inflow-outflows during a single period t
  c. i=Discount rate or return that could be earned in alternative investments
  d. t=Number of timer periods Internal Rate of Return (IRR), for example, using:
  a. $0 = NPV = \Sigma_{t=1}^{T} C_t/(1+IRR)^t - C_0$
  b. where:
  c. $C_t$=Net cash inflow during the period t
  d. $C_0$=Total initial investment costs
  e. IRR=The internal rate of return
  f. t=The number of time periods Discounted Cash Flow (DCF), for example using:
  a. $DCF = CF_1^1/(1+r) + CF_2^2/(1+r) + CF_n^n/(1+r)$
  b. where:
  c. CF=The cash flow for the given year.
    i. $CF_1$ is for year one,
    ii. $CF_2$ is for year two,
    iii. CFR is for additional years
  d. r=The discount rate The ProForma may be used to summarize the underwriting of the project. This may be done by asset classes and/or individual assets including:

Technology Assets:
  a. Fiber infrastructure and services
  b. Vertical infrastructure and services
  c. 5G infrastructure and services
  d. CBRS spectrum and services
  e. IP+WiFi Network and services
  f. Systems+Asset Management Applications
  g. Community Experience Applications Office assets
  a. Residential Assets
  b. Retail and Entertainment Assets
  c. Experience Assets such as Public Spaces, site activation The ProForma may be viewed by the applicable valuation methodology such as DCF, IRR Cap Rate and/or NPV discussed above. The system may then proceed to step 1412 as discussed above.

Figure 15:
FIG. 15 illustrates an exemplary Operating Expense and Income Optimization interface.

FIG. 15 illustrates an exemplary Operating Expense and Income Optimization interface, according to some embodiments. In some embodiments, the user may enter or modify the revenue generated and the operating costs by Program type. The entry and/or modification may be performed on one massing at a time. Embodiments may automatically populate the revenue and operating expenses fields when open or public data sets are available from the Cloud Server Network Element 202 and/or 251. Based upon the area of the program, the revenue generated, and the operating expenses, the Net Operating Income (NOI), may be calculated. The NOI may then be utilized to help determine the overall proforma.

Figure 16:
FIG. 16 illustrates an exemplary Amortization and Waterfall, Tranche Creation interface.

FIG. 16 illustrates an exemplary Amortization and Waterfall, Tranche Creation interface, according to some embodiments. In some embodiments, the user may identify both the equity and debt tranches that will be needed for a project. By clicking on the boxes, the tranche may be added to the project. If additional tranches of a particular type are desired, the user may click the "+" button to add additional tranches. Once a tranche is added, the tranche buttons below the Tranche Tool may become active. When additional tranches are added, additional buttons may be automatically added below the Tranche Tool button.

Figure 17:
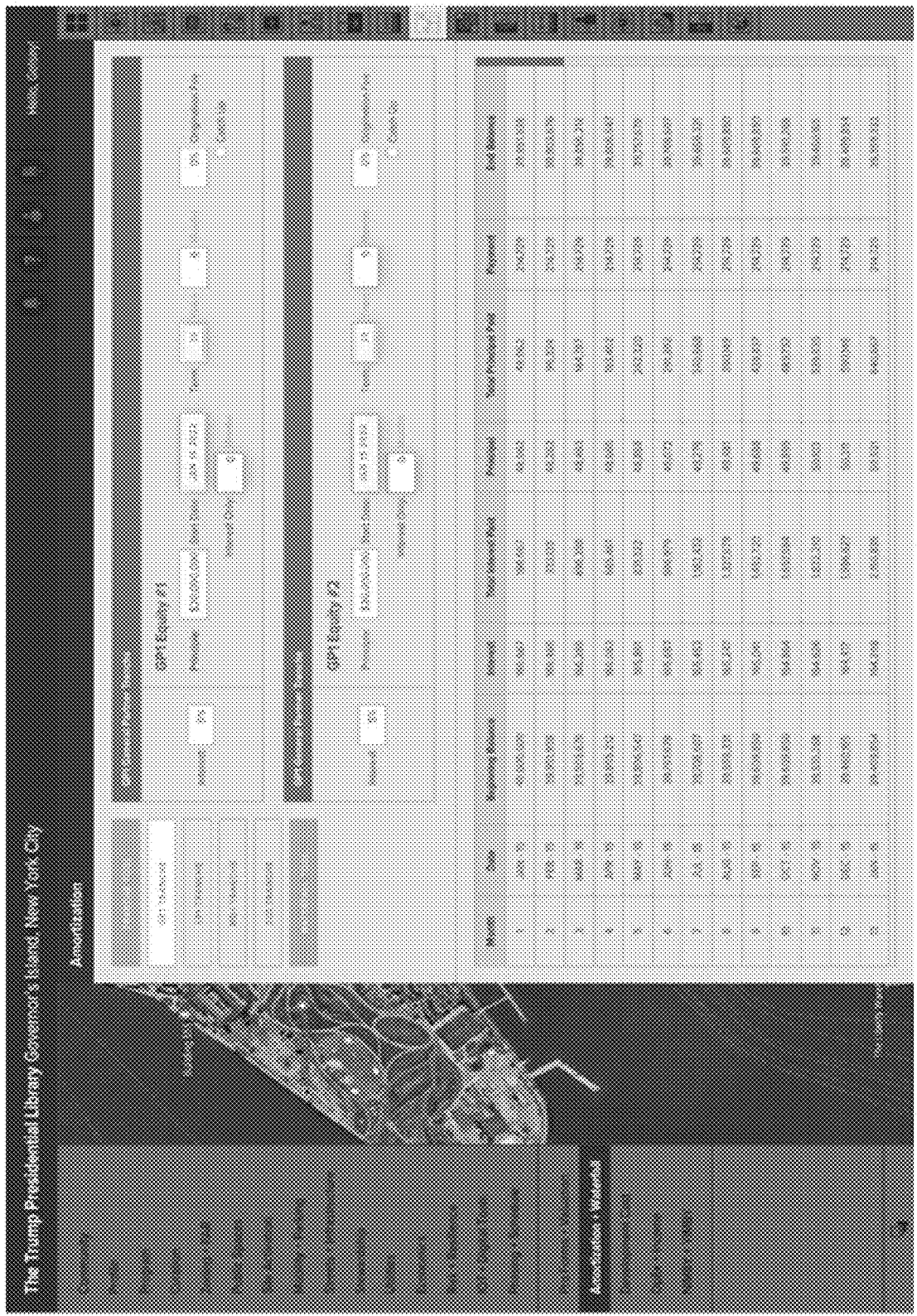
FIG. 17 illustrates an exemplary Amortization and Waterfall, GP Amortization interface.

FIG. 17 illustrates an exemplary Amortization and Waterfall, General Partner (GP) Amortization interface, according to some embodiments. For each tranche that is added or created for a project, the Amortization Tool may be available to enter in the terms of the tranche, as well as show the full amortization schedule by period. In some tranches, there may be more than one contributor. If this is the case, additional fields may be automatically added for entry.

Additional contributor's may be Limited Partners (LP), Mid-tier Debtors (MD1), Second-tier Debtors (SD), etc.

Figure 18:
FIG. 18 illustrates an exemplary Amortization and Waterfall Example.
Figure 19:
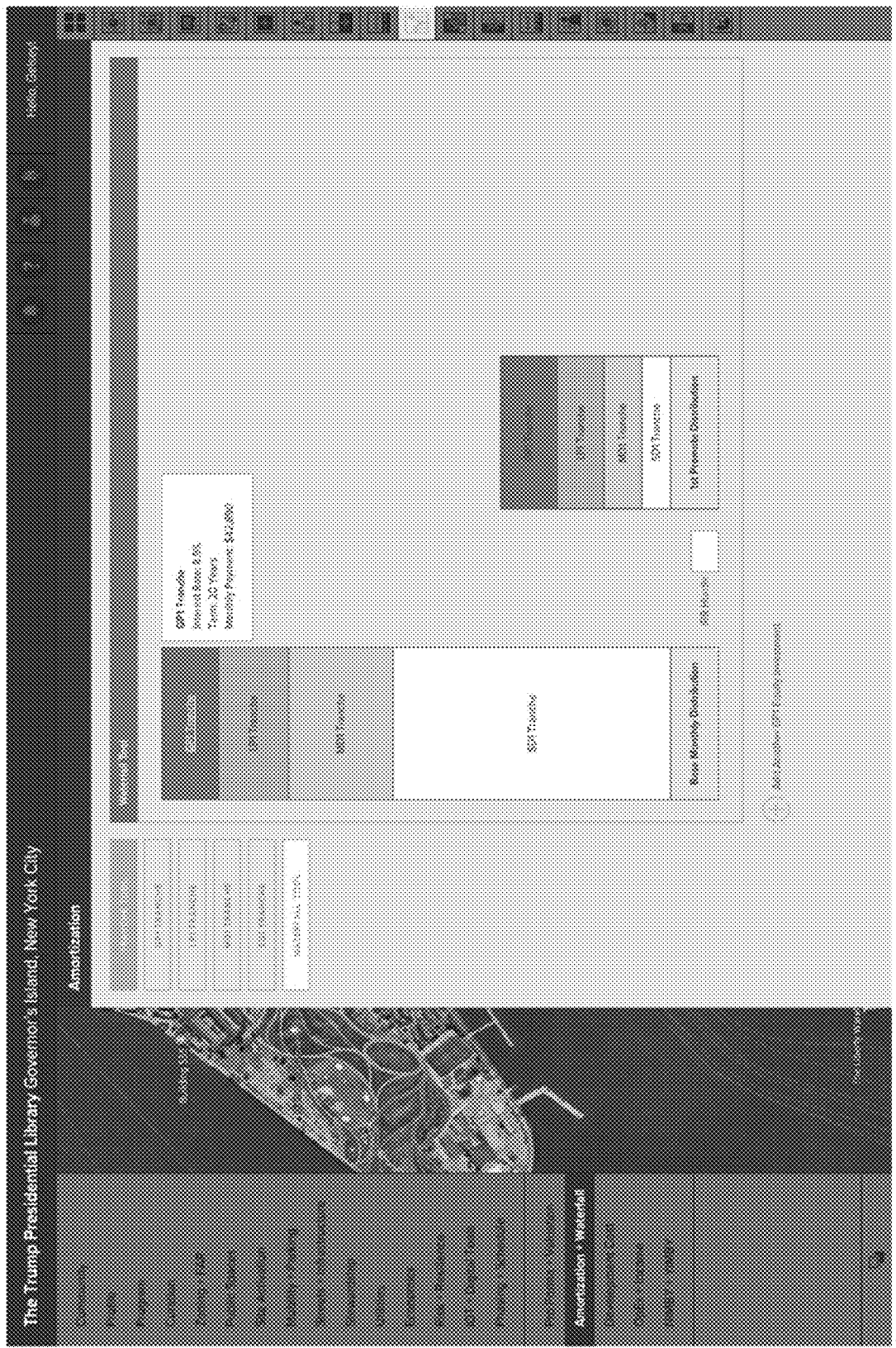
FIG. 19 illustrates an exemplary Amortization and Waterfall Example.

FIGS. 18-19 illustrates an exemplary Amortization and Waterfall Example, according to some embodiments. Financial pay outs to each tranche may be determined via the entry of the terms in the Amortization fields. The Waterfall tool may summarize the payouts by period as well as provide to the user the ability to define one or more hurdles, based upon IRR and chosen by the user, where additional payouts are made per period. Additional hurdles may be added with a "+" button, for example, at the bottom of the screen. The Waterfall tool may also provide the user with the ability to change the payouts and hurdles over the amortization period.

Figure 20:
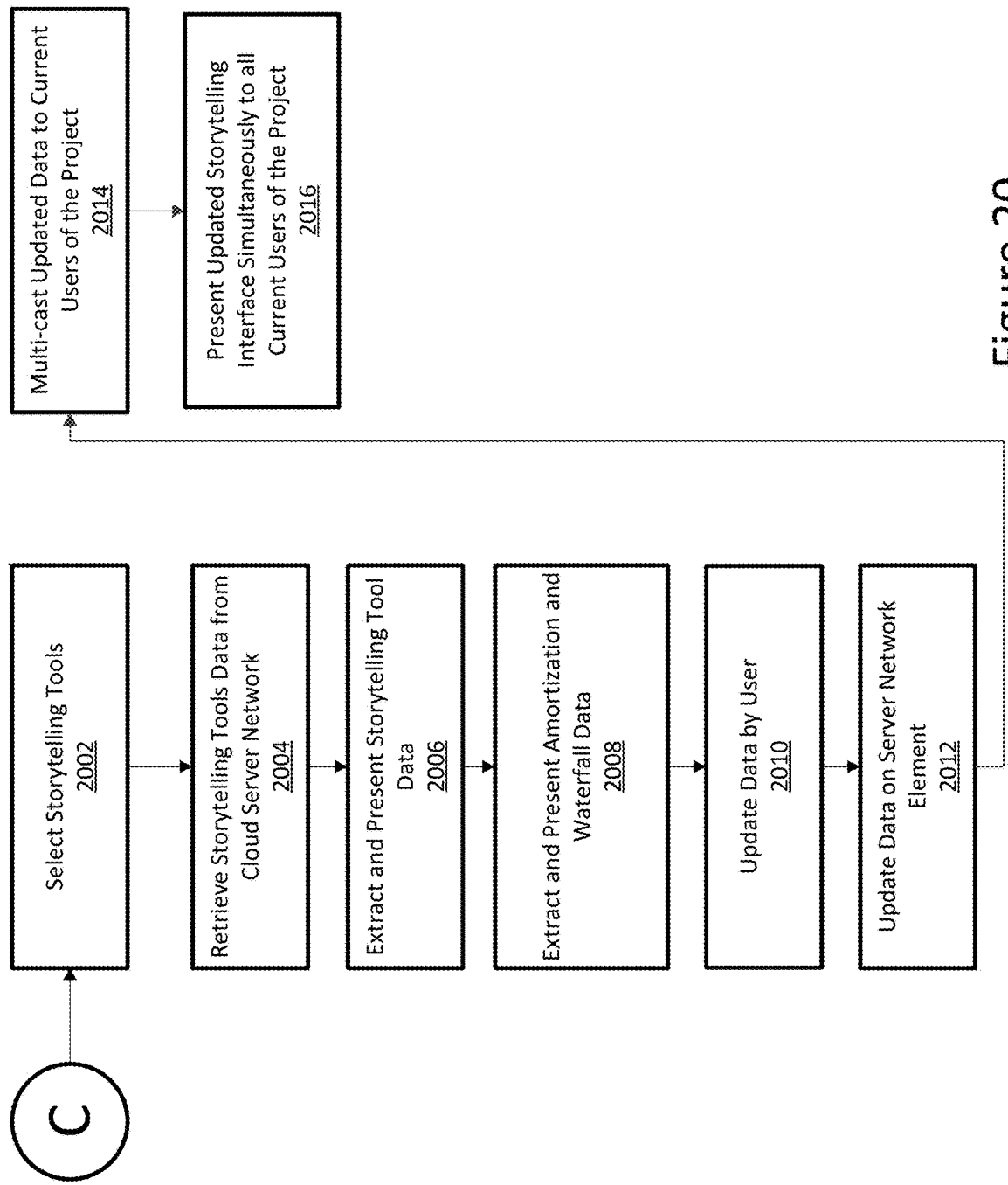
FIG. 20 is a flow chart illustrating a method of calculating, storing and presenting various project financial data.

FIG. 20 is a flow chart illustrating a method of calculating, storing and presenting various project financial data using storytelling tools. In step 2002 the user may select one of the storytelling tools as depicted in FIGS. 9-13, 15-19, 21-22, for example. Storytelling tools may include Community, Profile, Program, Curation, Zoning and FAR, Public Spaces, Site Activation, Mobility, Parking, Streets and Infrastructure, Stewardship, Utilities, Economics, Risk and Resilience, IoT and Digital Tools and/or Phasing and Schedule. Similarly, the financial storytelling tools such as Pro Forma and Valuation, Amortization and Waterfall, Development cost, Opex and Income may also be selected.

In step 2004, the User Device 102 may transmit a request to retrieve information related to the selected storytelling tool. For example, operating expenses and/or amortization data may be requested from the Cloud Server Network Elements 202 and/or 251. The requested data may be stored in Object Storage 253 and/or 206, for example.

In step 2006, the User Device 102 may extract and present some of the storytelling tools information. In some embodiments, the amortization and waterfall data may be presented. For example, data related to Community, Profile, Program, Curation, Zoning and FAR, Public Spaces, Site Acivation, Mobility, Parking, Streets and Infrastructure, Stewardship, Utilities, Economics, Risk and Resilience, IoT and Digital Tools and/or Phasing and Schedule may be presented.

In step 2008, the User Device 102 may extract and present the amortization and waterfall data may be presented. Depending on which tool is selected step 2006 and/or step 2008 may be executed to present the appropriate information.

In step 2010, the user may update the data related to the storytelling tools. Updating the data may include any of numerous options. For example, different screens may be chosen such as various Amortization and Waterfall screens. Similarly, projected financial data may be amended. In some embodiments, the storytelling tool may be open along with a related development or drawing tool. For example, the Public Spaces development tool may be open simultaneous to the Public Spaces Storytelling Tool. In this example the Public Spaces Development tool may be updated such as changes to the Public Art Pieces, Storm Water Management, Trees, etc.

In step 2012, the User Device 102 may transmit the updated data to the cloud server network element. The updated data may be to a basic visual element like a screen change, or to a data update or change as mentioned in step 2010.

In step 2014, the API Gateway Server 204/252 may multicast the updated data to the current users of the project. For example, the API Gateway Server 204/252 may open and traverse the Active User's List and send the updated data to each API Gateway Server 204/252 associated with the active users. The updated data may include either a screen presentation change or a data change/update.

In step 2016, each API Gateway Server 204/252 associated with each active user may transmit the updated changes to the User Device 102 associated with each API Gateway Server 204/252. Each User Device 102 may respectively present an updated interface in real-time reflecting the change made on the presenting User Device 102 for a synchronized presentation effect.

Figure 21:
FIG. 21 illustrates an exemplary Storytelling method interface for Development Costs.
Figure 22:
FIG. 22 illustrates an exemplary Storytelling method interface for Development Costs.

FIGS. 21-22 illustrates an exemplary Storytelling method interface for Development Costs, according to some embodiments. The Development Cost, or DevCost, may consist of project Hard Costs and Soft Costs for real estate development projects. Hard Costs are also known as construction costs which may consist of the labor and materials to build the building. Soft Costs may consist of the fees for the architects, engineers, and consultants as well marketing, legal, and other similar miscellaneous costs.

The DevCost can vary by program type. Five-star hotels may cost significantly more than a retail strip mall. Additionally, costs vary greatly by the geographical location of a project. Building a five-star hotel in New York City costs significantly more than in rural Indiana. As such, some embodiments may automatically change the DevCost for the user based upon the location of the project and the type of program. The DevCost tool may allow the user to see and modify the Hard and Soft Costs for each massing. Each massing's DevCost may be calculated separately and then totaled for the entire building. The Application may automatically populate DevCosts where data is available.

All of the white fields with a light blue typeface may be made modifiable. The numbers may be modified by the costs (by local currency) or the percentage. The results may then automatically be shown in the Storytelling data field to the top left. For example, in FIG. 21, the Parking Program Devcost, Retail Program Devcost and Workplace Program Devcost may all be populated by the user for Massing #1. Similarly, the Retail Program Devcost and Workplace Program DevCost may be input by the user for Massing #2. Finally, as illustrated, the Workplace Program Devcost may be input for Massing #3. In this way, any variety and variation of Massings may be planned using input for their devcosts and then presented via the storytelling tools.

FIG. 22 illustrates how Hard Costs and Soft Costs may be added for each of the programs for each massing. In one example, the user can input these costs by percentage. In another example, the user can input this information by hard figures.

Figure 23:
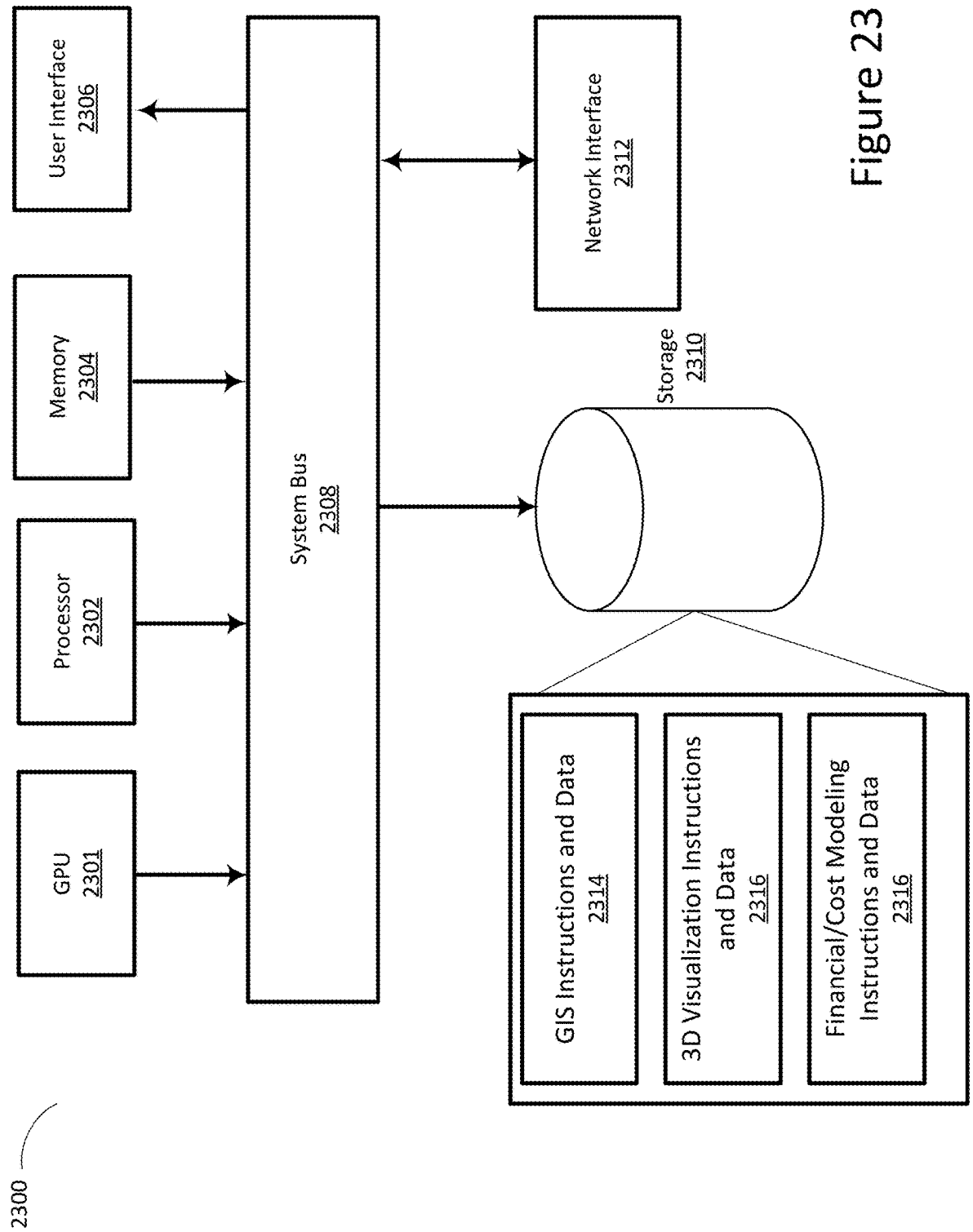
FIG. 23 is a block diagram of a networked system in accordance with some implementations.

FIG. 23 is a block diagram of a Networked System 2300 in accordance with some implementations. The networked system 2300 may correspond to one or more Cloud Server Network Elements 202 and/or 251 as well as to the User Device 102. For example, Networked System 2300 may be a cloud server, an API Gateway Server 204/252, a laptop, desktop, tablet, Personal Computer, telephone, etc. As shown, the Networked System 2300 includes processor 2302, memory 2304, user interface 2306, storage 2310 and network interface 2312 interconnected via one or more system buses 2308.

GPU 2301 may include one or more GPUs as discussed above. For example, the GPU 2301 may separately execute custom/specific shader instructions as discussed above. Processor 2302 may be any hardware device capable of executing instructions stored in memory 2304 or storage 2310, or otherwise processing data. As such, processor 2302 may include a microprocessor, one or more field programmable gate array(s) (FPGA), Application-Specific Integrated Circuit (ASIC), or other similar devices. Memory 2304 may include any of various memory types such as L1, L2, L3 cache or system memory. As such, memory 2304 may include static Random-Access Memory (SRAM), Dynamic RAM (DRAM), flash memory, Solid State Device (SSD), Read Only Memory (ROM), or other similar devices.

User interface 2306 may include one or more devices for enabling communication with a user such. For example, user interface 2306 may include a display, a mouse, and a keyboard for receiving user commands. In some embodiments, the user interface may include a command line interface or graphical user interface that may be presented to a user as illustrated in the several illustrations presented herein.

Network interface 2312 may include one or more devices for enabling communication with other hardware devices. For example, network interface 2312 may include a Network Interface Card (NIC) configured to communicate according to the Ethernet protocol. Additionally, the network interface may implement a TCP/IP stack for communication according to the TCP/IP protocols. A 4G/5G/Long Term Evolution (LTE), Wifi, or any other wireless protocol may similarly be used. Various alternative or additional hardware or configurations for the network interface will be apparent to one of skill in the art such as an ENI.

The storage 2310 may include one or more machine readable storage media such as Read Only Memory (ROM), Random Access Memory (RAM), Solid State Drive (SSD), magnetic disk storage media, optical storage media, flash memory devices, etc. In various embodiments, the storage 2310 may store instructions for execution by the processor or data upon which the Processor 2302 may operate. For example, the storage may store all or part of GIS Instructions and Data 2314 including, Zoning data, parcel/lot data, Census data, Migratory data (such as insect and animal migration patterns), etc. In other embodiments storage 2310 may store 3D Visualizations Instructions and Data 2316 including shader segmented instructions for the GPU, map tiles, etc. In yet further embodiments, storage 2310 may store Financial and Cost Modeling Instructions and Data 2316 including Development Costs, Revenue, Taxes, Census data, etc.

It will be apparent to one in the art that various information described as stored in the Storage 2310 may be additionally or alternatively stored in the Memory 2304. All memory and storage may include non-transitory machine-readable instructions. Both the Storage 2310 and Memory 2304 may be considered non-transitory machine-readable media.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

In some embodiments all or part of Networked System 2300 may be implemented as serverless or virtual functions. For example, Amazon Web Services™, Google App Engine™, Microsoft Azure™, systems or functions may be used for all or part of the services and embodiments described herein. Further, one or more virtual machines running on shared hardware may be used to implement all or part of the methods described. Network Functions Virtualization (NFV) on Software Defined Networks (SDN) and their methods may also be used for all of part of the systems and embodiments described.

Digital Infrastructure

Figure 24:
FIG. 24 illustrates a Vertical Elements GUI Embodiment.

FIG. 24 illustrates a Vertical Elements GUI Embodiment 2400. Vertical Elements GUI Embodiment 2400 illustrates an exemplary menu for selecting Vertical Elements in a real estate project as in step 1402 from FIG. 14A above. As illustrated, the menu may provide options such Placing a Macrocell Tower, Placing a Microcell Building, Placing a Microcell Streetlight, and Placing a Microcell Mounted.

Figure 25:
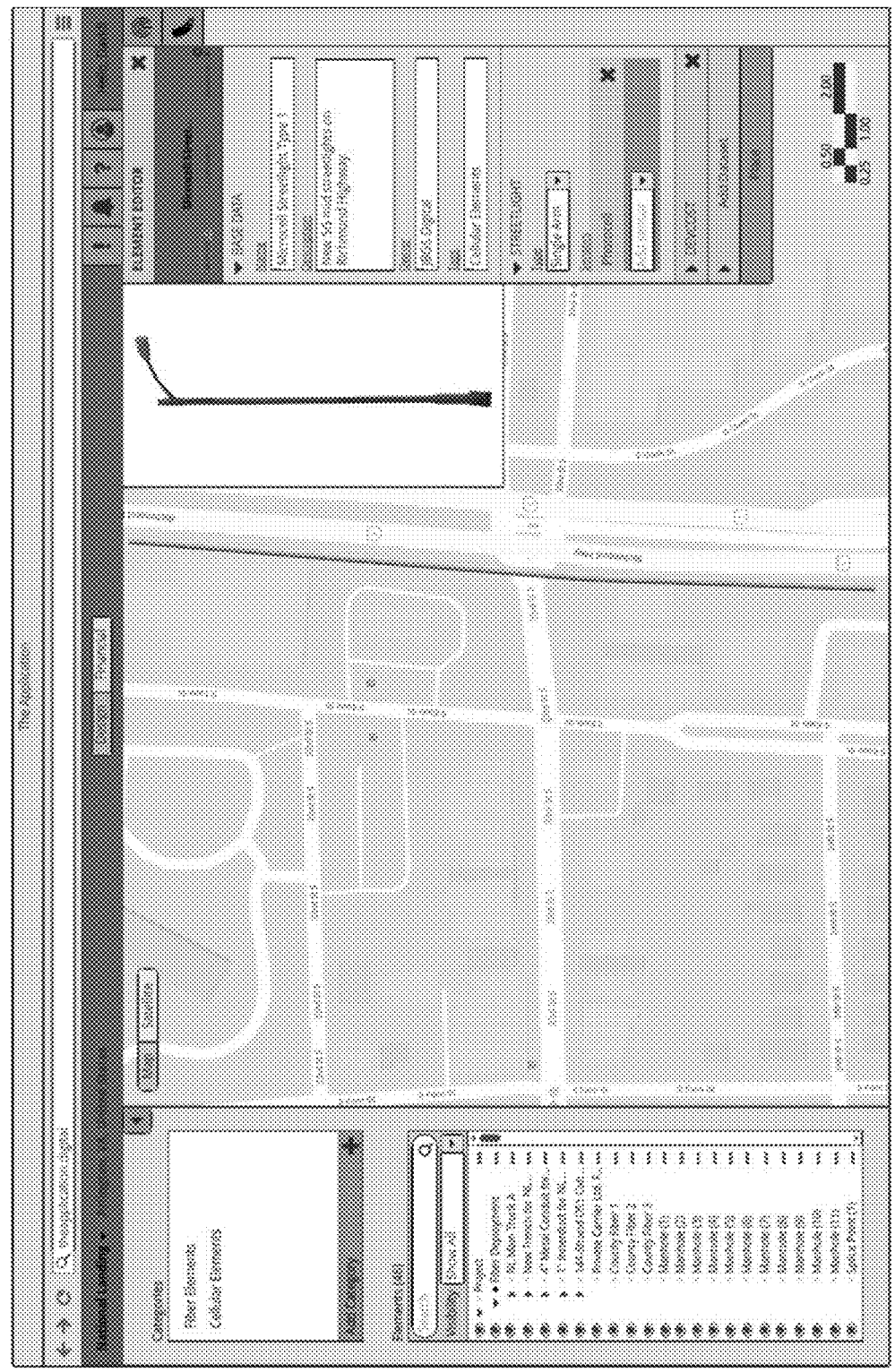
FIG. 25 illustrates a Microcell Element Editor Embodiment.

FIG. 25 illustrates a Microcell Element Editor Embodiment 2500. The Microcell Element Editor Embodiment 2500 GUI may include such input information as name of the Microcell, Owner, Tags, Streetlight type, sensor(s), Development Cost, and additional Datasets. Users may be able to modify the pole height, antenna type, antenna height, and antenna range of streetlight microcells. Similarly, Users may be able to view different representations of microcell streetlights' coverage patterns. Users may be able to configure their microcell mounted element using the Element Editor and then selecting Place to choose a location for the microcell mounted in their projects. The Streetlamp Type field may refer to the kind of streetlamp on which the antennas are mounted. There may be several types of streetlamps for example, Double Arm (default), Single Arm, etc.

Figure 26:
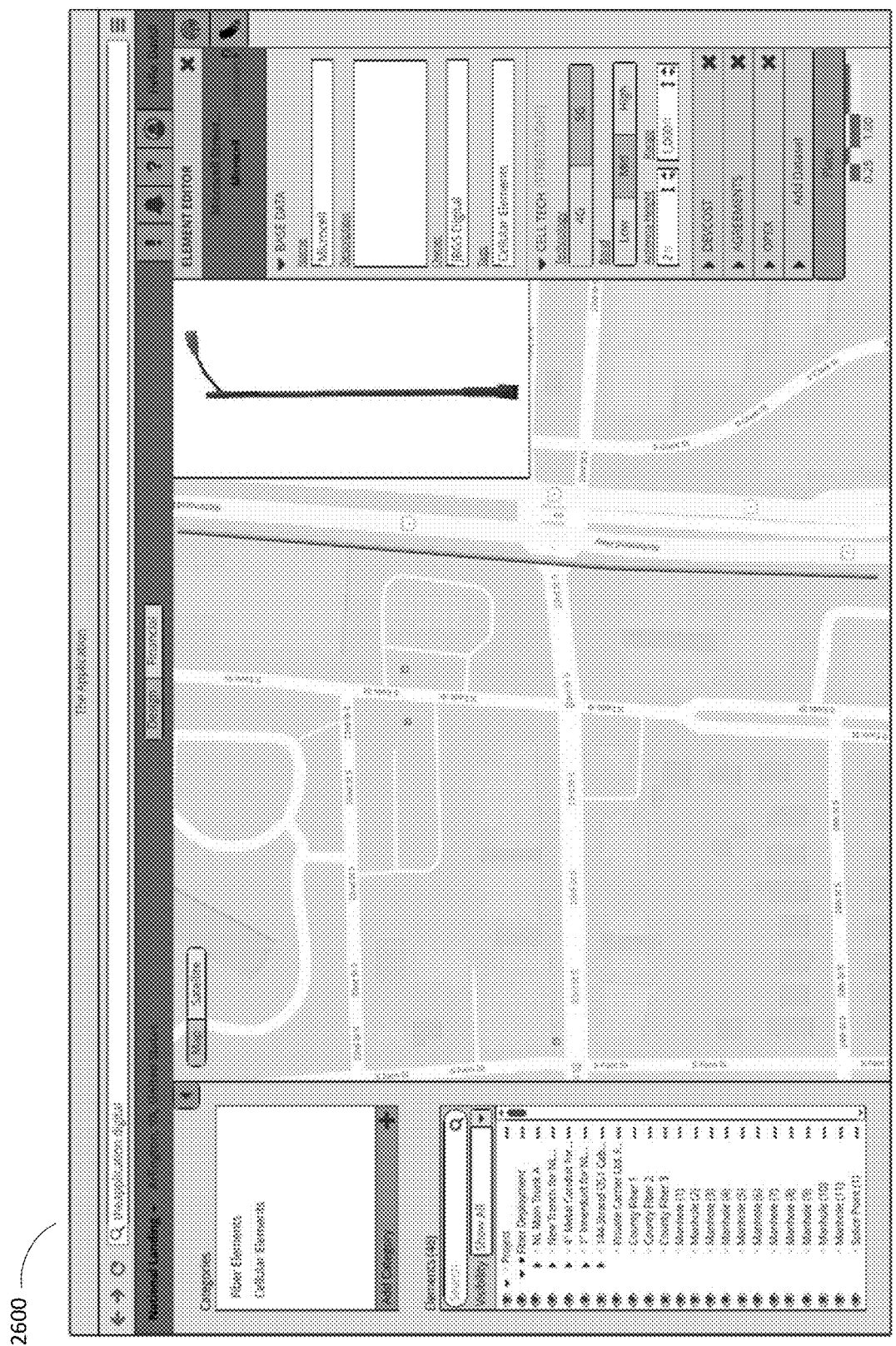
FIG. 26 illustrates a Microcell Element Editor Embodiment.

FIG. 26 illustrates a Microcell Element Editor Embodiment 2600. The Microcell Element Editor Embodiment 2600 GUI may include further configuration options such as technology type, frequency band, antenna height and antenna range. Additional options may be considered as known in the art. The illustrated options include 4G and 5G. The height and range may be specified or presented as a dropdown menu in any sizes and units.

Figure 32:
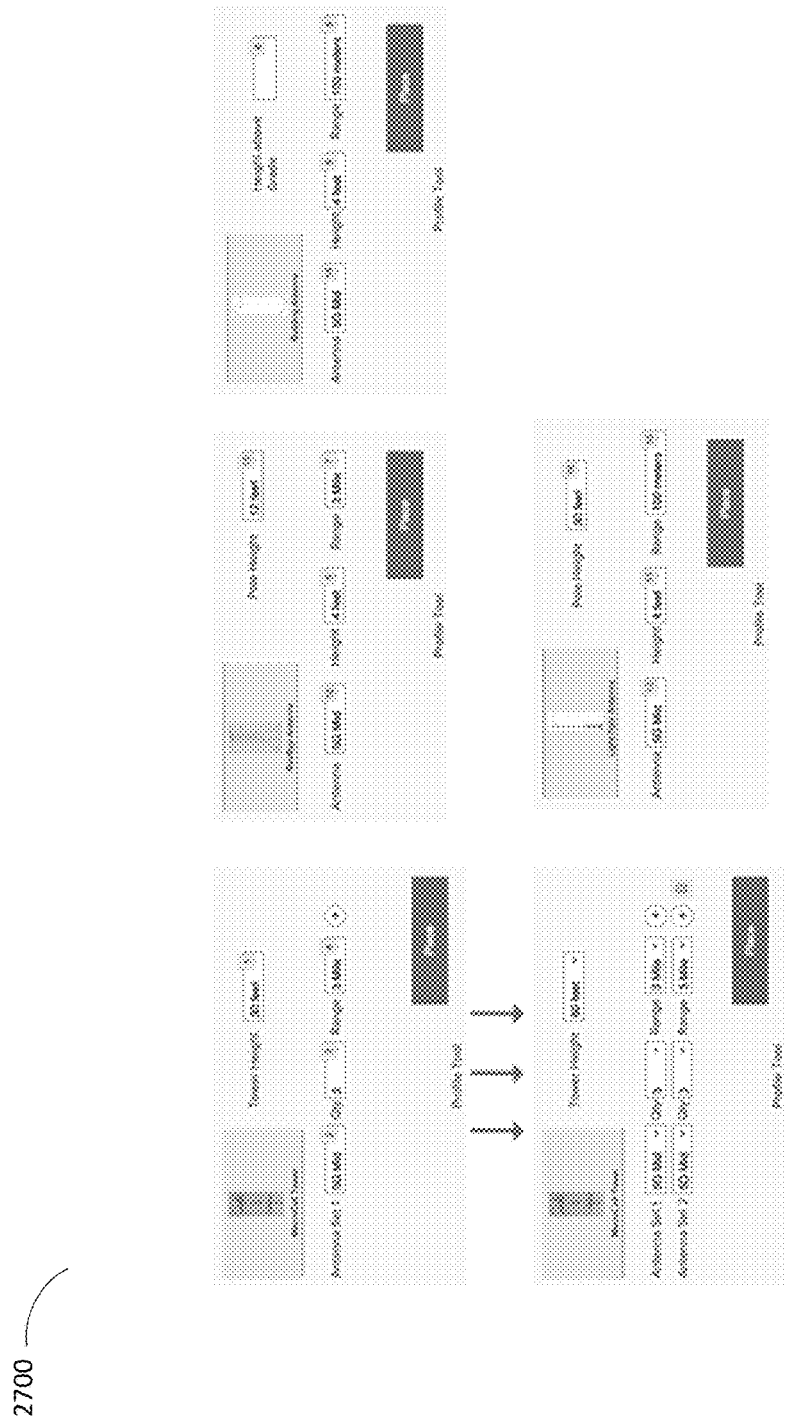
FIG. 32 illustrates Exemplary 5G Elements Options.

The Technology field refers to 5G (default) and/or 4G selection types and the type of coverage may be lobe or omni, for example. The Band field refers to the frequency band of the antenna. It may have three possible values, for example, Low, Mid and High. The Antenna Height field refers to the height of the antenna which is mounted on the pole. The Range field refers to the coverage range of the antenna. FIG. 32 illustrates additional exemplary options, with sample fields. A Streetlamp Height field may identify the height of the tower on which the antennas are mounted. Additional antenna sets may be added. A Coverage Width field may be used referring to the degrees of coverage for the lobe antenna choice, when lobe is selected.

Arm, photocell, microcell, luminaire, and pole elements may be represented on the canvas by a microcell tower wrapper element and stored in Object File 402. The wrapper element may be linked to a segment for the creation of a Network Pathway (also stored in Object File 402). Once placed, the user may be able to rotate the placement to make the sure the coverage pattern of the antenna is optimal for site conditions (such as alignment along an autobahn). The tower may default to a circular omni coverage pattern, which may be represented by a circular frustum.

Figure 27:
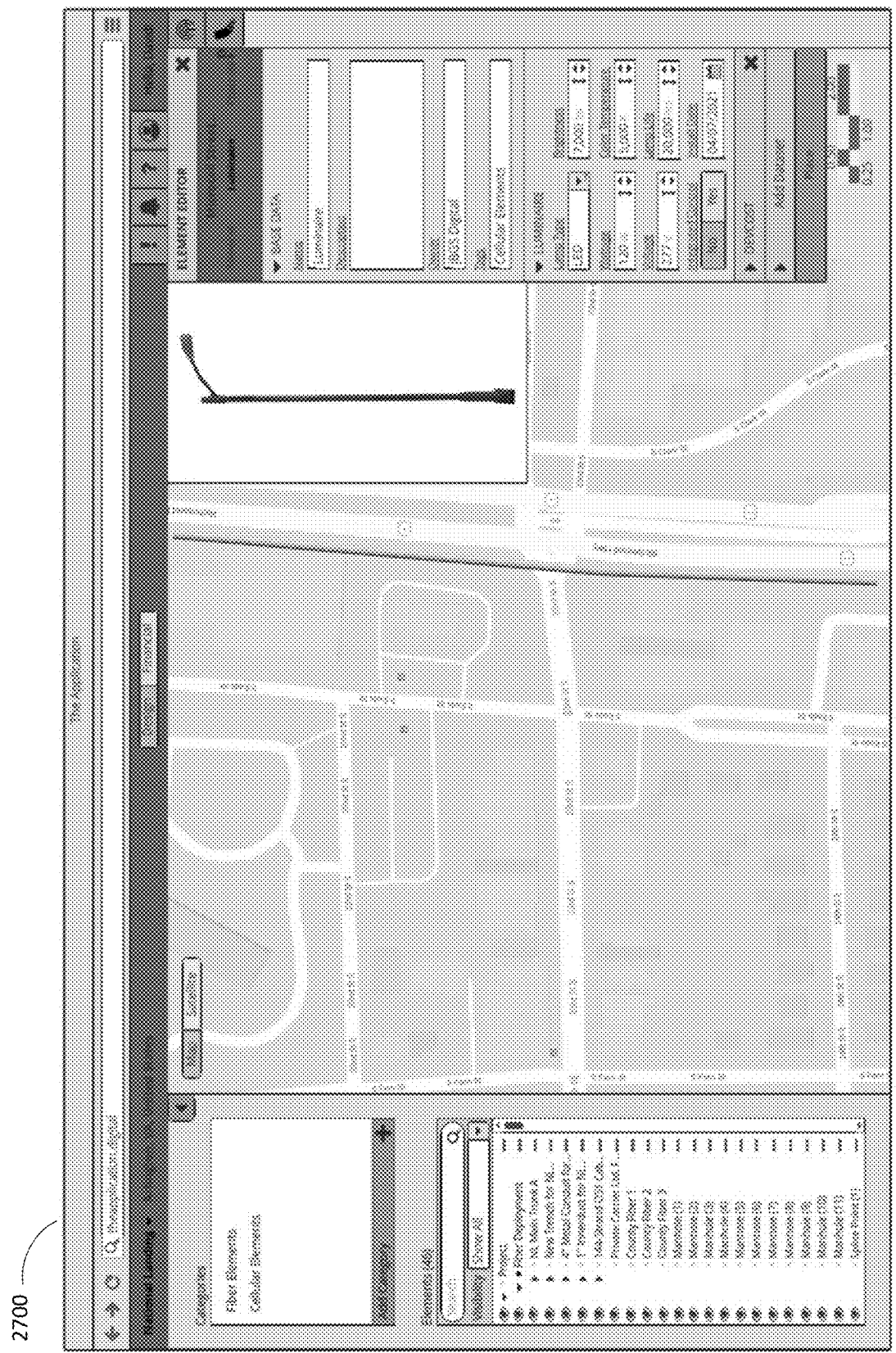
FIG. 27 illustrates a Microcell Luminaire Configuration Embodiment.

FIG. 27 illustrates a Microcell Luminaire Configuration Embodiment 2700. Microcell Luminaire Configuration Embodiment 2700 includes several additional options for a luminaire. Some of the exemplary options may include lamp type, brightness, wattage, color temperature, voltage, lamp life, integrated control and installation date.

Figure 28:
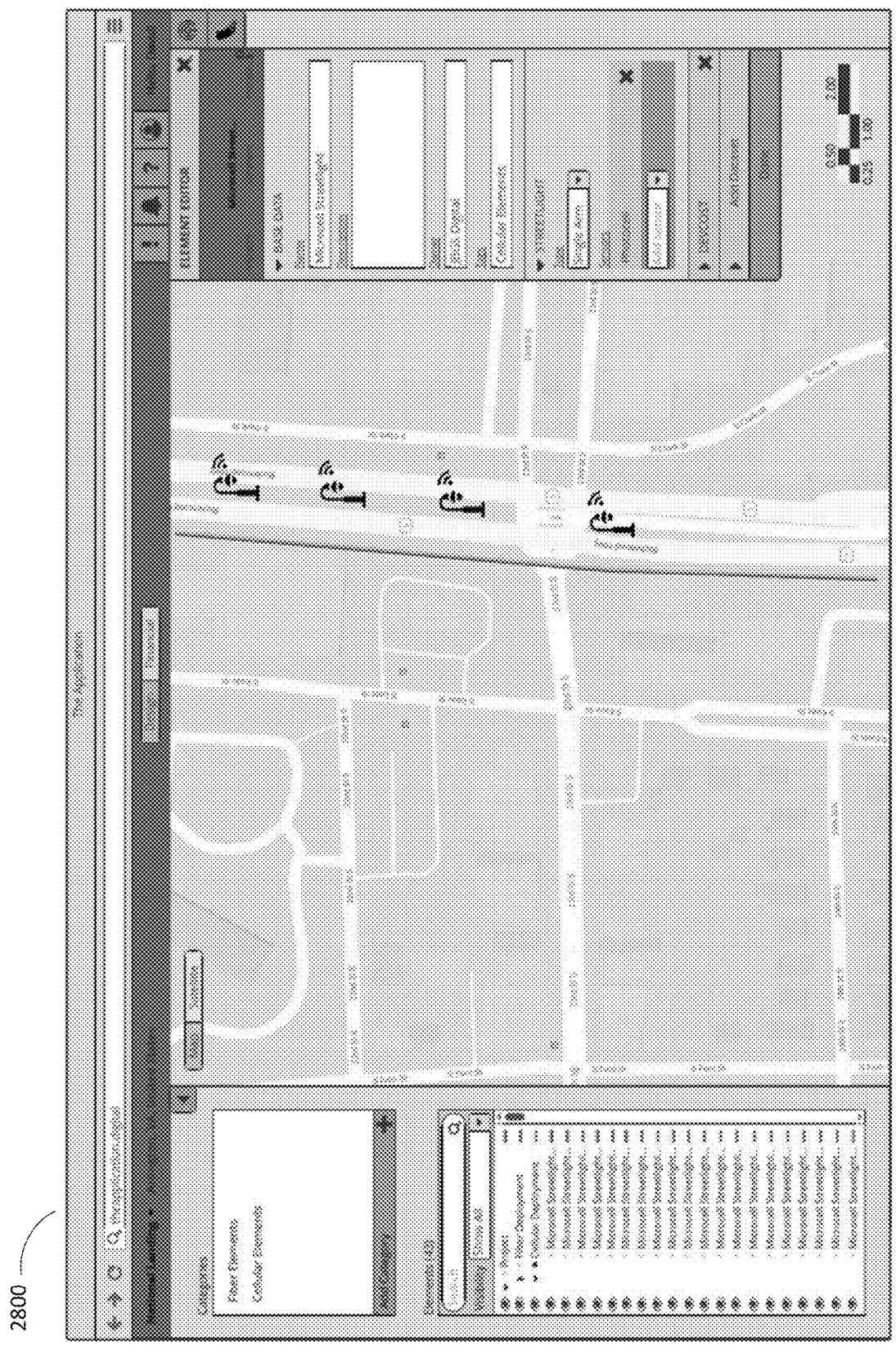
FIG. 28 illustrates a Microcell Streetlight Placement Embodiment.

FIG. 28 illustrates a Microcell Streetlight Placement Embodiment 2800. As illustrated, several Microcell Streetlights have been placed in Microcell Streetlight Placement Embodiment 2800. As illustrated 4 Microcell Streetlights have been placed on Richmond Highway which can be used for illustration and visualization purposes presented in FIGS. 33-35 and FIG. 38.

Figure 29:
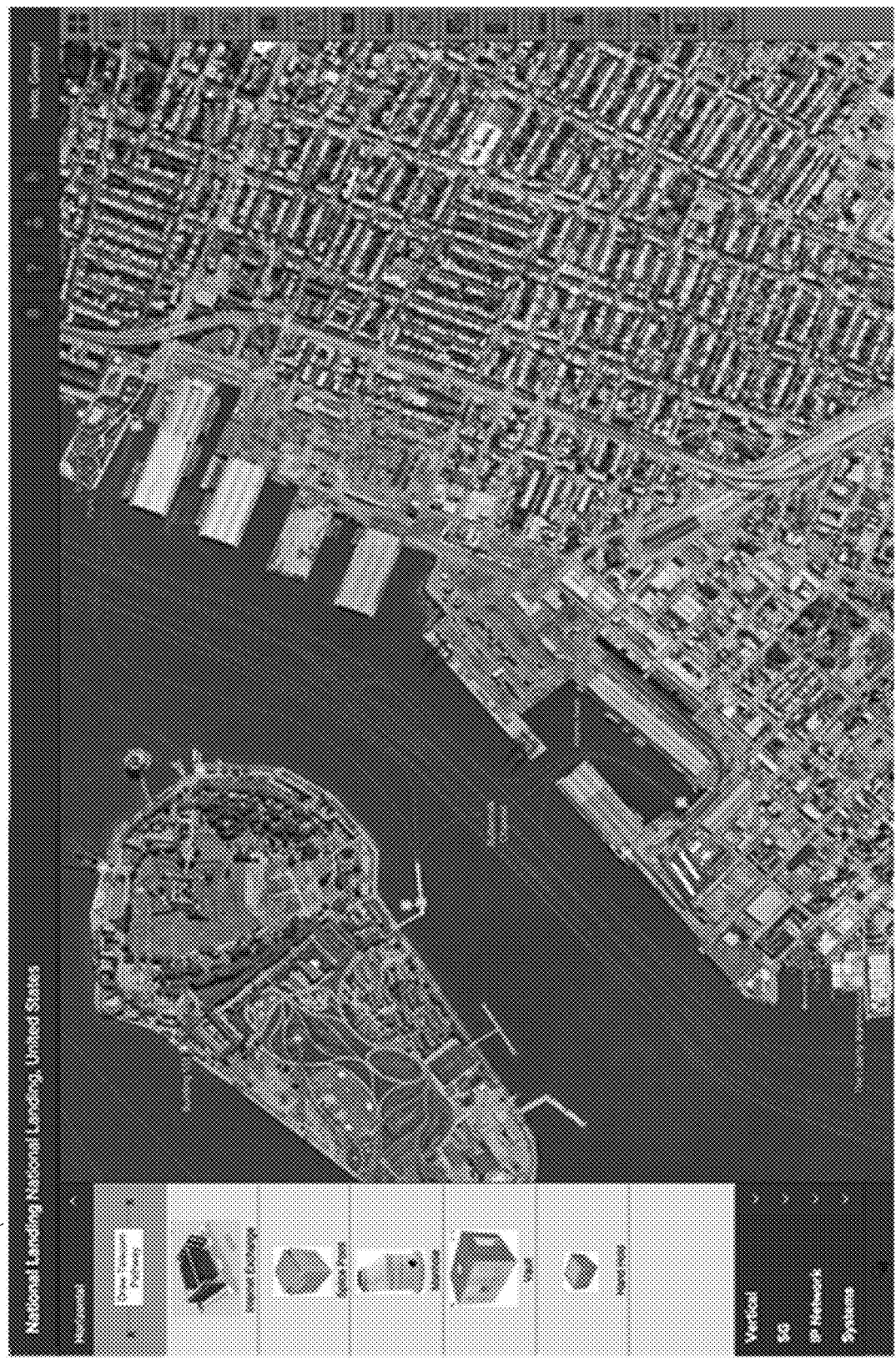
FIG. 29 illustrates an exemplary GUI Embodiment for Creation of Horizontal Technology.
Figure 30:
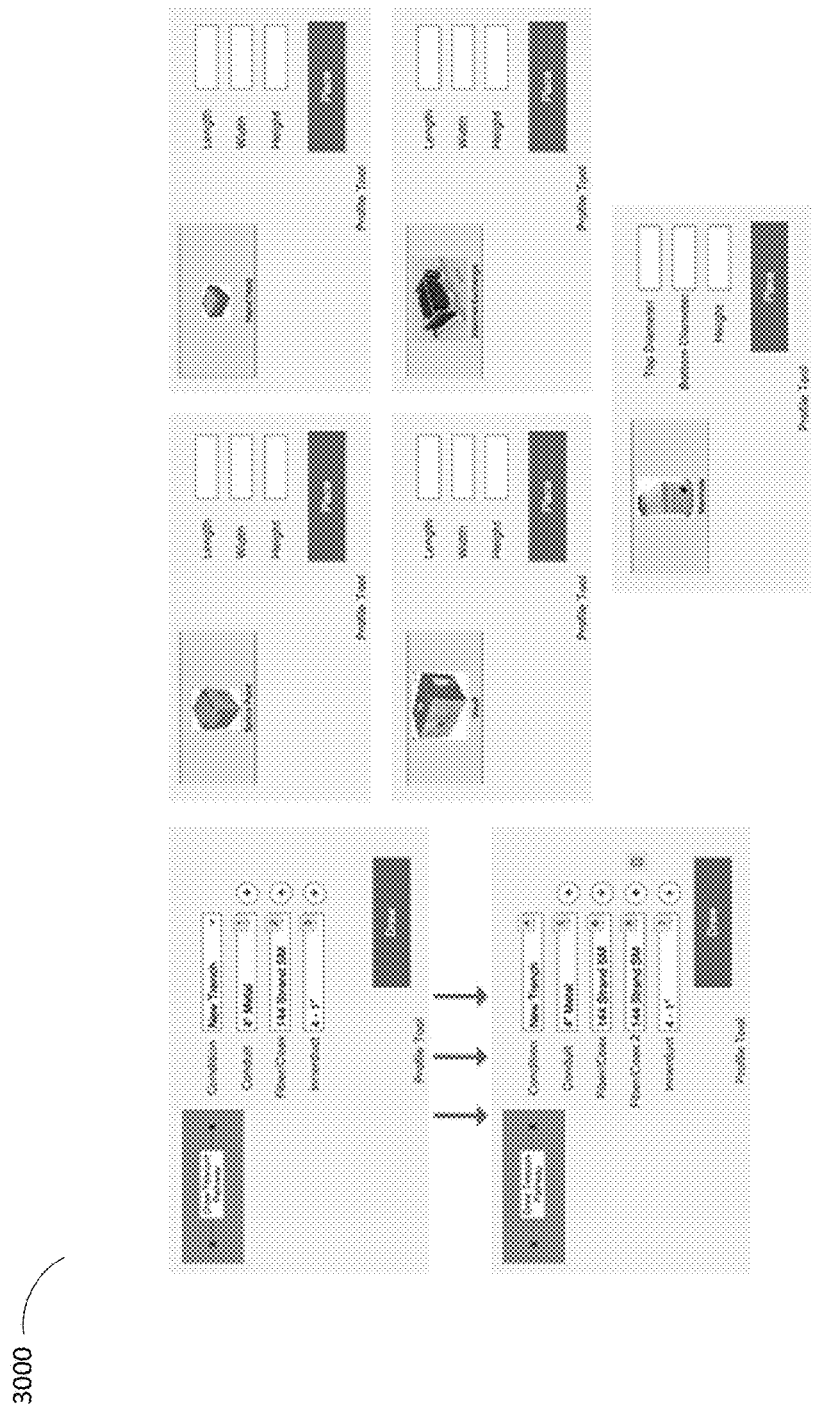
FIG. 30 illustrates Exemplary Options Interface for Horizontal Technology Elements.

FIG. 29 illustrates an exemplary GUI Embodiment 2900 for Creation of Horizontal Technology. Horizontal Technology GUI Embodiment 2900 has Telecom Pathways and Telecom Elements which may be added for example, as follows:

Telecom Pathways—the User may use a Draw Tool to create pathways for telecom, including, for example, the conduit, fiber, coax, and innerduct. A line drawn may create the pathway. When Draw Telecom Pathway is selected, a Profile Tool may open for configuration (as illustrated in FIG. 30).
  a. A user may make the required profile selections for the element with the drop down menus illustrated in FIG. 30. The first selection may be the Condition. Exemplary conditions include: New Trench (a completely new trenching and conduit), Open Street (when conduit is added while the street is under construction), and Existing Conduit (when empty conduit is open and available for use).
  b. A user may then make a subsequent selection of the type of conduit. A second and any additional number of conduits may be added. The conduit layout may auto-configure based around known industry practices (2×2, 4×2, etc. as more conduits are added).
  c. A user may then make a subsequent selection of the fiber or coax which will run inside the conduit. A second and any additional number of fiber or coax runs may also be added.
  d. A user may then make a subsequent selection of the type of innerduct that will be run inside of the conduit. Only one choice can be made for each conduit in some embodiments.
  e. Once the Profile is complete, a user may select the Draw tool to begin the pathway creation (see for example, FIG. 40A).
  f. A user may click where the pathway should begin. Each subsequent mouse click may complete a Segment.
  g. The profile of the Segment may automatically be inherited from the prior Segment.

The pathway profile for any Segment may be modified at any time:
  a. By right-clicking or double-clicking on a pathway segment, the Profile Tool may open.
  b. Multiple segments may also be selected simultaneously.
  c. Once selected, the Profile Tool may open and any number of conduits and their contents may be modified, deleted, or added.
  d. All Segments, Telecom Pathways and updates may be stored in Object File 402 and uploaded for multicasting.

Telecom Elements: a user may use the Placement Tool to drop in horizontal telecom elements, such as handholds, manholes, vaults, and splice points. The user may be able to indicate the location of Access Points in their project to rigorously document fiber networks and to provide accurate costing for planned construction. All Telecom Elements and updates may also be stored in Object File 402 and uploaded for multicasting.

Figure 39:
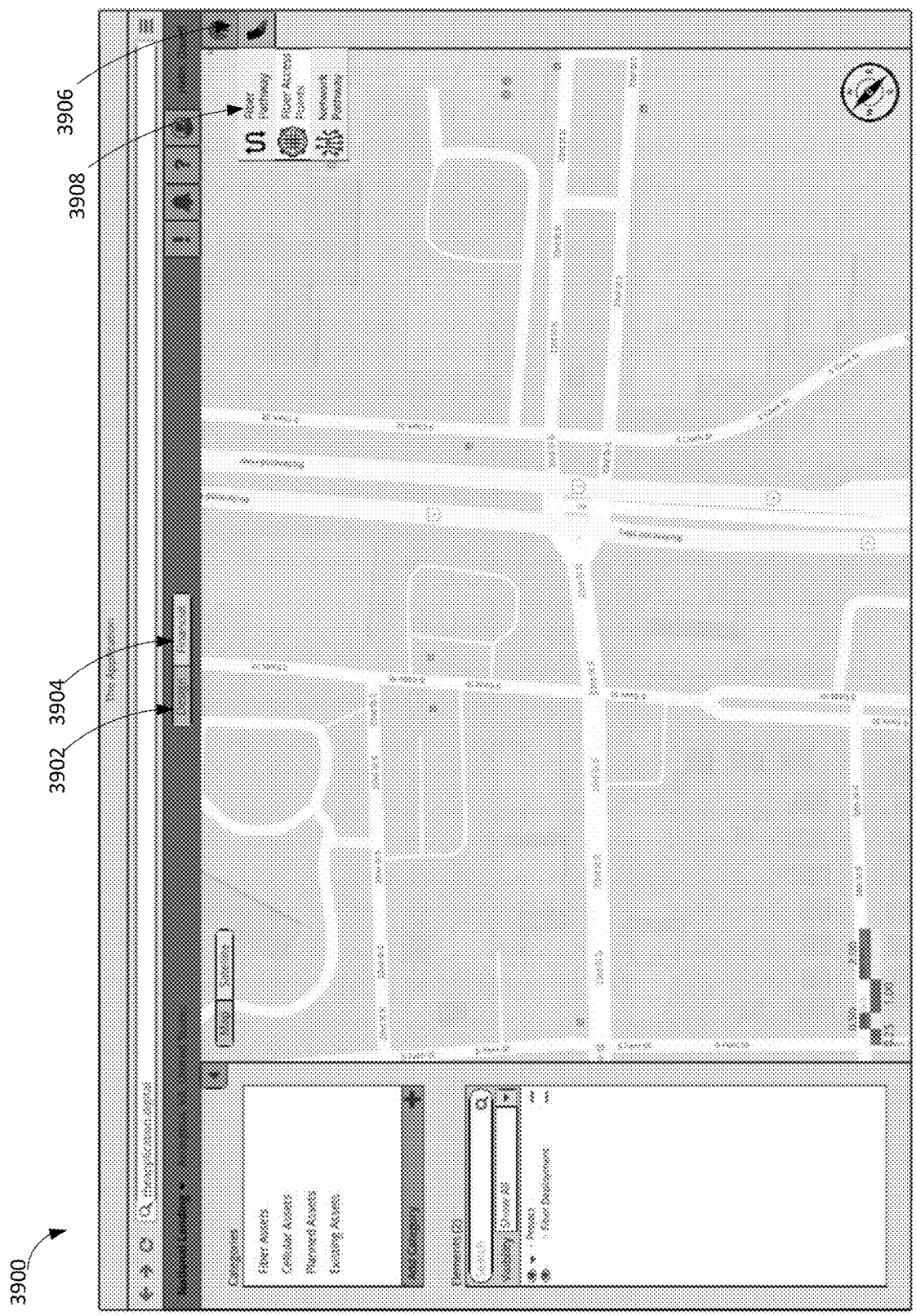
FIG. 39 illustrates an exemplary fiber deployment interface, according to some embodiments.

In another embodiment in FIG. 39, when the user presses the Fiber Toolset Button in the Tool Column, the second option from the top is Fiber Access Points. Choosing Fiber Access Points may open a submenu with four additional options: Vault, Manhole, Handhole, and Splice Point. The user can place vaults, manholes, handholes, and splice points using the typical element placement flow.

Splice points can be placed within (i.e., in the same place as) vaults, manholes, and handholes. When a splice point is contained within a vault, manhole, or handhole, then it is linked to said vault, manhole, or handhole. Vaults, manholes, and handholes would not be linked to each other-only to splice points and fiber pathways. Vaults, manholes, and handholds cannot be stacked on top of one another in the same way that splice points can be placed in the exact same spot as a vault, manhole, or handhole.

In FIG. 29, to use the Placement Tool, a user may single-click on the element to be added from the palate on the left. The Profile Tool may open to provide the drop-down menus for each element.
  a. The user may make required profile selections for the element with the drop-down menus and select Place in FIG. 30.
  b. The user may then single click to place or drop in the element around the project, then, single click to place or drop in the element.
  c. A user may select Undo to undo the placement.
  d. A user may choose to stop using the Placement Tool.
  e. All of the Telecom Elements may drop in with their tops at grade with the remainder of the elements below grade with a pathway going through it.
  f. The Internet Exchange may be a standalone building, or, go within an existing building on a given floor slice. The user may be able to drop it in a floor and move it around.

The Internet Exchange may be a room that is 32' long×20' wide×12' high, for example, that will go inside an existing building on the north side of the site. The Splice point may vary in size. For example, it may be a 4'×4'×6' box that would sit at grade/level of the street.

FIG. 30 Illustrates Exemplary Options Interface for Horizontal Technology Elements. Exemplary conduit options may include for example, 2" PVC, 2" Metal, 3" PVC, 3" Metal, 4" PVC, 4" Metal (default), 6" PVC, 6" Metal, 8' PVC, 8" Metal. Exemplary fiber/coaxial options may include for example, 4 Strand SM, 6 Strand SM, 8 Strand SM, 12 Strand SM, 18 Strand SM, 24 Strand SM, 36 Strand SM, 48 Strand SM, 72 Strand SM, 96 Strand SM, 144 Strand SM (default), and/or 288 Strand SM. Exemplary innerduct options may include for example, 4-1", 6-1", 8-1". Exemplary condition options may include for example a new trench, open street and/or existing conduit. Additional examples may be considered for each option as well as variations.

Internet Exchange

The user may be able to place Internet Exchanges (IEs) around their projects as sources from which a Network Pathway may begin. Selecting the Internet Exchange option may open an Element Editor for an IE. Datasets appended to an IE element and stored in Object File 402, may include:
- Base Data
  - Name
  - Description
  - Owner
  - Tags
- Status
  - State
    - Planned
    - Existing
  - Internet Exchange
  - Length
  - Width
  - Height
- DevCost
- Documentation The user may configure the IE and place it once they are satisfied with the configuration they established. The group selection dialogue may appear and allow the user to determine where in the element hierarchy they would like to insert the IE(s) they intend to place. The user may continue placing IEs until they either (1) need to change the group that IE falls under or (2) want to alter the properties of the IE, at which point they may select Stop Placement button in the Element Editor (which has been visible this entire time). Having stopped the placement, the user can either adjust the properties of the IE or hit the Place button again to be prompted to reselect the group.

Figure 31:
FIG. 31 illustrates Exemplary Launch Page for Creation of 5G Technology Elements Interface.

FIG. 31 illustrates Exemplary Launch Page for Creation of 5G Technology Elements Interface. 5G Technology has many types of elements which may be added, for example:
1) 5G Elements: Use the Placement Tool to drop in 5G elements, such as rooftop antennas and light poles. To use the Placement Tool, single-click on the element to be added from the palate on the left of FIG. 31. To manipulate the 5G Element, the user may:
    a. Make required profile selections for the element with the drop-down menus from FIG. 32, and select Place.
    b. Then, single click to place or drop in the element around the project
    c. Use undo to undo the placement
    d. Use esc (escape key) to stop using the Placement Tool
    e. To delete an element, select the element by single-clicking it and then hit the delete key
2) MacroCell Tower elements which drop in on grade where placed. The tower height, as well as the number and type of cells and the sphere of coverage area may be edited.
3) Rooftop Antenna elements which drop in on top of the building where placed. The tower height, as well as the type and size of cells as well as the coverage area may be edited. Typically, rooftop locations have multiple antennas for different frequencies and coverage areas.
4) Light Pole Antenna elements which drop in on grade where placed. The pole height, as well as the type of cell and the sphere of coverage area may be edited.
5) Building Antenna elements are placed in on the surfaces or sides of buildings. The height above the ground (calculated by placement) as well as the type of cell and the sphere of coverage area may be edited.

The highlighting/color of the Tool Palate may be different than the Storytelling accordion menu highlighting/color palate for easy identification and distinction. The overall Tool and Placement Palate may not be as wide as shown as well.
1) The Rooftop Antennas may have a coverage sphere of 1.5 miles, for example.
2) The Light Pole Antennas may have a coverage sphere of 150 meters, for example.
3) The Building Antennas may have a coverage sphere of 150 meters (away from the building), for example in some embodiments.

FIG. 32 illustrates Exemplary 5G Element Options. In some embodiments each of the fields may be input by the user. In other embodiments drop downs may be presented. Users may be able to modify the pole height, antenna type, antenna height, and antenna range of mounted microcells, for example. In some embodiments, users may be able to also view different representations of mounted microcell and macrocells' coverage patterns such as in FIGS. 33-35 and 38.

In some embodiments, Tower Height may be specified from 30, 36, 42, 48, 54, 60, 66, 72, 78, 84, 90, 96, feet and/or Other. Antenna Type may be, for example 4G Low, 4G Mid, 4G High, 5G Low, 5G Mid, and 5G High. Antenna Quantity may be 3, 6, 9, 12, 15, 18, etc. Antenna range may be 1 Mile, 1.5 Mile, 2 Mile, 2.5 Mile, 3 Mile, 3.5 Mile, 4 Mile, 4.5 Mile, 5 Mile. In another embodiment the range may be (in feet or other metric unit), 100, 125, 150, 175, 200, 225, 250, 275, 300, 350, 400, 450, 500, etc. Pole height may similarly be, 27, 30, 33, 36, 39, 42, 45, 48 feet or other metric unit.

In some embodiments, Users may be able to configure their microcell mounted element using the Element Editor and then selecting Place to choose a location for the microcell mounted in the project(s). The Mounting Height may be determined by the user when they place a microcell mounted to a building, for example. Once stuck to a building, a numeric field showing the height above ground may appear. An Ableton-inspired numeric field may be utilized in some embodiments. The user may then be able to move the antenna up and down on the building accordingly.

Macrocell Tower

Users may be able to place Macrocell Towers on the Canvas. Users may be able to see a given Macrocell Tower's Coverage Pattern in some embodiments. The Macrocell Tower's Data Sets may be configured in the Element Editor [Panel] before it is placed on the Canvas. Inputs may include for example, Pole Height, Antenna Set, Technology, Antenna Height, Band, Mounting Height, Range, Coverage Width, and/or Allocation.

Once the specifications for a Macrocell Tower are configured, the User may be able to place the Macrocell Tower anywhere on the Canvas. The visualized Macrocell Tower may be attached to the cursor while the User is in placement mode. The User may exit placement mode by pressing Esc. The configuration choices made for the Macrocell Tower may remain set in the Element Editor if the User reenters placement mode. Users may be able to rotate placed Macrocell Towers so they can optimize their Coverage Pattern. Example: Orienting Macrocell Towers along an autobahn to maximize traveler coverage.

Macrocell Towers may be added to the Canvas on-grade. After placement, a User may be able to edit some of the Macrocell Tower's properties from the Element Editor. For example, Height, Cell Number, Cell Type, and Coverage Area (Sphere) may be specified. Lobe Coverage Areas may enable visualization of three tiers of signal strength onto the Canvas. In some examples, every lobe on a Macrocell Tower is meant to cover 120 degrees of Coverage Area. There may be multiple Lobe Views depending on the quantity/type of Antenna.

Macrocell Towers may be Wrapper Elements representing a grouping of a specific Tower, Antenna Group(s) and/or Antenna Elements and stored in Object File 402. They may be linked to a Fiber Segment by the User to create a Network Pathway.

Macrocell Rooftop

The User may be able to configure Macrocell Rooftop as a Cellular Element and add it to the Canvas. The User may be able to modify the configuration of the Macrocell Rooftop after it has been placed. Specifically, the Pole Height, Antenna Type, Antenna Height, Antenna Range may be configured, for example. The User may be able to view different representations of a Macrocell Rooftop's Coverage Pattern (See FIGS. 33-35).

The User may place Macrocell Rooftops on the Canvas. The User may configure a Macrocell Rooftop from the Element Editor. Some settings may include Pole Height, Technology, Band, Antenna Height, Range, and Coverage Width, for example. After a Macrocell Rooftop has been configured, the User may click to place it anywhere on the Canvas in Placement Mode. The User may be able to rotate a placed Macrocell Rooftop to optimize it's Coverage Pattern. Lobe Coverage Areas may visualize three tiers of signal strength onto the Canvas.

In some embodiments, every lobe on a Macrocell Tower is meant to cover 120 degrees of Coverage Area. There may be multiple Lobe Views depending on the Antenna Type/Quantity. Macrocell Rooftops may be Wrapper Elements including representations of all antennae elements below them in the hierarchy. The User can connect a Macrocell Rooftop to a Fiber Pathway. The Macrocell Rooftop may be linked to the Fiber Segment automatically.

Figure 33:
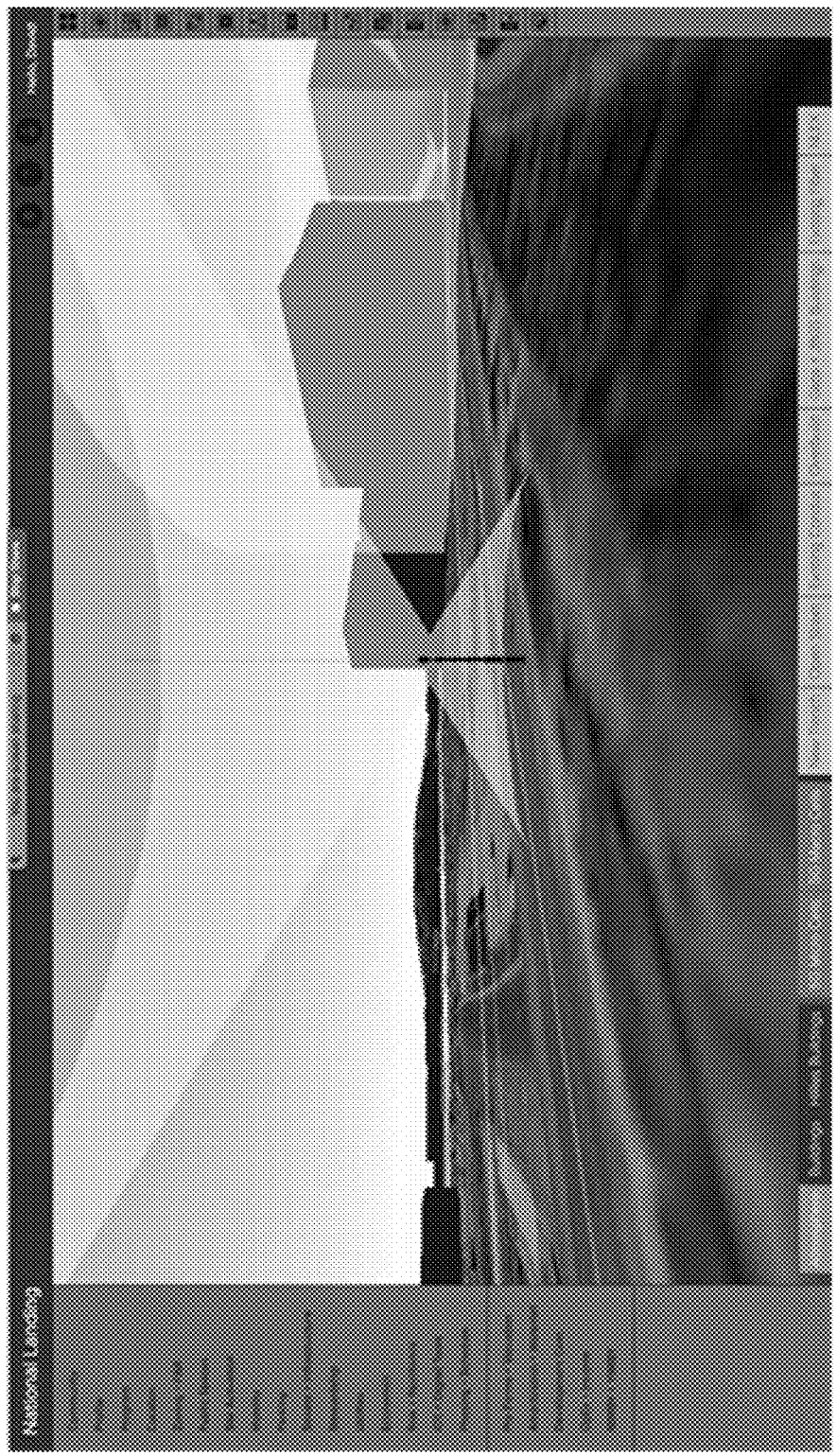
FIG. 33 illustrates an Exemplary Microcell Streetlamp Visualization Embodiment.

FIG. 33 illustrates an Exemplary Microcell Streetlamp Visualization Embodiment 3300. As illustrated a user can see the streetlamp Microcell visualized with its lobes projecting outwards in a 3D topographical depiction with specified lengths and heights being simulated.

Figure 34:
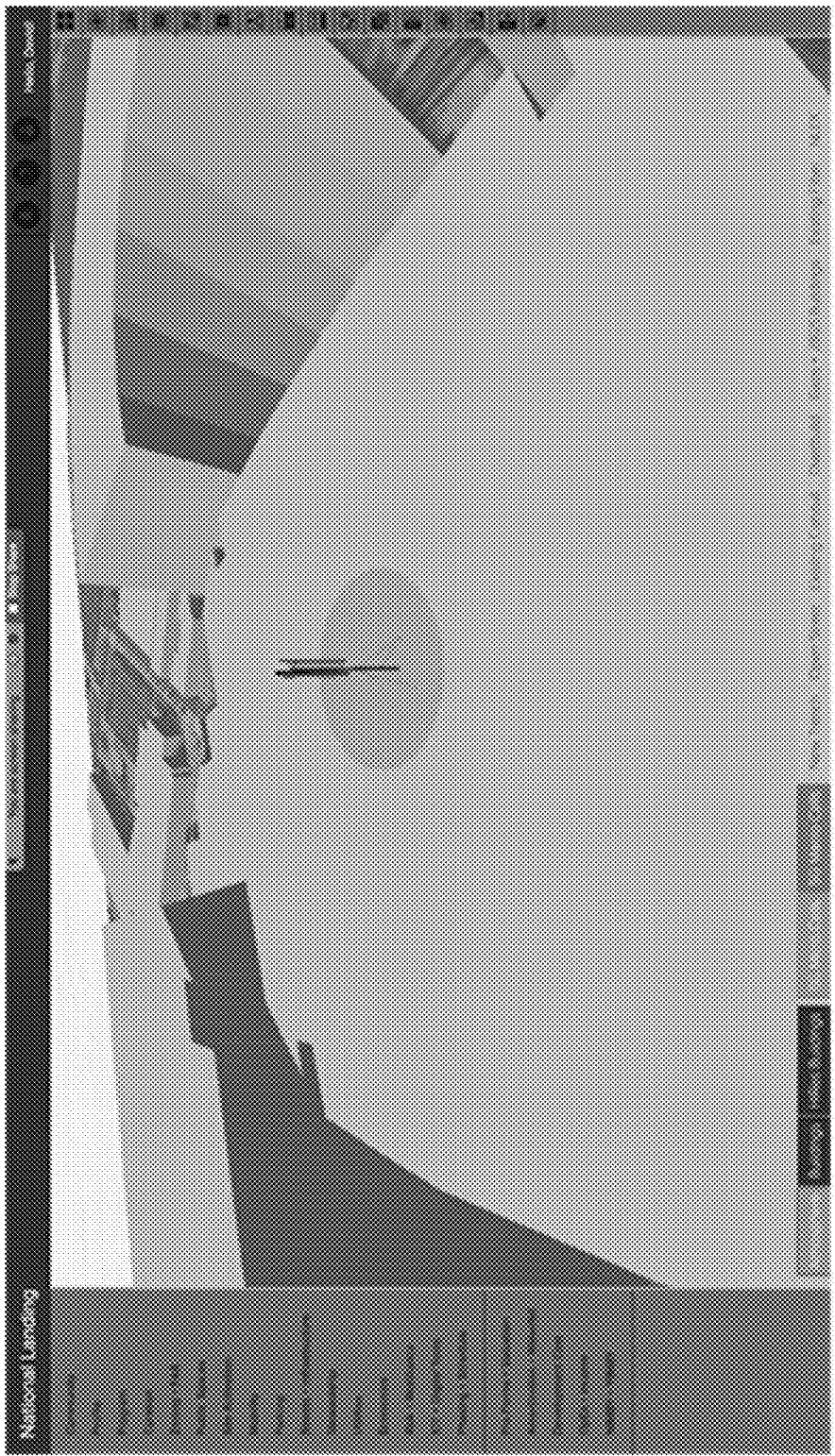
FIG. 34 illustrates an Exemplary Rooftop Macrocell Visualization Embodiment.

FIG. 34 illustrates an Exemplary Rooftop Macrocell Visualization Embodiment 3400. A user can similarly see the Rooftop Macrocell visualized with its lobes projecting outwards in a 3D topographical depiction with specified lengths and heights being simulated.

Figure 35:
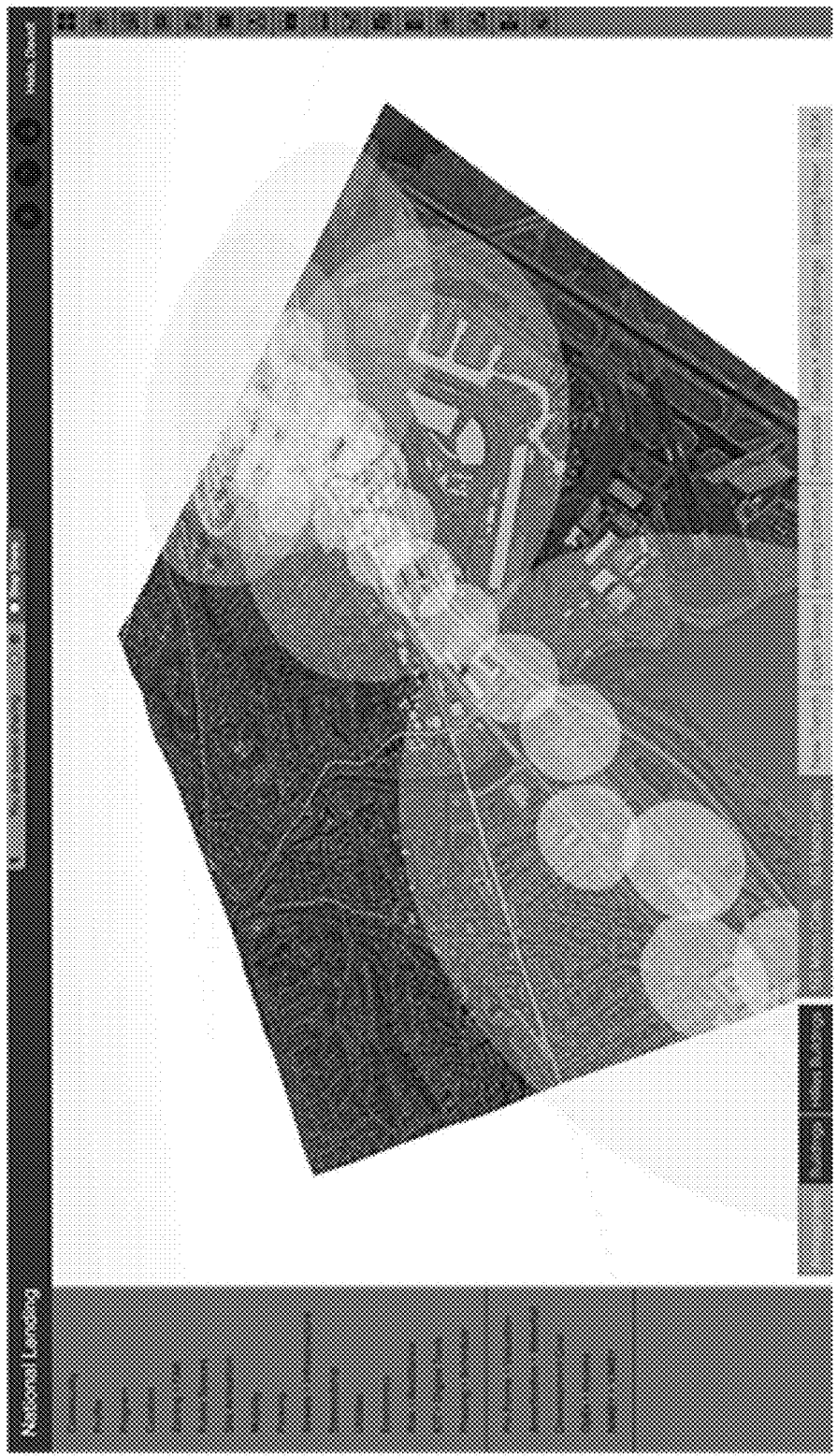
FIG. 35 illustrates an Exemplary Sitewide Coverage Visualization for Macrocell and Microcell Embodiment.

FIG. 35 illustrates an Exemplary Sitewide Coverage Visualization for Macrocell and Microcell Embodiment 3500. In Embodiment 3500, the 3D nature of visualizing the overlapping antenna projections is depicted. For example, further toward the top of the image it is illustrated how multiple overlapping signals can be imaged helping developers imagine the planned antenna configurations for future technologies. This visualization can be panned and zoomed and moved around. This moving around via panning and zooming and rotating enables users to accurately visualize the antenna projections in a real 3D basis upon the topography of their planned real estate development projects.

Figure 36:
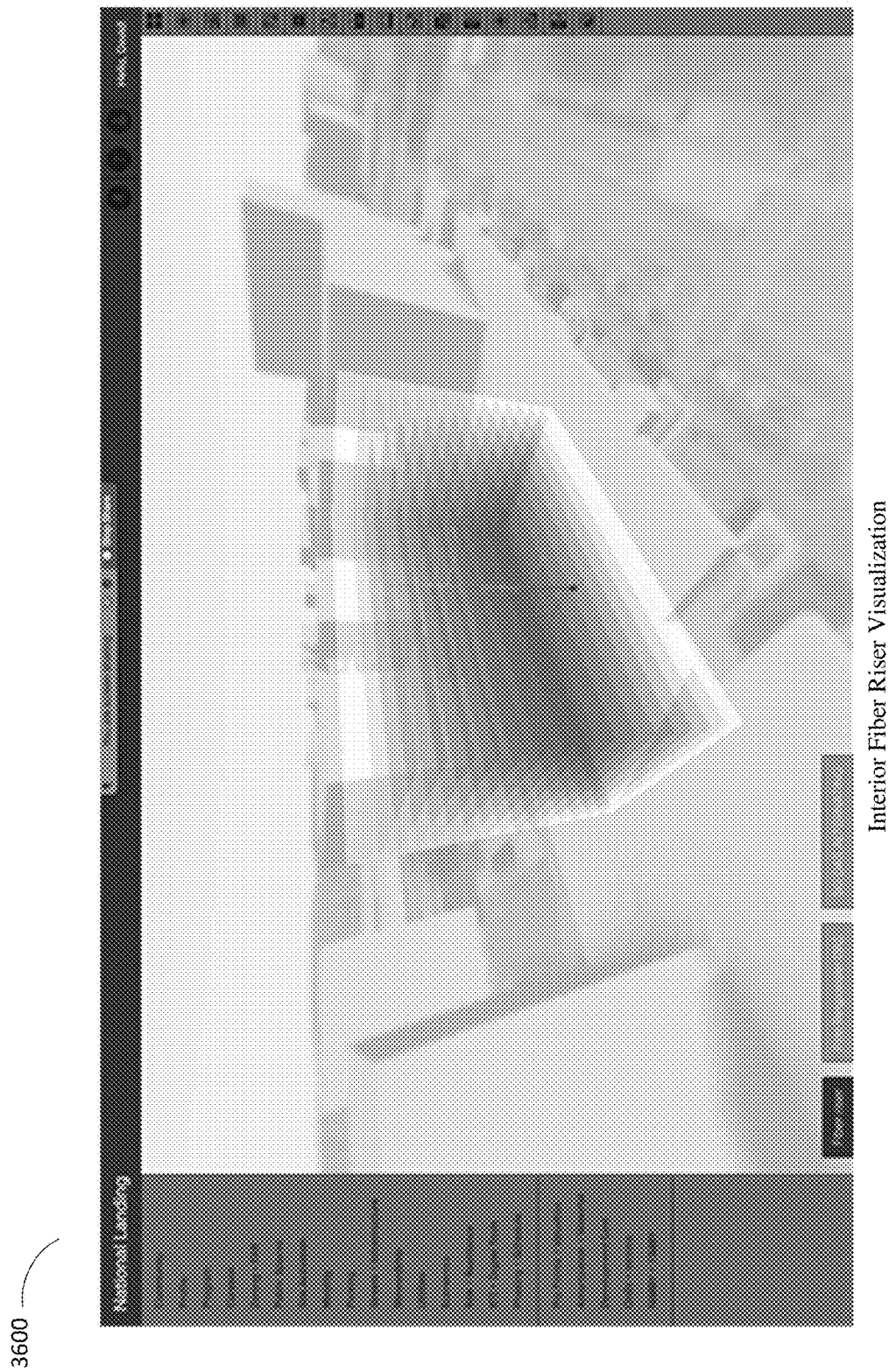
FIG. 36 illustrates an Exemplary Interior Fiber Riser Visualization Embodiment.

FIG. 36 illustrates an Exemplary Interior Fiber Riser Visualization Embodiment 3600. In Exemplary Interior Fiber Riser Visualization Embodiment 3600 the user may double click or select a building that was generated in step 1402. When the user double clicks the building, a hollow or partially transparent 3D image may be depicted. As illustrated, the user may have planned the Fiber configuration internal to the building. The number of floors may have been set, as well as the layout of the Fiber. The user is then presented with an active, animated illustration of the fiber within the planned building.

Figure 37:
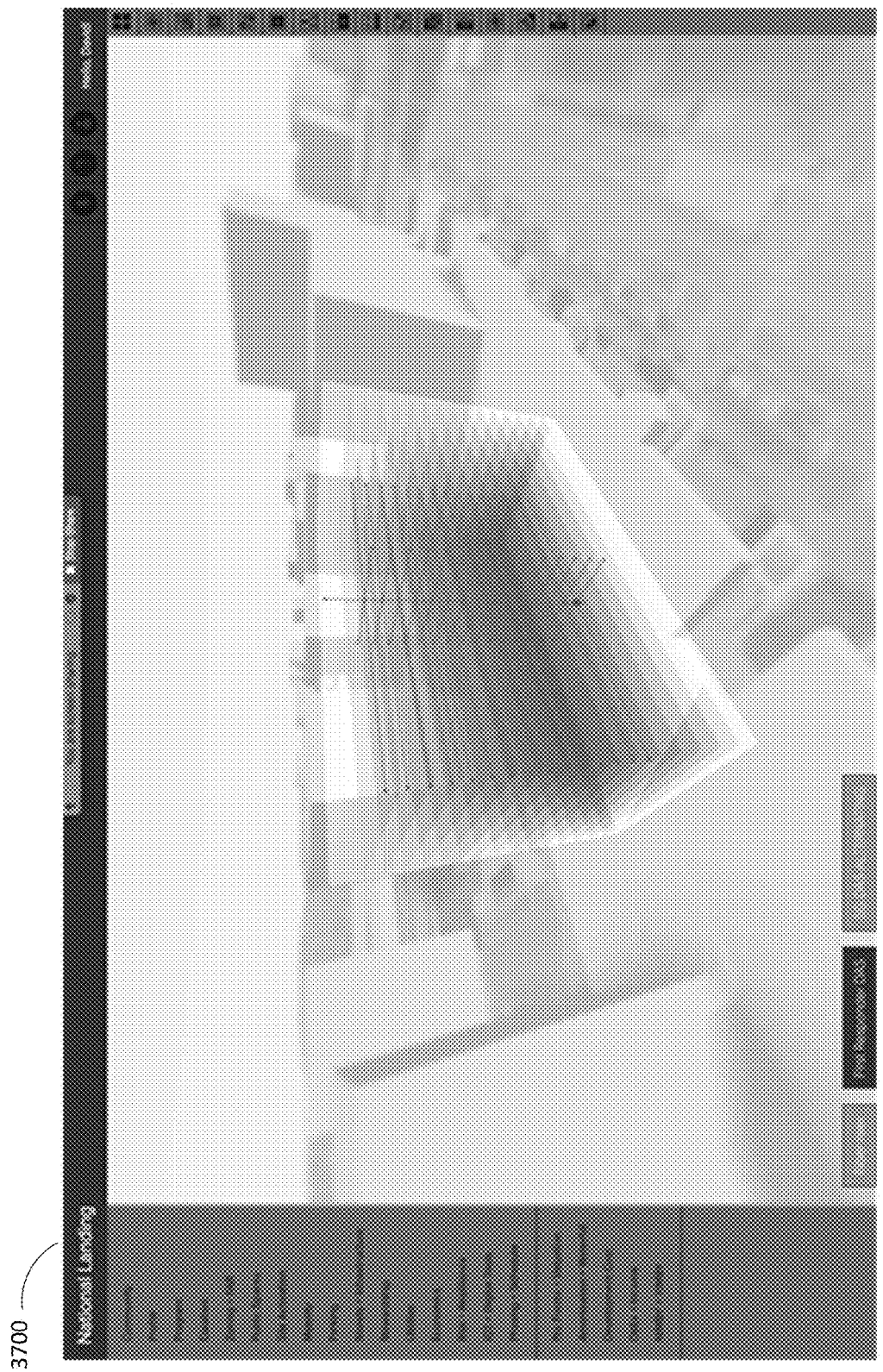
FIG. 37 illustrates an Exemplary Interior First Responder Distributed Antenna System (DAS) Visualization.

FIG. 37 illustrates an Exemplary Interior First Responder Distributed Antenna System (DAS) Visualization 3700. In Exemplary Interior First Responder DAS Visualization 3700 the DAS may be presented in a manner similar to that of FIG. 36. For example, the user may configure the DAS in one of the embodied configuration manners and create the DAS in the planned building in step 1402. The DAS may be planned on a per floor basis and the user may be presented with the exemplary visualization such that they may rotate the building and visualize the DAS in a three-dimensional manner on the topography of their planned development project.

Figure 38:
FIG. 38 illustrates an Exemplary Interior Microcell Distributed Antenna System (DAS) Visualization.

FIG. 38 illustrates an Exemplary Interior Microcell Distributed Antenna System (DAS) Visualization 3800. Similar to FIGS. 36-37 above, the User may be able to visualize the DAS for a microcell interior system they configured as well. As illustrated, the circular orbs or projections of the antennas may be calculated, stored in Object File 402 and presented to the user as in Exemplary Interior Microcell DAS Visualization 3800.

Fiber

In some embodiments users may be able to recreate existing fiber infrastructure within their project boundaries. For example, users may create the fiber infrastructure they are planning on implementing in their real estate development projects at one or more physical locations (projects). Users may be able to establish one or more groupings of fiber in order to allot to their customers. One exemplary embodiment of selecting and presenting options for fiber deployment is presented in FIG. 39.

FIG. 39 illustrates an exemplary fiber deployment interface 3900, according to some embodiments. As illustrated a user may select between a Design Interface 3902 and a Financial Interface 3904. The presented embodiment illustrates the Design Interface 3902. A user may select the Fiber Deployment 3906 menu deployment and receive a sub-menu including options for inserting fiber elements to their project. For example, a Fiber Pathway, Fiber Access Points and Network Pathway may be selected as options for development.

In some embodiments, there may be a hierarchical representation and selection of fiber elements for deployment, visualization and simulation. For example, one or more implementations may use one or more conduits, which may house one or more innerducts. And the innerducts may house one or more cables with fiber strands. Other embodiments may be considered. For example, implementations may include several categories or types of conduits used in development such as trenches, direct burial, horizontal boring, and open street.

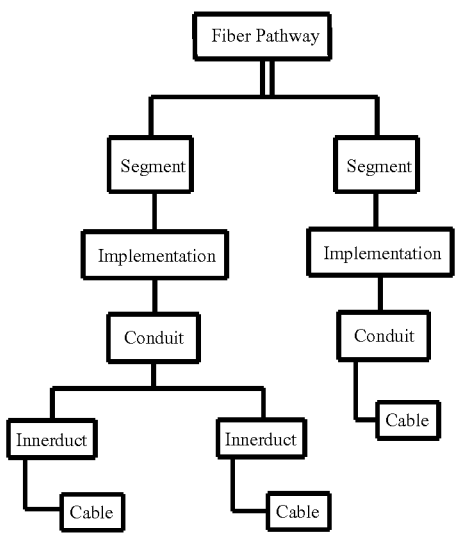

In order to create the correct simulation, visualization and development plan a hierarchical classification for the fiber elements may be deployed and stored in Object File 402. The Fiber Pathways may include one or more Fiber Elements comprising fiber runs. For example, Fiber Elements (as illustrated above) may include multiple Fiber Segments each with one or more deployments/implementations. Each implementation/deployment may have one or more conduits including various innerducts and/or cable arrangements. This enables the user to very efficiently simulate their network and digital infrastructure development plan in a 3D topographical environment.

Figure 40:
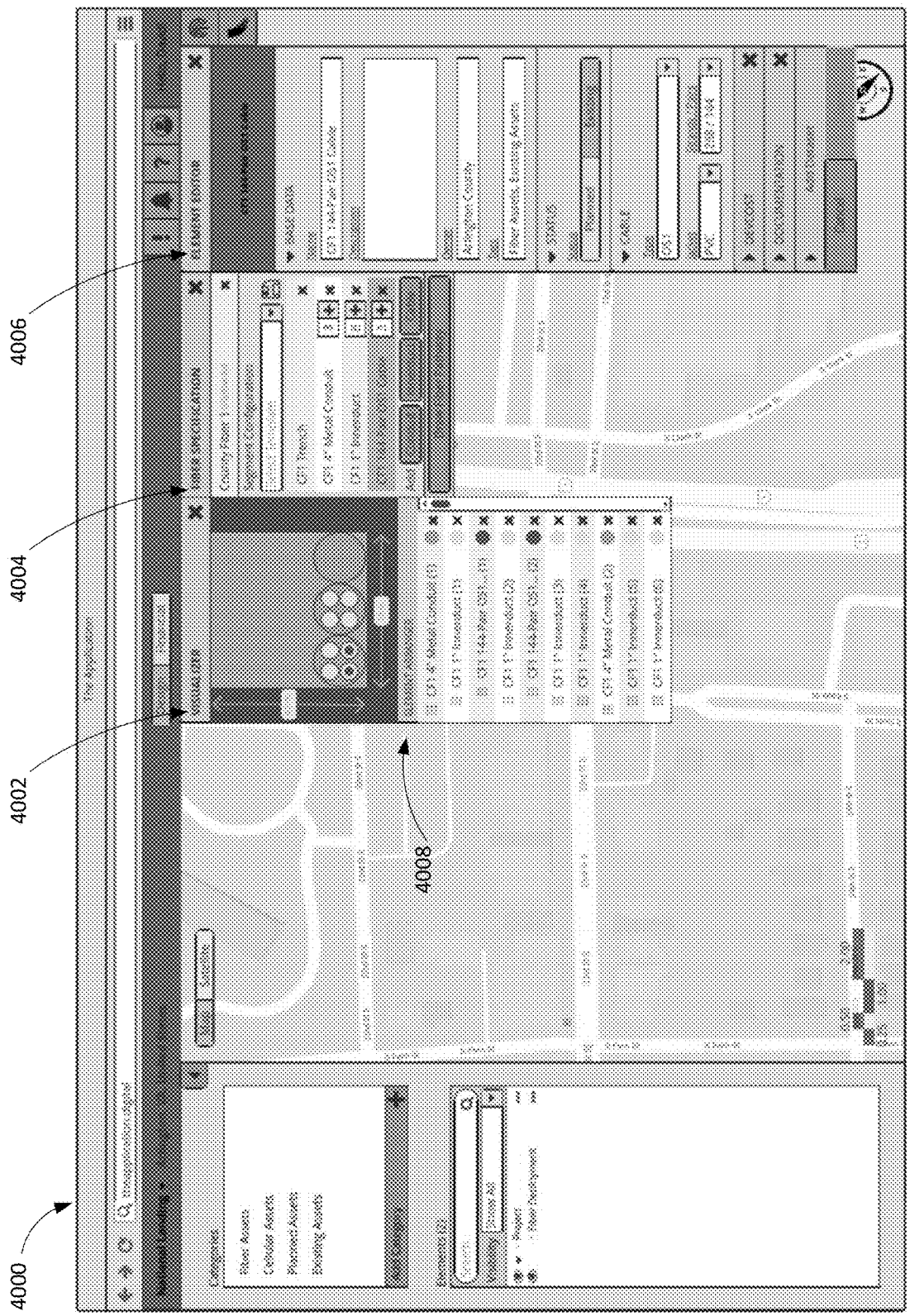
FIG. 40 illustrates an exemplary embodiment of a detailed Fiber Pathway implemented including several cables and innerducts assigned.

A Fiber Pathway may represent a grouping of contiguous Fiber Segments. The Fiber Segments may include one or more implementations as well as various configurations of Conduits, Innerducts and Cables. In some instances the Fiber Segments may be limited to only having one Implementation type. FIG. 40 illustrates an exemplary embodiment 4000 of a detailed Fiber Pathway 3908 implemented including several cables and innerducts assigned. In some embodiments, the Fiber Pathway 3908 may present one or more interfaces such as a Visualizer 4002, a Fiber Specification Configurator 4004 and an Element Editor 4006.

The Fiber Specification Configurator 4004 may list all the elements in the Fiber Pathway hierarchy mentioned above. The Fiber Specification Configurator 4004 may allow the user to configure each element's settings. The user may need to configure the Fiber Pathway before being able to configure the other elements in some embodiments. The user can configure the Fiber Pathways via the Element Editor 4006.

The user may configure a Fiber Segment's Deployment in the Element Editor 4006. For example, the user may specify the Base Data, Status, DevCost, Cable information/Deployment and any documentation needed. When the Fiber Segment's Deployment has been configured in the Element Editor 4006, then the Visualizer 4002 may be displayed automatically presenting one or more cross-sections of the Fiber Segment Deployment selected by the user. Further, the user may configure a Fiber Pathway's Conduit, Innerduct, and Cable in the Element Editor 4006. The user may have multiple configurations of Conduit, Innerduct, and Cable within a single Deployment. For Example: a Trench may have both 4" PVC Conduit and 5" Metal Conduit. The User may begin drawing the Fiber Pathway if desired. This may allow the User to establish all of their project's fiber runs at a high-level before deciding details.

After configuring the Conduit, Innerduct, and Cable in the Element Editor 4006, the User can add them to the Fiber Segment. After adding Conduit, Innerducts, and Cables to a Fiber Segment, the user can establish their parent/child relationships in the Element Arranger 4008. In some embodiments, the user may drag-n-drop Innerducts to the Conduit level of the parent/child hierarchy. The user may drag-n-drop Cables to the Conduit or Innerduct levels of the parent/child hierarchy. When the user moves an element that has children in the Element Arranger 4008, the children may move with it.

In the Visualizer 4002, the user may manually rearrange set-families of Conduit, Innerducts, and Cables within the Deployment Visualization in the Visualizer 4002 by drag-n-dropping them. Conduit, Innerducts, and Cable may not be suspended in-air within a Deployment. Placed-Elements must either (i) exist on the lowest level of the Deployment or (ii) have another Conduit/Innerduct/Cable directly below it.

In some embodiments, when a User releases a click-and-held family of elements, that family of elements will fall downwards until it makes contact with another family of Conduit/Innerduct/Cable elements or the bottom of the Arrangeable Area in the Element Visualizer. The family of elements may snap to the nearest family of elements it can make contact with.

The user may specify configurations and quantities for each element involved in the Fiber Pathway in Fiber Specification 4004. When a user deletes a configuration in Fiber Specification 4004, it may delete every element in the Visualizer 4002 and Element Arranger 4008 using that configuration. In some embodiments, children elements of those deleted may be considered as unassigned and be moved/indicated as such in Element Arranger 4008.

When choosing the Draw mode the user may be able to see each configuration and quantity of elements comprising the Fiber Pathway. In Draw mode (when the user is drawing the Fiber Pathway) the Visualizer 4002, Element Arranger 4008, Fiber Specification 4004 and Element Editor 4006 may be hidden from view.

As illustrated in Element Editor 4006 names may be specified and customized by the user for each project. As illustrated, (CF) is an abbreviation for County Fiber as created in Element Editor 4006 and used in Fiber Specification 4004 to identify the Trench, Metal Conduit, Innerduct and Cable.

Figure 40A:
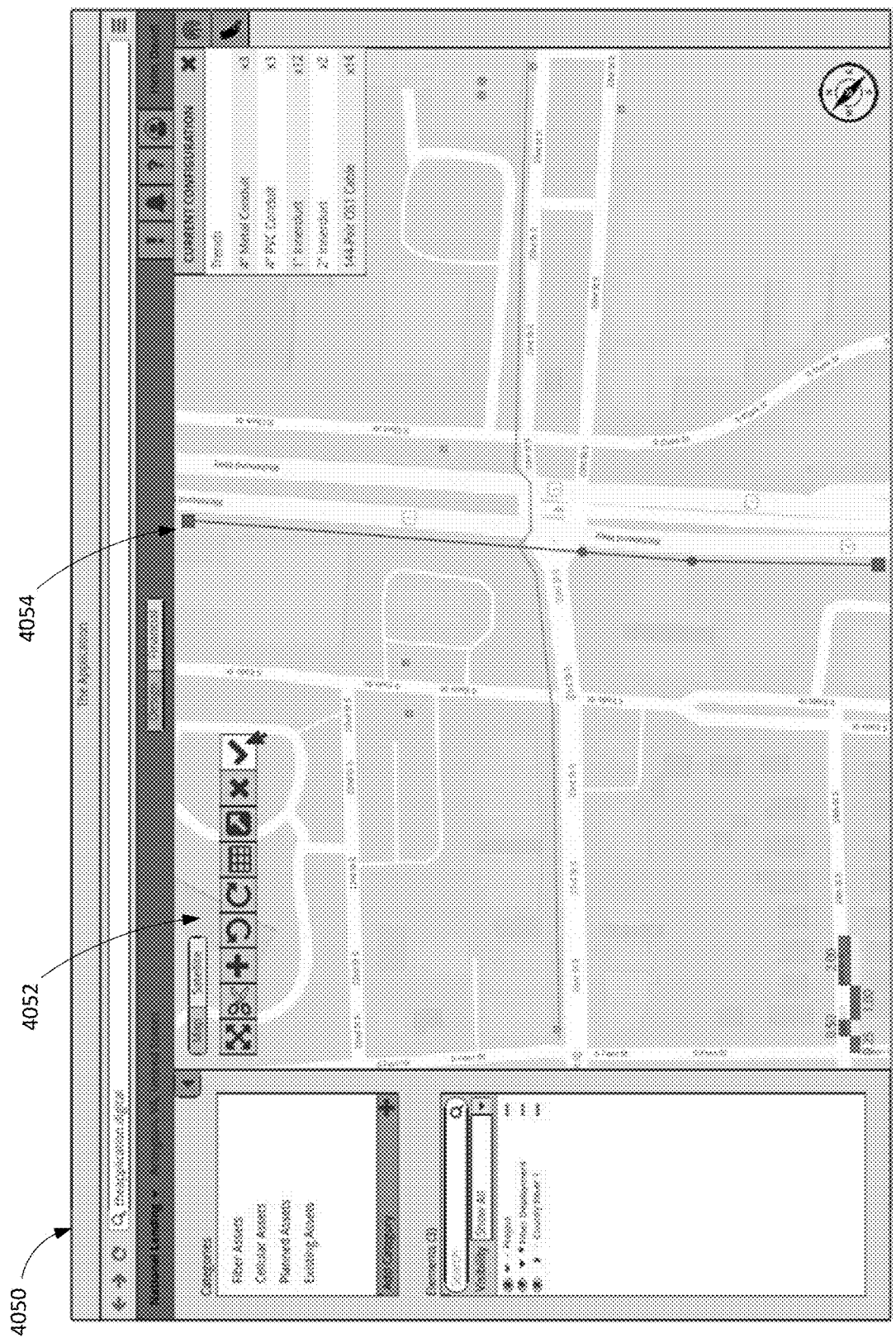

FIG. 40A illustrates an exemplary embodiment for drawing mode 4050. Drawing mode 4050 may enable a user to be able to draw the Fiber Pathway in the 3D model by adding vertexes along the Fiber Pathway. The user may be able to see each configuration and quantity of elements comprising the Fiber Pathway while in the drawing mode. The user may be disabled from editing any comprising-element's quantity or configuration while in Draw Mode. The Element Visualizer, Element Arranger, Fiber Specification, and Element Editor may be prevented from being displayed in some embodiments, while the User is in Draw Mode.

To place the starting point for a Fiber Pathway, the User can click at any point on the Canvas. This will place the first vertex of the Fiber Pathway. This first vertex of a Fiber Pathway may be a Segmentation Vertex. And may not be moved once it has been placed by the User To place a second point for a Fiber Pathway, the User may click at any other point on the Canvas. This will place the second vertex. All vertices added-except for the start and end vertices—while drawing a Fiber Pathway may be referred to as Basic Vertices. The two placed vertices on the Canvas may be connected with a Geometric Line Segment.

The User may continue placing Basic Vertices in the Canvas with single-clicks. The Geometric Line Segments for a Fiber Pathway may connect to its vertices in the order that the User placed the vertices. Basic Vertices may only connect to two Geometric Line Segments. When more than two Geometric Line Segments are connected to a Basic Vertex, it becomes a Segmentation Vertex and functions accordingly.

At any point after a Basic Vertex has been placed, the User can click-and-hold it to move it around the Canvas and drag it to a new location. Segmentation Vertices may not be moved by the User once they have been placed. When the User places a Segmentation Vertex in the wrong location, they may undo it.

To place the ending point for a Fiber Pathway, the User may double-click at a point on the Canvas. This will place the last vertex. The last vertex-like the first—may be a Segmentation Vertex. It may not be moved once it has been placed by the User. This may take the User out of Draw Mode. The Element Editor, Fiber Specification, Element Arranger, and Element Visualizer may become displayed again to the User. They may be configured exactly to the just-drawn Fiber Pathway.

This allows the User to create Fiber Pathways with the same specifications without having to re-enter in the specifications each time. In some embodiments, the Fiber Pathway may be applied to the Canvas. Its vertices may disappear and only the Geometric Line Segments will remain. The User can re-access the Fiber Pathway's vertices by single-clicking anywhere along it. It cannot be extended after its initial generation. To effectively extend a Fiber Pathway, the User may create a new Fiber Pathway and connect it to the end of the initial Fiber Pathway.

Figure 41:
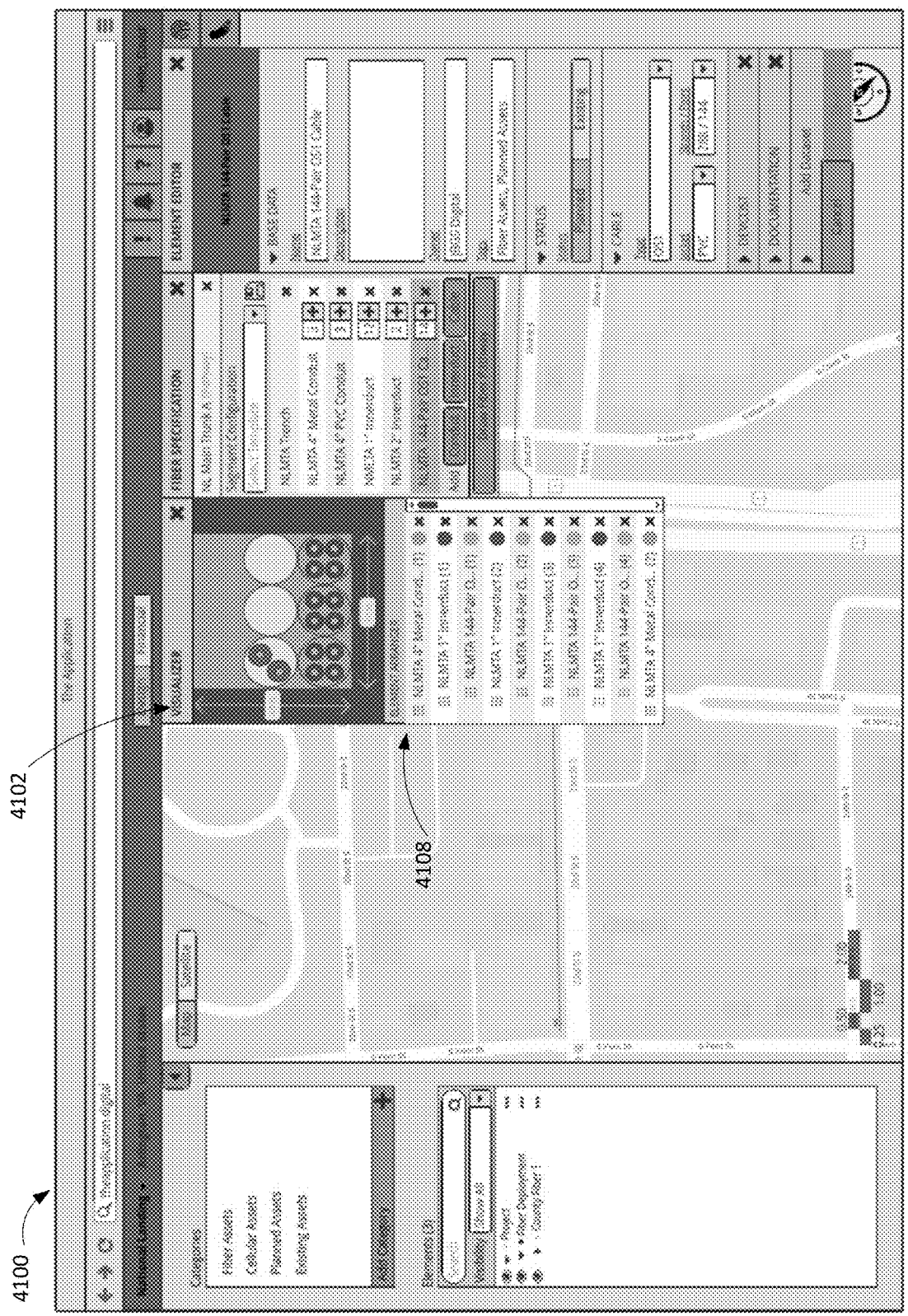
FIG. 41 illustrates an exemplary embodiment of a detailed Fiber Pathway implemented including several cables and innerducts assigned.

FIG. 41 illustrates another exemplary embodiment 4100 of a detailed Fiber Pathway implemented including several cables and innerducts assigned. Embodiment 4100 may include an Element Visualizer 4102. Element Visualizer 4102 may reflect the relative magnitudes of a fiber run's components from a profile-view. Element Visualizer 4102 may reflect how the fiber run will be deployed within its visualization. (for example, trench, horizontal boring, etc.) Element Visualizer 4102 may allow the User to arrange and rearrange the components of their fiber infrastructure to realistically recreate real-world conditions. Element Visualizer 4102 may account for when a User tries to create an impossible arrangement within a visualization. In some embodiments, the User's arrangement for a fiber run may be saved in order to allow the User to auto-create fiber runs with pre-saved templates.

When a User adds configured Conduit to their Deployment, it may auto-populate in the Element Visualizer 4102 based on a Conduit Pattern and Pattern Sequence. When there is Conduit already arranged within the Deployment when the User does this, the Conduit Pattern may still be completed automatically. The already-arranged Conduit may be incorporated into the Conduit Pattern. The newly-configured Conduit may further be arranged around the already-arranged Conduit. In some embodiments, these actions may be performed in the sequence normally taken, but without considering the already-arranged Conduit officially part of the Pattern Sequence.

Some embodiments may account for the number of already-arranged Conduit when choosing what Conduit Pattern to follow. For example, when a trench has an already-placed Conduit on its left-hand side and the User adds three more newly-configured Conduit, some embodiments may automatically add the newly-configured Conduit to the trench in the Four-Conduit Pattern instead of the Three-Conduit Pattern. Already-placed Conduit may be used as the deciding factor in the height and width of the Conduit Pattern selected. For example, when there is a trench with three already-arranged Conduit stacked vertically on its left-hand side, the Application may only select a Conduit Pattern that are at least three Conduit tall when automatically adding newly-configured Conduit. A Pattern Sequence for the newly-configured Conduit may be used in some embodiments to order any newly-configured Innerducts or Cables automatically added to the Element Visualizer 4102.

The magnitude of an element depicted in the Element Visualizer 4102 may be determined by its user-inputs for Outside Diameter and the user-inputs for the Deployment's depth and width. When the User changes their Deployment's parameters, the visualizations of its elements in the Element Visualizer may resize proportionally: the Deployment Visualization may change; its Arrangeable Area—the true geometric area in the Element Visualizer 4102 where the User can drag-n-drop elements-would resize based on the changes made to the Deployment's parameters. The element visualizations may always stay the same shape (locked ratio) as their parameters, or their Deployment's, are resized.

In some embodiments, to manually change the arrangement of elements within a Deployment, the User may click-and-hold on families of elements and drag them around the Arrangeable Area. Families of elements may include a user-set hierarchy of individual Conduit, Innerducts, and Cables.

The User may set these hierarchies in the Element Arranger 4108. Exemplary possible element family permutations include:
Conduit—Innerducts—Cables
Conduit—Innerducts
Conduit—Cables
Conduit
Innerducts—Cables
Innerducts
Cables When the User manually changes the arrangement of newly-configured, automatically-added elements, their original order in the Pattern Sequence may be preserved. When the User automatically adds newly-configured child-elements to the Element Visualizer 4102, they may be automatically added to their parent-elements in that preserved Pattern Sequence. The magnitude of a family of elements may be determined by the magnitude of the most-parent element in the family. For example, a Conduit-Innerduct-Cable family may take up the Conduit's spatial magnitude in the Element Visualizer. Families of elements may not be arranged so that they are suspended in-air. They may have other families of elements beneath them or be placed on the bottom of the Arrangeable Area. When they are released while positioned in-air, the family of elements may descend downwards until it makes contact with another family of elements or the bottom of the Arrangeable Area. When they are dragged to a valid position by the User in the Arrangeable Area the family will reside there.

When the User has added more elements to a Deployment than the Deployment has volume for, new elements added to that Deployment may not show up in the Element Visualizer. The Element Visualizer may operate with First-Come, First-Serve. In some embodiments, no Element Visualizer 4102 is displayed.

Element Arranger

The user may be able to rearrange the way conduit, innerduct, and cable appear in the cross-section diagram to reflect as-built or planned conditions. The user also may be able to delete individual conduits, innerducts, and cables from the diagram in some embodiments. As the user adds, deletes, and configures conduit, innerduct, and cable in their deployment, the Element Arranger 4108, located directly below the cross-section diagram, may reflect the hierarchical structure of those elements. This structure may populate based on the following rules:

- Elements in Element Arranger 4108 may be represented by the names the user assigns to them in their base data. When the user hasn't assigned a name, an element's generic name may be used.
- Elements may populate in the Element Arranger 4108 from the top down in the order in which they are added to the segment.
- When an element is placed inside another element (e.g., an innerduct inside a conduit or a cable inside an innerduct), that element may be shown directly below the element it is within and is slightly indented to indicate a parent-child relationship.
- When an element is added to the segment but doesn't have a place to go in the cross-section diagram (see segment visualizer rules), it populates at the bottom of the Element Arranger under a section titled "Unassigned Elements".

On the left-hand side of each of the elements in the Element Arranger 4108 may appear a grip indicator/icon that permits users to rearrange the conduit, innerduct, and cable. As users click and drag elements to different positions within the Element Arranger 4108, the cross-section diagram updates to reflect the changes. Some exemplary rules governing how clicking and dragging may work include:

- When the user moves an element, that element's children are moved with it. When the user tries to place an element into another element that doesn't have adequate inside diameter space, the elements previously within that element move to the Unassigned Elements area.
- For example, when a user wants to move "Innerduct C" into "Conduit A", but all of "Conduit A"'s inside-diameter space is being occupied by "Innerduct A" and "Innerduct B". When the user drags and drops "Innerduct C" into "Conduit A", "Innerduct A" and "Innerduct B" will move into the "Unassigned Elements" area.
- When the user wants to move an element ("Element \") outside of its parent element (thereby severing the parent-child relationship), they do so by dragging "Element \" to the desired level of indentation within the Element Arranger.

Figure 42A:
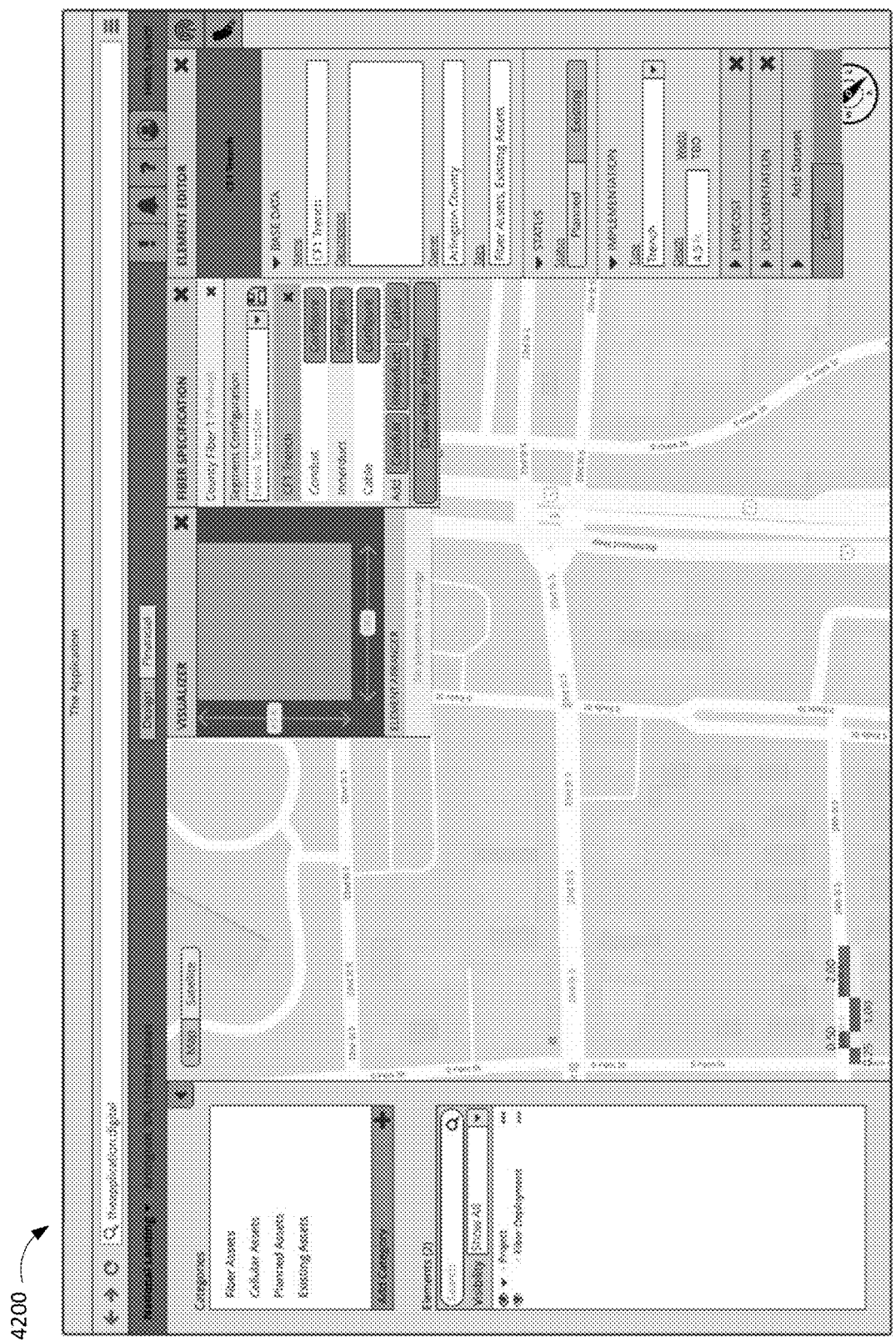
FIG. 42A illustrates an exemplary embodiment of a Trench Configuration implementation.
Figure 42B:
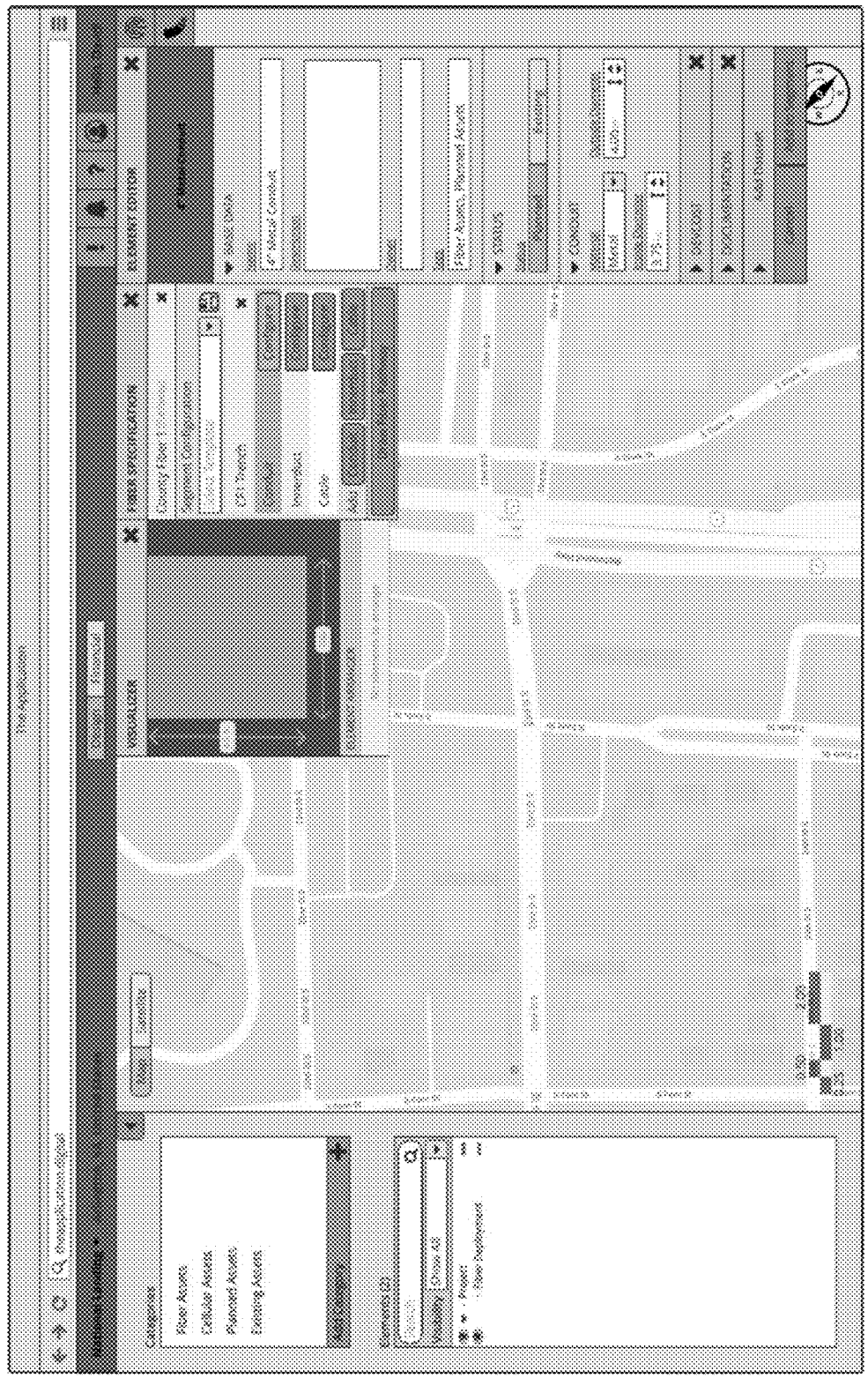
FIG. 42B illustrates an exemplary embodiment of a Conduit Configuration implementation.
Figure 42C:
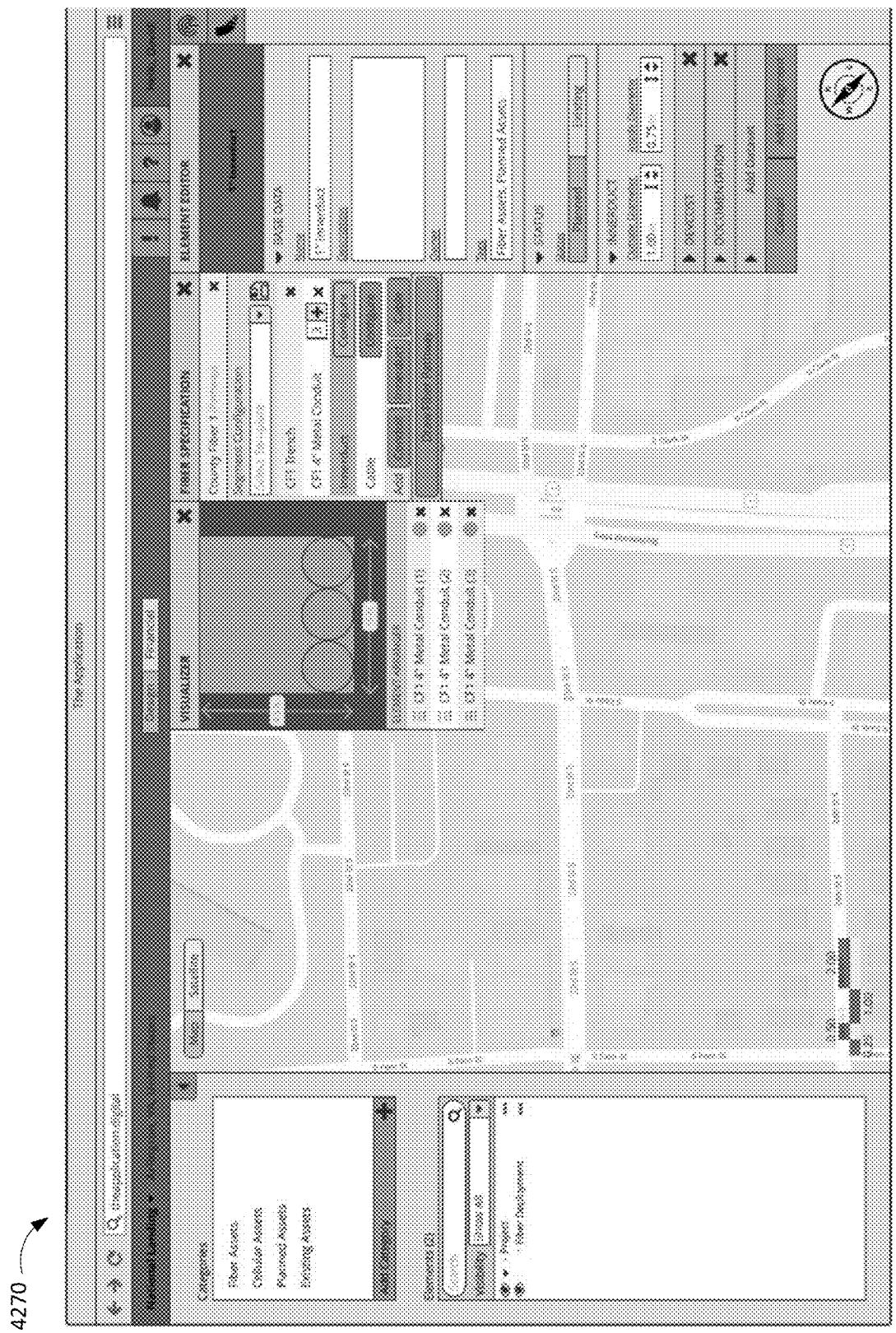
FIG. 42C illustrates an exemplary embodiment of an Innerduct Configuration implementation.

FIG. 42A illustrates an exemplary embodiment 4200 of a Trench Configuration implementation. FIG. 42B illustrates an exemplary embodiment 4250 of a Conduit Configuration implementation. FIG. 42C illustrates an exemplary embodiment 4270 of an Innerduct Configuration implementation.

Figure 43:
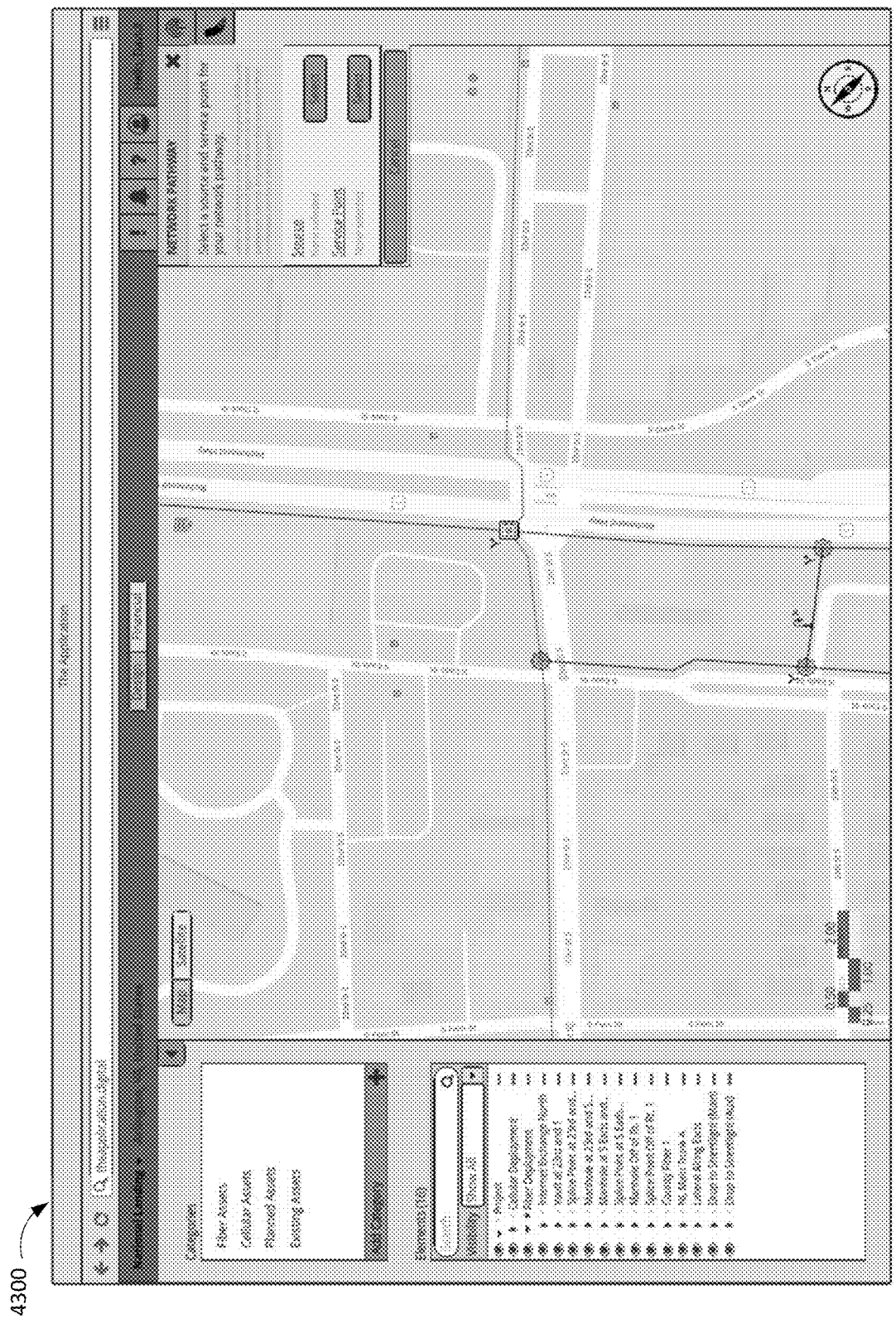
FIG. 43 illustrates an exemplary embodiment of a Network Pathway.

FIG. 43 illustrates an exemplary embodiment of a Network Pathway 4300. Having documented the physical infrastructure that comprises their fiber pathways, the user can then record how they intend to utilize the infrastructure to provide connectivity to their cellular assets. To establish a network pathway, the user may select the Fiber Toolset Button within the Tool dialog and then, from the options that pop out, select Network Pathway. A dialogue with the heading Network Pathway may then open, prompting the user to select a source and a service point for the network pathway. Both Internet exchanges and Fiber Entry Points (FEP) (discussed above) may serve as sources. Microcell streetlights, mounted microcells, macrocell towers, rooftop macrocells, and FEPs may function as service points.

When there is only one possible route of linked segments between the source and the service point, then the user may hit the configure button to bring up the network pathway's properties in the Element Editor. When there are multiple possible routes, the system may display all of them within the Network Pathway dialogue. Each possible route may display the maximum pairs of fiber that can be reserved for a network pathway taking that route. Once the user selects their preferred route, they press a Configure button, opening the Element Editor for the network pathway.

Once the user has configured their network pathway, they can hit the Establish button. Selecting the Establish button then creates a network pathway element with the properties the user specified. The network pathway element is linked to the source and service point elements, as well as to all of the segments through which it passes on its route.

Figure 44:
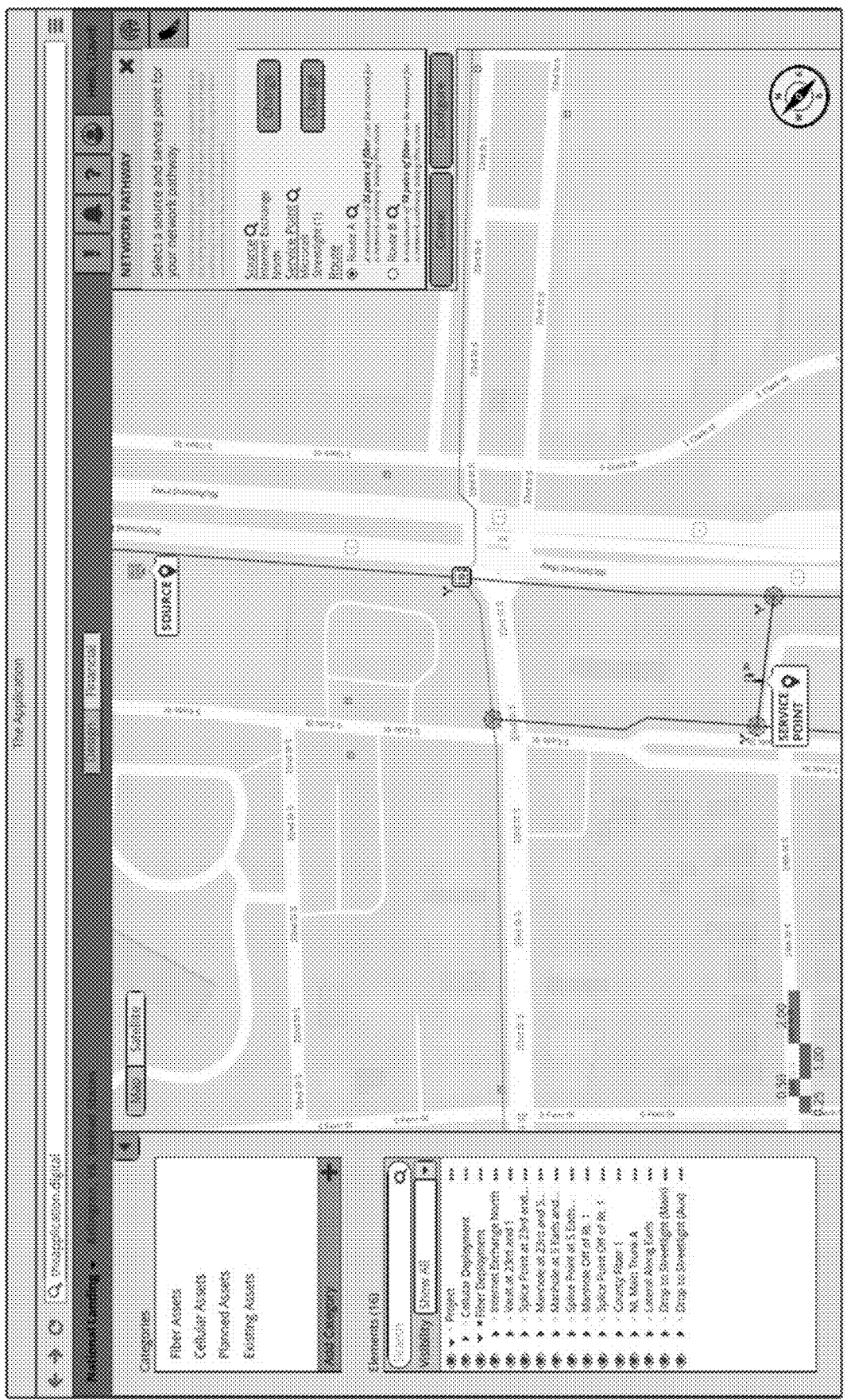
FIG. 44 illustrates an exemplary embodiment of a Route Selected on a Network Pathway.
Figure 45:
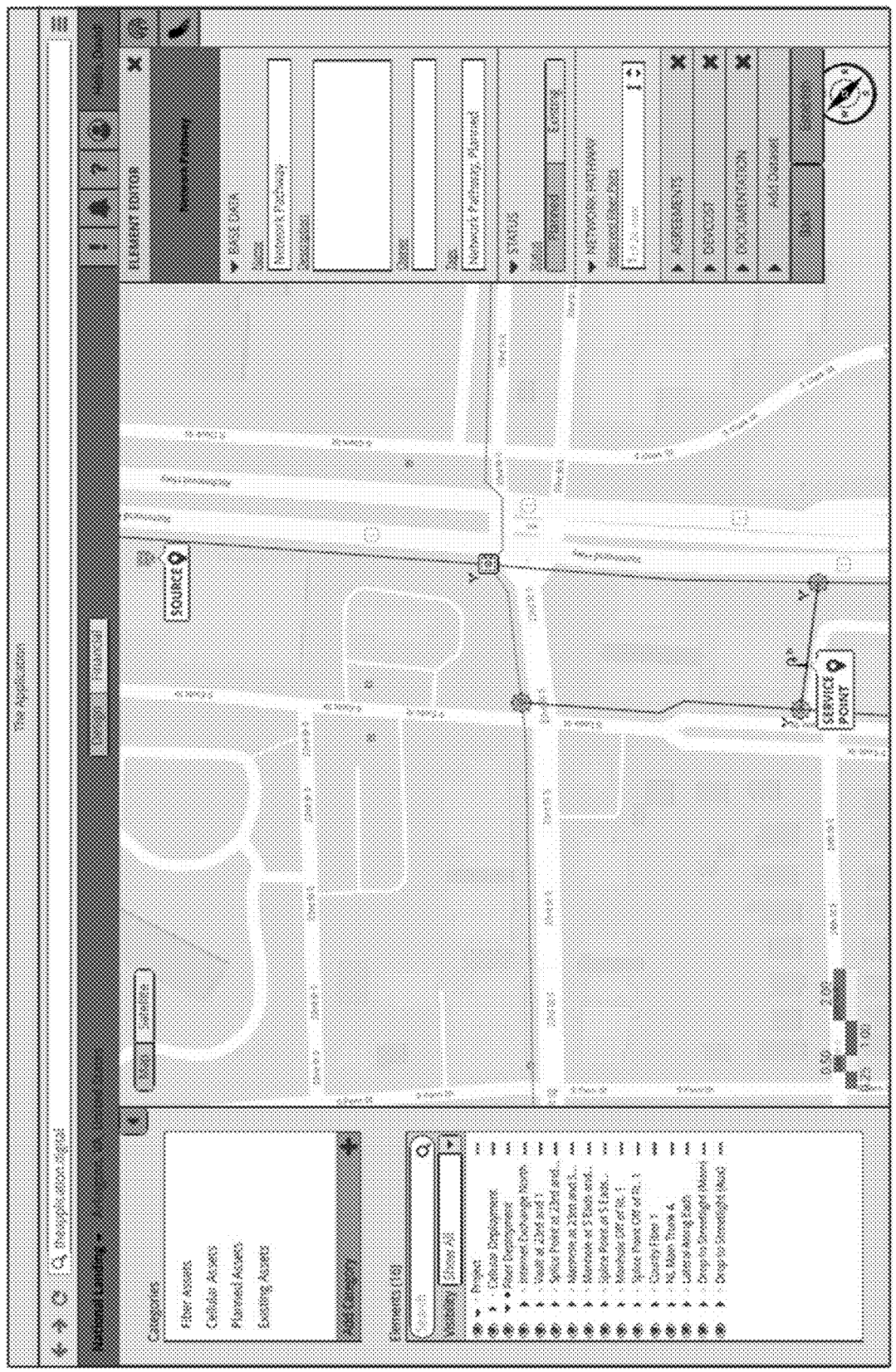
FIG. 45 illustrates an exemplary embodiment of a Network Pathway Configuration GUI.
Figure 46:
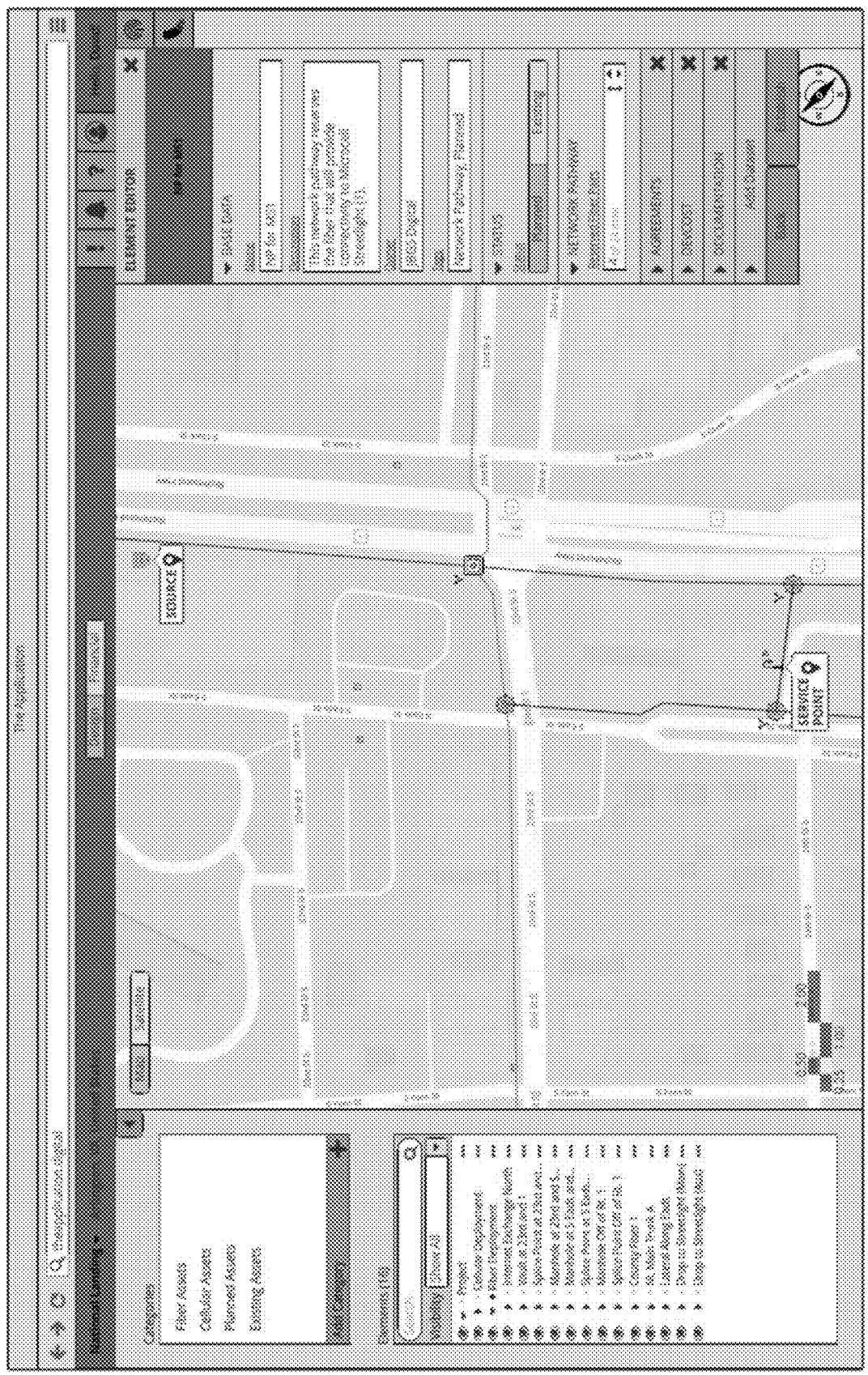
FIG. 46 illustrates an exemplary embodiment of a Network Pathway Configuration GUI.
Figure 47:
FIG. 47 illustrates an exemplary embodiment of a Network Pathway Established.

Datasets appended to a network pathway element at stored in Object File 402 may include:

Base Data
    Name
    Description
    Owner
    Tags
Status
    State
        Planned
        Existing
Network Pathway
    Reserved Fiber pairs
        The user may choose a number of fiber pairs to reserve for the network pathway out of a maximum possible number of pairs that's equal to the number of available fiber pairs on the segment with the smallest number of available fiber pairs along the network pathway's route. In other words, the bottleneck segment determines how many fiber pairs can be allocated to the network pathway.
Agreements
    List of agreements assigned to this network pathway
DevCost
Documentation FIG. 44 illustrates an exemplary embodiment of a Route Selected on a Network Pathway. FIG. 45 illustrates an exemplary embodiment of a Network Pathway Configuration GUI. FIG. 46 illustrates an exemplary embodiment of a Network Pathway Configuration GUI. FIG. 47 illustrates an exemplary embodiment of a Network Pathway Established.

FIG. 48A illustrates an exemplary flow diagram of generating horizontal elements. As illustrated, generating, and configuring horizontal elements may be an example of step 1402 in FIG. 14A along with creating massings, public spaces etc. and a step along the way of multicasting development project updates via Object File 402 on one or more Cloud Server Network Elements 202/251. In step 1402-1-48A the user may be presented options for creating one or more horizontal elements such as in FIGS. 29-30. Options for horizontal elements may include Hand Holds, vaults, splice points, Internet Exchanges, Manholes, telecommunications pathways, etc.

In response to the menu option selections for the horizontal elements, the user may be presented a sub-menu contextualized for the selected item in step 1402-2-48A. In step 1402-3-48A the user may then have the option of placing the element into the saved project, storing the placed element in the Network Pathway and updating Object File 402 for cloud storage and multicasting capabilities.

FIG. 48B illustrates an exemplary flow diagram of generating antenna elements. As illustrated, generating antenna elements may be an example of step 1402 in FIG. 14A along with creating massings, public spaces etc. and a step along the way of multicasting development project updates via Object File 402 on one or more Cloud Server Network Elements 202/251. In step 1402-1-48B the system may present the user with a set of options for creation of one of several antenna-based elements. Examples of the antenna-based elements, include a Macrocell Tower, a Rooftop Antenna, a Street light or light pole antenna, a building antenna and a microcell tower.

In step 1402-2-48B the user may be presented with one or more menus that are contextualized for the chosen antenna element in step 1402-1-48B. Options for the contextualized sub-menu may include those in FIGS. 25-27 and 32, for example. Finally, in step 1402-3-48B the user may place the antenna-based element into the saved project, storing the placed element in the Network Pathway and updating Object File 402 for cloud storage and multicasting capabilities.

FIG. 48C illustrates an exemplary flow diagram of configuring fiber. As illustrated, configuring fiber may be an example of step 1402 in FIG. 14A along with creating massings, public spaces etc. and a step along the way of multicasting development project updates via Object File 402 on one or more Cloud Server Network Elements 202/251. In step 1402-1-48C the user may be presented with one or more Fiber Specification user interfaces such as FIG. 41 and FIGS. 42A-C.

In response to selections in the Fiber Specification the user may be presented with the Element Editor for fiber, innerduct, cable, conduit and/or trench configurations, for example also illustrated in FIG. 41 and FIGS. 42A-C in step 1402-2-48C. Next in step 1402-3-48C the user may be presented with one or more visualizers that depicts the cable and innerduct configurations. Finally in step 1402-4-48C the user may be presented with an Element Arranger in response to configurations in the Element Editor, Fiber Specification and/or visualizer. The user may be able to rearrange innerduct and cable within conduits in the Element Arranger which will update the visualizer and stored data for the Fiber configuration.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

I claim:

1. A method of presenting digital infrastructure planning in a three-dimensional topographical format comprising:
   presenting a Fiber Specification used to create a Fiber configuration; and
   in response to a selection in the Fiber Specification for a condition, presenting an Element Editor interface for the Fiber configuration which is specific to the selection for the condition in the Fiber Specification;
   in response to a selection in the Element Editor for a Fiber configuration which is specific to the selection for the condition in the Fiber Specification, presenting configuration options for a conduit in the Element Editor,
   in response to a selection for a configuration option for the conduit, presenting configuration options for the innerduct in the Element Editor; and
   in response to a selection from the configuration options for the innerduct, presenting options for the cable in the Element Editor.

2. The method of claim 1, further comprising:
   in response to each selection in the Element Editor, presenting and updating a visualizer illustrating the configuration of the fiber specifications.

3. The method of claim 2, further comprising:
   presenting an Element Arranger which enables innerducts and cables to be rearranged in different conduits and updated visually in the visualizer.

4. The method of claim 3, further comprising:
   trench, open street and existing conduit presented as options for the condition.

5. The method of claim 4, further comprising:
   presenting depth and width as options for the trench.

6. The method of claim 4, further comprising:
   presenting material, outside diameter and inside diameter as options for the conduit.

7. The method of claim 6, further comprising:
   presenting outside diameter and inside diameter as options for the innerduct.

8. The method of claim 7, further comprising:
   presenting type, jacket, number of strands and number of pairs as options for the cable.

9. The method of claim 4, further comprising:
   allowing the user to save the fiber configuration as a template to be reused again.

10. A device comprising:
    a processor; and
    a memory storing instructions which when executed on the processor execute a method for presenting digital infrastructure planning in a three-dimensional topographical format comprising steps including:

presenting a Fiber Specification used to create a Fiber configuration; and in response to a selection in the Fiber Specification for a condition, presenting an Element Editor interface for the Fiber configuration which is specific to the selection for the condition in the Fiber Specification;

in response to a selection in the Element Editor for a Fiber configuration which is specific to the selection for the condition in the Fiber Specification, presenting configuration options for a conduit in the Element Editor, in response to a selection for a configuration option for the conduit, presenting configuration options for the innerduct in the Element Editor, and in response to a selection from the configuration options for the innerduct, presenting options for the cable in the Element Editor.

11. The device of claim 10, the steps further comprising:
in response to each selection in the Element Editor, presenting and updating a visualizer illustrating the configuration of the fiber specifications.

12. The device of claim 11, the steps further comprising:
presenting an Element Arranger which enables innerducts and cables to be rearranged in different conduits and updated visually in the visualizer.

13. The device of claim 12, the steps further comprising:
trench, open street and existing conduit presented as options for the condition.

14. The device of claim 13, the steps further comprising:
presenting depth and width as options for the trench.

15. The device of claim 13, the steps further comprising:
presenting material, outside diameter and inside diameter as options for the conduit.

16. The device of claim 15, the steps further comprising:
presenting outside diameter and inside diameter as options for the innerduct.

17. The device of claim 16, the steps further comprising:
presenting type, jacket, number of strands and number of pairs as options for the cable.

18. The device of claim 13, the steps further comprising:
allowing the user to save the fiber configuration as a template to be reused again.

* * * * *